United States Patent
Sieracki et al.

(10) Patent No.: US 9,898,682 B1
(45) Date of Patent: Feb. 20, 2018

(54) SYSTEM AND METHOD FOR TRACKING COHERENTLY STRUCTURED FEATURE DYNAMICALLY DEFINED WITHIN MIGRATORY MEDIUM

(71) Applicants: Jeffrey Mark Sieracki, Silver Spring, MD (US); John J. Dellomo, Silver Spring, MD (US)

(72) Inventors: Jeffrey Mark Sieracki, Silver Spring, MD (US); John J. Dellomo, Silver Spring, MD (US)

(73) Assignee: SR2 Group, LLC, Columbia, MD (US)

( * ) Notice: Subject to any disclaimer, the term of this patent is extended or adjusted under 35 U.S.C. 154(b) by 41 days.

(21) Appl. No.: 13/747,470

(22) Filed: Jan. 22, 2013

Related U.S. Application Data

(60) Provisional application No. 61/589,386, filed on Jan. 22, 2012.

(51) Int. Cl.
*G06K 9/46* (2006.01)

(52) U.S. Cl.
CPC .................................. *G06K 9/4671* (2013.01)

(58) Field of Classification Search
CPC .... G06T 7/0024; G06T 3/0081; G06T 3/0068
See application file for complete search history.

(56) References Cited

U.S. PATENT DOCUMENTS

| | | | |
|---|---|---|---|
| 8,223,146 B2 | 7/2012 | Kotake et al. | |
| 8,224,029 B2 | 7/2012 | Saptharishi et al. | |
| 8,356,035 B1 | 1/2013 | Baluja et al. | |
| 2008/0317383 A1 | 12/2008 | Franz et al. | |
| 2009/0324087 A1 | 12/2009 | Kletter | |
| 2010/0169576 A1 | 7/2010 | Chen | |
| 2010/0232643 A1 | 9/2010 | Chen et al. | |
| 2012/0170800 A1 | 7/2012 | Da Silva Frazao et al. | |
| 2012/0183179 A1 | 7/2012 | Susca et al. | |
| 2012/0201469 A1 | 8/2012 | Livet et al. | |
| 2012/0288140 A1 | 11/2012 | Hauptmann et al. | |

OTHER PUBLICATIONS

Tommaso Mansi et al, iLogDemons: A Demons-Based Registration Algorithm for Tracking Incompressible Elastic Biological Tissues, International Journal of Computer Vision, 2011.*

(Continued)

*Primary Examiner* — Mark Roz
(74) *Attorney, Agent, or Firm* — Rosenberg, Klein & Lee

(57) ABSTRACT

A system and method are provided for discriminating and tracking a coherently structured feature dynamically defined in evolving manner within a migratory medium. A data set is captured for a plurality of physical points defined within a multi-dimensional physical space, in terms of a plurality of scalar parameter values. At least one pre-selected target feature type is established, as is a scalar field predefined by at least one of the scalar parameters. A sparse set of key points is selectively generated a within the scalar field. Each key point is associated with one of the physical points and descriptive information adaptively determined therefor from the data content within a neighborhood of the physical point coinciding therewith. At least one predetermined feature-based operation is executed responsive to the descriptive information of the key points as a surrogate for execution generally on the data set.

23 Claims, 34 Drawing Sheets

(56) References Cited

OTHER PUBLICATIONS

Stephen Keeling et al, "Medical Image Registration and Interpolation by Optical Flow with Maximal Rigidity", Springer 2005.*
Racca, Dewey, "A Method for automatic particle tracking in a three-dimensional flow field", Experiments in Fluids 1988.*
John Hopkins University, Dynamic Texture Registration, 2008 and 2010 from Web Archive.*

* cited by examiner

ID# 9,898,682 B1

SYSTEM AND METHOD FOR TRACKING COHERENTLY STRUCTURED FEATURE DYNAMICALLY DEFINED WITHIN MIGRATORY MEDIUM

RELATED APPLICATION DATA

This Application is based on Provisional Patent Application No. 61/589,386, filed 22 Jan. 2012.

BACKGROUND OF THE INVENTION

The present invention is directed to the field of signal processing and signature and feature detection, particularly in images and image like data sets and higher dimensional data sets with related organizational structure. In particular, it is directed to recovering objects or features in data sets that have been generated by physics based computational simulation, and to the tracking of dynamically generated features in data sets. It is also directed to machine discovery and learning of associations in such data sets for, among other things, (1) relating design or control parameters to their effects in generating, or manipulating specifics of detail features of the resulting physics, or for (2) discovering relationships between features, multi-scale, or distributed characteristics of the physics and various macroscopic observables of the system.

Various applications are found in fluid flow simulations (computational fluid dynamics), experimental data sets and others relating to migratory media, wherein one may observe features such as (without limitation) shocks or vortices generated by flow around a particular shape, and one wishes to (a) discover and locate such features in a massive data set, (b) track the motion and change of scale of such features, (c) relate the generation and specific characteristics of such features to the geometry of the body around which fluid flows, (d) relate the generation and specific characteristics of such features to the nature or characteristics of the flowing fluid, (e) relate the generation and specific characteristics of such features to macroscopic parameters such as the lift and drag created on the subject body, or (f) render visual representations of such features within a flow.

SUMMARY OF THE INVENTION

It is an object of the present invention to provide a system and method for discriminating and tracking a coherently structured feature dynamically generated in a migratory medium.

It is another object of the present invention to provide a system and method for dimensionally reducing a massive data set to a sparse set of data points on which feature based operations may be applied as a reliable surrogate for the massive data set.

These and other objects are attained by a system and method formed in accordance with certain embodiments of the present invention for discriminating and tracking a coherently structured feature dynamically defined in evolving manner within a migratory medium. A method thus formed comprises establishing a data set captured for a plurality of physical points defined within a multi-dimensional physical space, with each data set including data content captured for each physical point in terms of a plurality of scalar parameter values. At least one pre-selected target feature type is established, as is a scalar field predefined with reference to at least one of the scalar parameters. A sparse set of key points is selectively generated a within the scalar field, such that the key points correspond to at least one coherently structured feature of the target feature type occurring within the physical space. Each key point coincides with one of the physical points. Descriptive information is adaptively determined for each key point according to the target feature type from the data content within a neighborhood of the physical point coinciding therewith, the neighborhood being defined responsive to the target feature type. At least one predetermined feature-based operation is executed responsive to the descriptive information on the data content of the key points within the sparse set as a surrogate for execution generally on the data set, whereby the execution generates feature data substantially replicating the feature data otherwise generated upon execution generally on the data set.

A system formed for discriminating and tracking a coherently structured feature dynamically defined in evolving manner within a migratory medium comprises a collection unit receiving a data set captured for a plurality of physical points defined within a multi-dimensional physical space. Each data set includes data content captured for each physical point in terms of a plurality of scalar parameter values. A decomposition unit coupled to the collection unit selectively generating a sparse set of key points within a scalar field predefined by at least one of the scalar parameters. The key points correspond to at least one coherently structured feature of a pre-selected target feature type occurring within the physical space, and each key point coincides with one of the physical points. A data reduction unit coupled to the decomposition unit adaptively determines descriptive information for each key point according to the target feature type from the data content within a neighborhood of the physical point coinciding therewith. The neighborhood is defined responsive to the target feature type. A feature processing unit coupled to the data reduction unit executes at least one predetermined feature-based operation responsive to the descriptive information on the data content of the key points within the sparse set as a surrogate for execution generally on the data set. The execution thereby generates feature data substantially replicating the feature data otherwise generated upon execution generally on the data set.

In certain embodiments, the method comprises establishing a data set captured for a plurality of physical points defined within a physical space described by at least three dimensions, with each data set including data content captured for each physical point in terms of a plurality of scalar parameter values. At least one pre-selected target feature type is established, as is a scalar field predefined by at least one of the scalar parameters. A sparse set of key points is selectively generated a within the scalar field according to a scalar invariant feature transformation (SIFT) of the data set. The key points correspond to at least one coherently structured feature of the target feature type occurring within the physical space. Each key point coincides with one of the physical points. Descriptive information is adaptively determined for each key point according to the target feature type from the data content within a neighborhood of the physical point coinciding therewith, the neighborhood being defined responsive to the target feature type. At least one predetermined feature-based operation is executed responsive to the descriptive information on the data content of the key points within the sparse set as a surrogate for execution generally on the data set, whereby the execution generates feature data substantially replicating the feature data otherwise generated upon execution generally on the data set. The feature-based operation includes discriminating and tracking the coherently structured feature of target feature type occurring in a first of the data sets within a second of the data sets, where the coherently structured feature evolves in structural definition according to at least one of the scalar parameters between the first and second data sets.

BRIEF DESCRIPTION OF THE DRAWINGS

FIG. 15(b)-2 illustrates the subsequent application of a collection of exemplary key points in finding similar key points in a data set in order to locate new features that match the original selected structural features in regards to the prevalence of certain shared properties;

DETAILED DESCRIPTION OF THE PREFERRED EMBODIMENTS

Figure 1A:
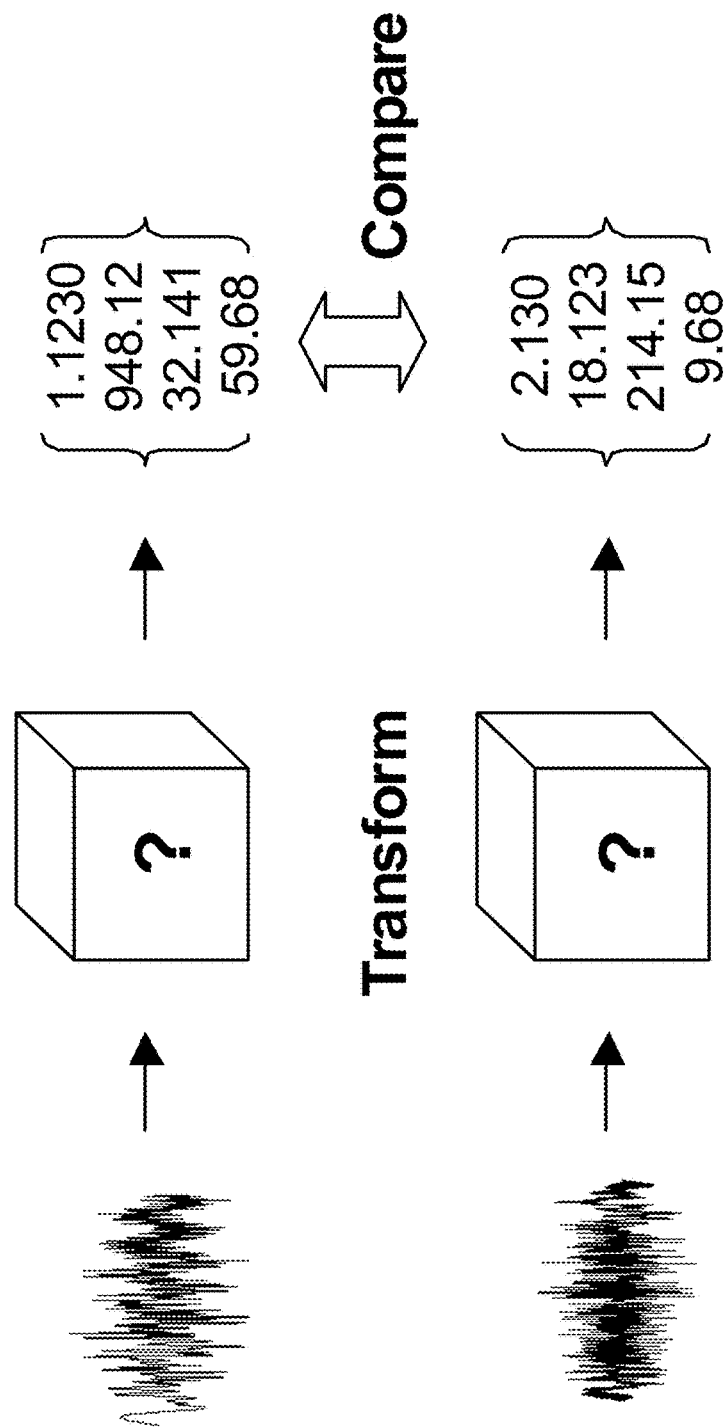
FIG. 1A is a schematic diagram generally illustrating a transformation process respectively applied to signals to obtain transformed representations thereof.
Figure 1B:
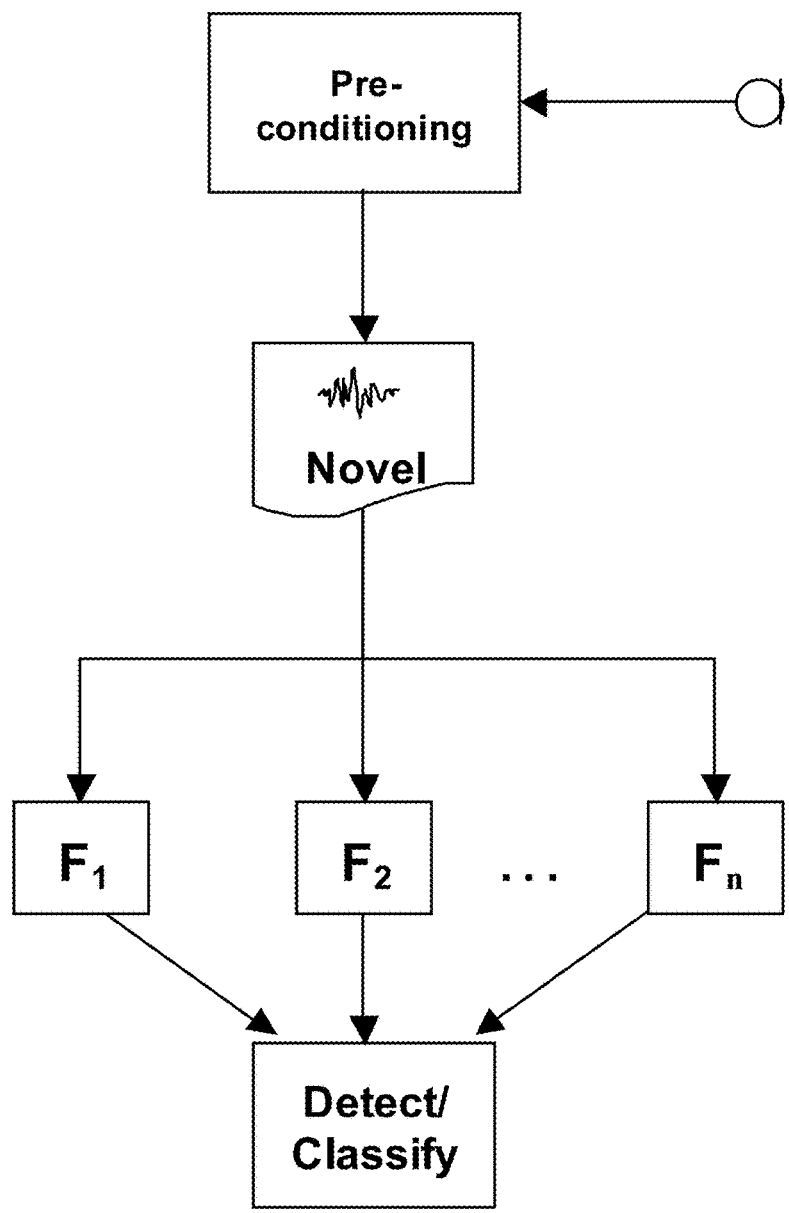
FIG. 1B is a schematic diagram illustrating the flow of processes for detection and clustering of new acoustic signals received in an exemplary embodiment of the present invention.

Modern, large-scale physics-based simulations produce enormous data sets. While aspects of these data sets may be visualized and reviewed by scientists, the sheer size of the data and the layered complexity of features of interest typically emerging at a vast range of scales make manual review increasingly inefficient and often impracticable. There may be valuable information hidden in these data sets difficult for human analysis to recognize and correlate. For example, in flight simulation, the emergence of certain local flow features could aid in predicting non-linear changes in macroscopic lift and drag, while certain other identifiable features could indicate a delay in onset of flutter of a control surface. To address these vast data sets effectively, machine-automated techniques equipped with suitable measures for mining such information are needed. Such techniques for extracting information and ascertaining the degree of uncertainty in the information's uncertainty with heretofore unseen levels of reliability and efficiency are needed.

Extensive simulations employed in various applications are intended to approximate real physical systems insofar as possible. With high-performance, data-intensive computing, it is now generally possible to simulate details at a finer scale than may be measured through physical testing. However, simulations are often validated against physical data—for example, against flight testing or wind tunnel mockup test data, in certain aerospace applications. In accordance with certain aspects of the present invention, measures are suitably obtained for linking simulation results to physical test data. Particular examples include informational data links between high-resolution simulation details and macroscopically measured test parameters, and resources for mapping emergent features of interest from simulation to signatures that may be detected by comparatively low-resolution physical sensors.

Most of the work heretofore known in the art on feature extraction and visualization has been focused primarily on identifying and exploring the dynamics of large coherent vortices. These are fairly difficult tasks since there is no rigorous, widely accepted, definition for what constitutes vortex. One definition known in the art states that a vortex exists when instantaneous streamlines mapped onto a plane normal to a vortex core exhibit a roughly circular or spiral pattern, when viewed from a reference frame moving with the center of that vortex core. Such definition pre-supposes a priori detection of streamlines relative to a known vortex core. Nor is it Galilean invariant.

Most criteria for vortex identification today are physics-based and are generally qualitative in nature. For example, another known source identifies vortices as areas where a magnitude of vorticity dominates the magnitude of strain rate, with vortices in practice being identified by isosurfaces of positive values for the second invariant of a velocity gradient tensor, Q. Using similar reasoning, other sources known in the art identify vortices in incompressible flows, for example, in terms of the eigenvalues of a symmetric tensor $S2+\Omega 2$, where S and $\Omega$ are respectively the symmetric and anti-symmetric parts of the velocity gradient tensor.

Both of these approaches to identifying vortices have been used extensively to analyze a variety of flows, but their application requires significant user input and judicious choice for the level of Q or $\lambda 2$, in order to capture the most significant vortices in a flow. Other known sources have more recently proposed a vortex core line extraction method based on a $\lambda 2$ criterion to improve detection of vortex features for highly three-dimensional flows. The core line in this approach is defined as a curve that connects $\lambda 2$ minima restricted to planes that are perpendicular thereto (to that core line).

Meanwhile, emergent approaches in Harmonic Analysis have made possible significant advances in processing very large-scale sensor data sets. In particular, the notion of dimensionality reduction (DR) via various means for data-adaptive, sparse decomposition of signals and images has paved the way for extracting information in otherwise untenably large sensor data sets. Fertile areas of effective application in this regard range from DOD RADAR, Sonar, and passive opportunistic surveillance applications to hyper-spectral image and LIDAR terrain analysis, medical imaging of the retina, and even decoding of brain activity. Another emergent approach, the so-called Compressive Sensing (CS) approach, suggests a collection of low-dimensional sensor samples can predict significant high-resolution details about an unknown signal.

These various approaches known in the art have been applied to understanding and extracting information from sensor data. In accordance with certain aspects of the present invention, certain related but uniquely distinct measures are taken to discover highly compact representations of significant details obtained from large physics-based simulations. Information acquired from such simulations are generally concentrated about emergent features into a low-dimensional space that can then be rapidly analyzed and evaluated. Application to physics-based simulation (and corresponding experimental) data sets requires certain significant departures from approaches previously developed in the art to study sensor data.

In certain applications, physics-based data sets offer massive amounts of data "measured" by virtual simulation in numerous dimensions and at resolutions that are not generally observable when recording information about physics systems with actual physical sensors. For example, the density of points at which pressure and three dimensional (3D) velocity may be determined, as well as the full range of values for numerous other state-space variables, are typically orders of magnitude beyond what can actually be physically measured in a real system. Similarly, the time slices at which data may be measured, is typically orders of magnitude beyond the actual sampling resolution in a physical system.

Physics-based simulations offer access to abstract calculated values, such as various differentials, tensors, and system state spaces, which normally are completely hidden from the physical world. However, due to the scale of massive simulations, full utilization of these abstract values with simulation data and the largely hidden physical implications of such have remained challenges even to those skilled in the art.

Signature Extraction

A notable challenge in performing detection and classification in high-dimensional spaces is discovering and leveraging natural relationships which can be used to reduce the dimensionality of the data to a manageable decision space. It is preferable to concentrate the decisive information content into relatively few coefficients. Mathematically, one may assume that the target information lies on a relatively low-dimensional manifold that is embedded in the high-dimensional space. Practically, there are many approaches by which one may attempt to reduce raw data to this salient information.

Figure 15A:
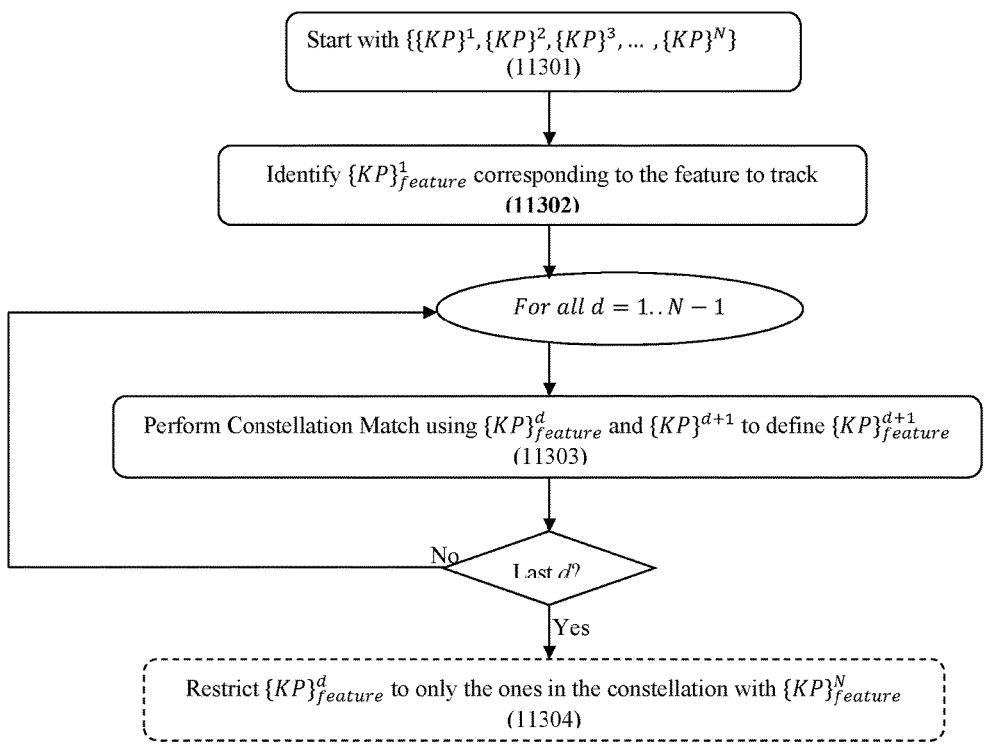
FIG. 15(a) illustrates a subject method for the tracking of a constellation of key points across time steps.
Figures 1, 15B:
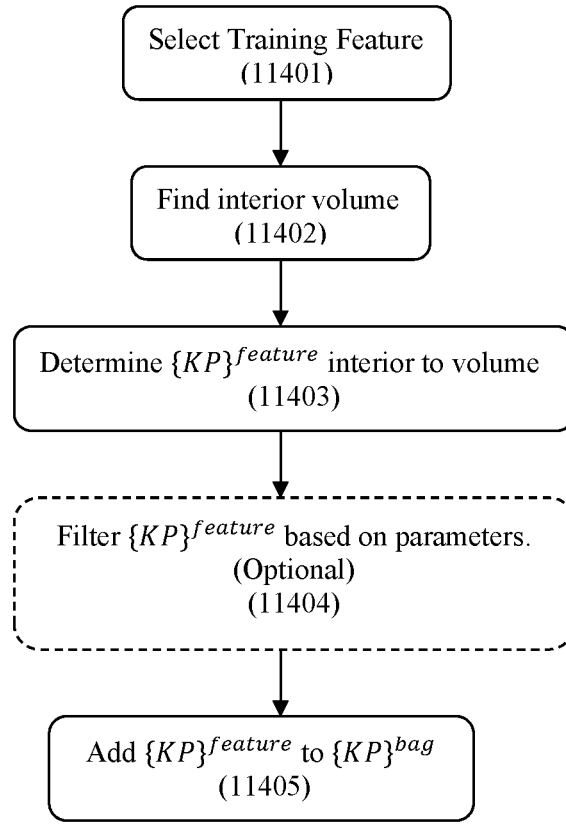
FIG. 15(b)-1 illustrates a subject method for the collection of a set of exemplary key points associated with selected structural features within the data set. "Bag of key points creation;"

FIG. 1 illustrates the abstracted process of analysis, where sample data sets are transformed so that they are represented by a set of features with corresponding values. An optimal transform to map signals into features is generally important in addressing signature discovery problems. The representation set of features is manipulated to discover group similarities and differences so that a typical signature can be extracted. The transform largely determines the success of the resulting system operation. Ideally, once a feature set is identified, the same transform may be applied for detection and classification on new data sets. In accordance with certain aspects of the present invention, massive simulation data sets are processed to achieve an effective low-dimensional feature set therefor.

Signal/data processing systems have developed to the point where the capacity to collect and store data has far outstripped the ability to analyze it. In diverse problem domains ranging from genetic sequence analysis to human identification, remote sensing, and the like, a large data set is typically handled in which individual observations are each associated with a large number of variables. The number of variables can be identified with the dimension of each observation. In these contexts, the data is said to lie in a high-dimensional space. Such is the context with numerous common problems, making them extremely difficult to solve with the limited resources typically available.

In an age when data analysis is increasingly automated, such high-dimensional data is intractable, particularly when real-world computational restrictions must be accounted for. This presents the so-called "curse of dimensionality," where the complexity of a problem increases exponentially with the number of dimensions. As it often turns out, however, not all of the dimensional variables are vital to recognition or understanding of the given data's underlying phenomena. This may be due to a high degree of redundancy in the information represented by the variables. In such cases, the structure and information content of the data may be captured by a much smaller set of variables.

For the purposes of efficient processing, computation, communication, visualization, and analysis, then, it is highly desirable to reduce the variables according to a true, or intrinsic, dimension determined for the data and to find the data's corresponding representation in a space of this reduced intrinsic dimension. Multispectral techniques for data analysis have been successfully applied to detect and classify objects in areas ranging from human pathology to geophysics and to satellite imaging. The application of DR in those cases is based on the classic assumption that a viable low-dimensional representation exists for high-dimensional multispectral data. Principal Component Analysis (PCA) is one example of a DR technique so applied to multispectral data. In PCA, a linear transform applied to data determines "directions" in the data by maximizing captured variance. PCA is the optimal choice for dimensionality reduction (DR) of the data, where the data manifold is linear. Where the data is strongly nonlinear, nonlinear DR techniques like KPCA, LLE, Laplacian Eigenmaps (LE), Hessian LLE (HLLE), and Diffusion Wavelets/Maps may be suitably utilized.

Complex data structures require procedures that lower the associated computational complexity. An initial step in this regard is to reduce the complexity of the subject decomposition by selecting a subset of the data space X on which to compute the computationally intensive decomposition. This subset is denoted: $Z=\{z_i\}_{i=1}^n \subseteq X$, where n=N. The subset Z may be uniformly selected at random from the set of vectors in the data space X. Given the n low-dimensional coordinates $\{y_i\}_{i=1}^n$ corresponding to the sampled subset $Z=\{z_i\}_{i=1}^n \subseteq X$, the new coordinates may be extended to all of the data space X via a suitable Out of Sample Extension based on frame representation techniques known in the art.

A fundamental element in the development of useful techniques for data processing is the model characterizing the expected behavior or structure of the signals of interest. Given a basis for an ambient (potentially high-dimensional) space $R^N$, a signal is classified K-sparse if it can be represented using this ambient basis with at most K nonzero coefficients. Compressive Sensing (CS) theory exploits this model in order to maintain a low-dimensional representation of the signal from which a faithful approximation of the original signal may be recovered efficiently. DR in CS is linear and non-adaptive. For example, the resultant mapping does not depend on the data. CS may be employed effectively in various applications, such as signal acquisition, compression, and medical imaging.

CS provides that, with high probability, every K-sparse signal $x \in R^N$ can be recovered from just $M=O(K \log(N/K))$ linear measurements $y=\Phi x$, where $\Phi$ is an M×N measurement matrix drawn randomly from any suitable distribution of signals. For example, the measurement matrix $\Phi$ may have independent identically distributed Gaussian entries. M is preset to a sufficiently high value to ensure that all K-sparse signals remain well-separated when embedded in $R^M$. CS theory applies equally well to signals that are not strictly sparse but compressible (if, for example, the coefficients in a signal's representation decay fast enough). Furthermore, near optimal recovery is guaranteed even in the presence of noise.

Figure 5:
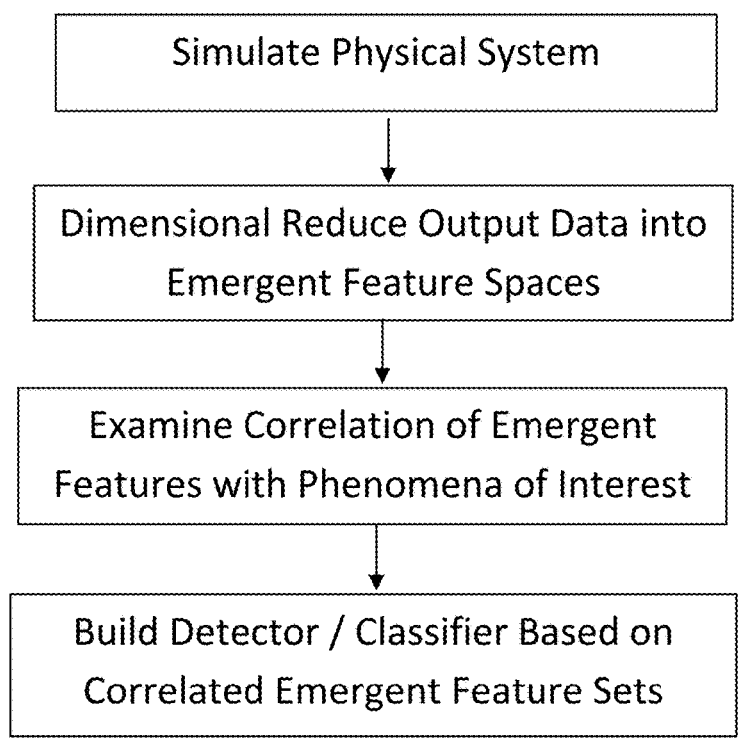
FIG. 5 is a flow diagram illustrating a progression of general processing steps in an exemplary embodiment of the present invention applying dimensional reduction to achieve computational acceleration for classification or detection of features.

In accordance with certain aspects of the present application, as implemented to suit certain exemplary applications, sensing is not of primary focus. Instead, the focus is on the precise recording of physical simulation. The goal is not, as in CS, to predict the hidden underlying signal. The underlying signal is precisely known, at least to the limit of the given simulation resolution. Rather, the goal in these implementations is to find means by which to rapidly analyze large quantities of data and therein discover certain discriminant features of interest. DR methods are applied to achieve computational acceleration as well to carry out a transform to compress the data sets into a low dimensional space that enables more robust and more accurate classification or detection of the features of interest within the massive simulation data set. FIG. 5 illustrates a flow of processes in one exemplary embodiment of the present invention by which this may be effected in the new application space.

1. Identification and Tracking of Emergent Coherent Features Via Application of Scale Invariant Transforms A system and method formed in accordance with certain other exemplary embodiments of the present invention, operate in various illustrative applications to reduce relevant physics features (such as certain coherent structures) in a data set to a suitable transform type, such as those derived from Scale Invariant Feature Transforms (SIFT), Speeded Up Robust Features (SURF), or similar transforms known in the image processing art. This class of transforms is hereinafter generally referenced herein as "SIFT-type transforms" and refer to "SIFT-type" features or key points, without restriction unless otherwise stated. As applied for example to simulations of flow fields of a certain fluid, the system and method subsequently detect such coherent structures/physics features in other flows using the feature transforms. The same physical features may be iteratively tracked time-step to time-step. As a significant advantage over heretofore known approaches for extracting and analyzing features (such as vortices) in flows, this time-step to time-step persistency of SIFT-type clusters correlates with human expert perception of a "feature" within the flow data.

Scale Invariant Feature Transforms (SIFT) are known in the art and are applied as tools in image processing. SIFT has found particular use in include machine-vision finding, object tracking, face and finger-print recognition, and in the automatic assembly of overlapping photographs into panoramic images. Given the inherent differences in the structure and nature of the data sets involved, SIFT has yet to find suitable application in processing physics based simulation data sets like those described in preceding paragraphs.

Generally, SIFT algorithms rely on a multiscale analysis techniques in which a visual field is abstracted into Gaussian blurred approximations, and the Differences of Gaussians (DoGs) at neighboring scales are examined to establish a set of candidate key-points. Each extrema point within a DoG can be locally described by its unique local gradient orientation statistics, and a characteristic set of key points may be determined from such extrema for features within an image, for instance, that are consistently replicated when they appear in other images. For example, an object appearing in different images may be detected in each of the images by virtue of its characteristic key points being found therein.

As the physics features of interest are not necessarily objects, per se, the use of SIFT-based algorithms becomes problematic. In applications involving the study and analysis of fluid dynamics, for instance, physics features of interest may include vortices, eddies, swirls, and the like. These physics features may have discernible coherent structures when dynamically formed, but unlike the fixed structural form of tangible objects, these coherent structures are evanescent. They disperse and re-shape from time frame to time frame. As such, they are not conducive to SIFT- or other such SIFT-type transform-based processing as applied within the image processing art for feature extraction.

In the illustrative embodiments disclosed, the system and method incorporate aspects of SIFT processing even to such applications. The system and method incorporate SIFT processing techniques suitably modified to improve computational efficiency and thereby adapt even to data sets where coherent structures are of sufficient evanescence, for example, to normally preclude the use of SIFT-base feature extraction processing thereon. A notable aspect of SIFT-related feature extraction as incorporated herein is that resulting features are maintained with representations that are scale- and rotation-invariant. Target objects of interest are considered collections or constellations of individual SIFT key point features. Consequently, the modified SIFT-based detection disclosed proves extremely robust even when target objects are imaged at different scales and angles, or are partially occluded. Such detection processing complements and exceeds other feature detection methods in the art by providing locally descriptive point-associated detail features that may be robustly identified and tracked with precision.

Features of interest in 4D-physics simulation data typically include discontinuities (e.g., shocks) but largely comprise nebulously bounded yet coherent feature sets such as vortices, as mentioned in preceding paragraphs. The features may occur at different, often changing scales. Also, constellations of such features may occur where the features appear as a loosely coherent set, and where the member features change both in size and relative position over time. By operating on the velocity or pressure fields from 4D simulation, on the projections of these fields, or on scalar fields of certain parameters computationally derived (such as invariants of the velocity gradient tensor), the subject system and method establish comparable feature matching and detection capabilities for physics-based simulations. They do so while maintaining the requisite computational processing load at manageable levels by executing feature extraction based on a set of sparse data points selectively established such that carrying out certain feature based operations on that sparse set serves as a reliable surrogate for carrying out the same on the overall data set.

Such application of the exemplary embodiment generally achieves the following: (1) Identification of physics features similar to an established feature type in a known database. (2) Automatic tracking of features from time-step to time-step (that is, between time slices of data), even where features change orientation, scale, and shape between time-steps. (3) Identification of existent features without regard to type, solely on the basis of structures identified (discriminated as such) within the flow that either remain stationary or move coherently within the 4D simulation (4) Automated tracking of salient isosurface values for optimized flow visualizations. (5) Automated finding of features within a flow that match a specific marked example. (6) Automated finding of features within a flow that correlate with a predetermined macroscopic parameter. (7) The reduction of data sets to a significantly smaller sparse set of key points that may be analyzed in surrogate for operations on the full data set.

a. Exemplary Embodiments as Applied to Multi-Dimensional Applications

Turning now to FIGS. 9(a)-9(e), there is schematically illustrated in progressive detail the flow of processes carried out by the subject system and method in one or more embodiments to suit various applications where certain operations are executed on a sparse set of key points found for a data set as a highly reliable surrogate for actual execution on the data set in its substantial entirety. There are numerous applications, for example, where the data set contains massive data captured for instance from complex physics simulations. Executing discrimination, tracking, and other such feature-based operations on the massive data often becomes prohibitive in terms of computational/processing load. This is oft encountered in the context of complex fluid dynamics (CFD) analysis, where coherently structured features of interest like vortices, eddy currents, and others emerge, evolve, and dissipate in highly dynamic manner, and do so within a medium that is itself highly migratory. The physical space defined for a three dimensional fluid flow, for example, normally contains massive amounts of data continually varying at the physical points (within the physical space) as the fluid merges, diverges, shapes, and re-shapes during its flow.

In accordance with certain aspects of the present invention, the subject system and method, implemented as shown in FIGS. 9(a)-9(e) and others, addresses such challenges. They reduce the enormous task of processing a massive data set to the very manageable task of determining and operating upon a sparse set of highly indicative key points which map variously to the data set, then operating on those key points to obtain results substantially replicating what would be obtained were the entire data set operated upon. The processing efficiencies gained thereby make possible the accurate discrimination and tracking of such the highly dynamic, and even evanescent, features like vortices in a high pressure fluid stream. Demonstrative examples of this for various CFD analysis scenarios are shown in FIGS. 20-25, dramatic results were attained by system configurations variously embodied and implemented according to FIGS. 9(a)-9(e), and others disclosed herein.

Figure 9A:
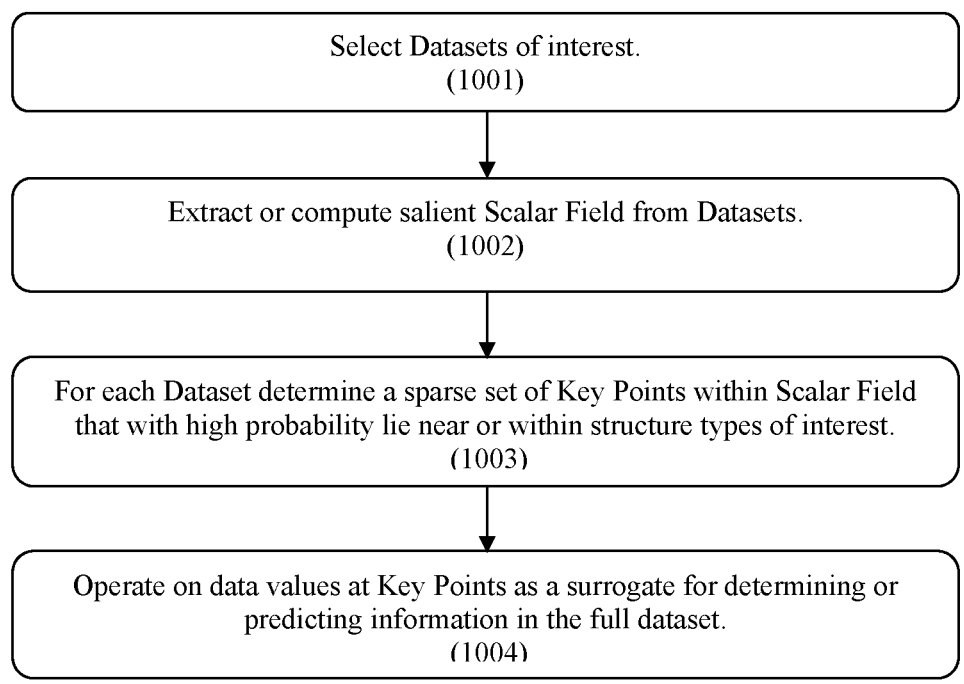
FIG. 9(a) is a flow diagram illustrating a progression of general processing steps in an exemplary embodiment of the present invention for generally reducing a large data set to a sparse subset of key points which points may be reliably operated on as a surrogate for determining information in the full data set.
Figure 9B:
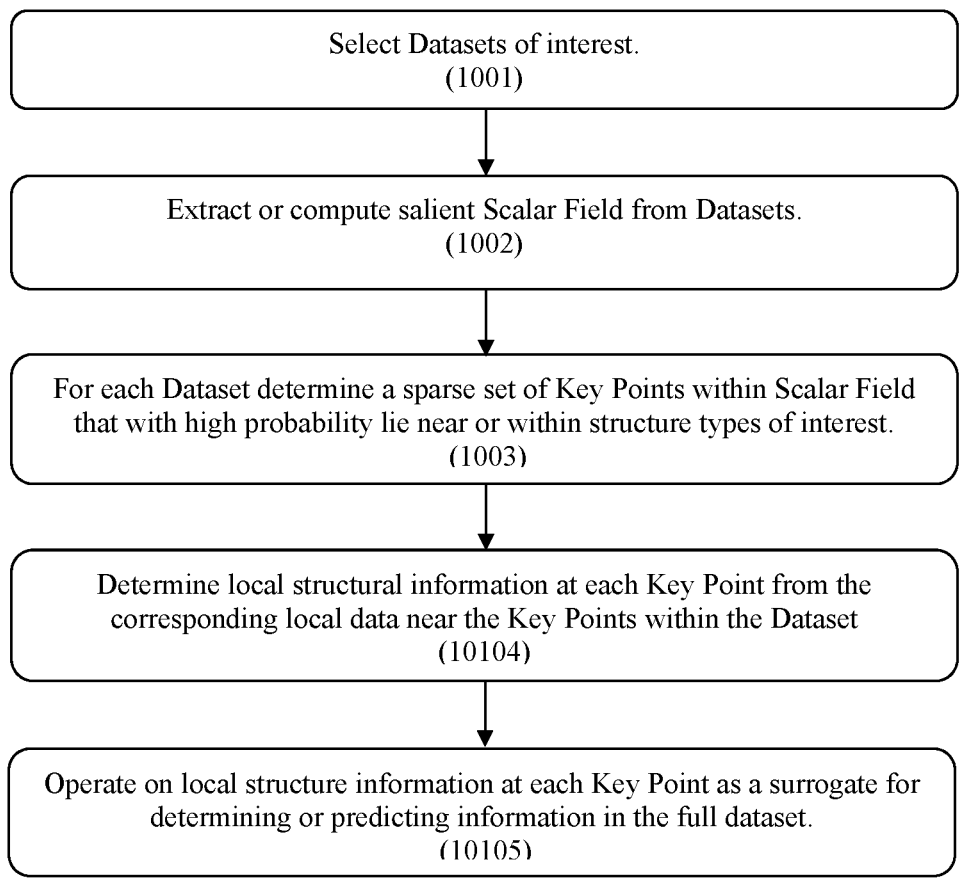
FIG. 9(b) is a flow diagram illustrating a progression of general processing steps in an exemplary embodiment of the present invention for generally reducing a large data set to a sparse subset of points performing one-time local assessments of structure around each key point that substantially decouples surrogate operations from the source data set.
Figure 9C:
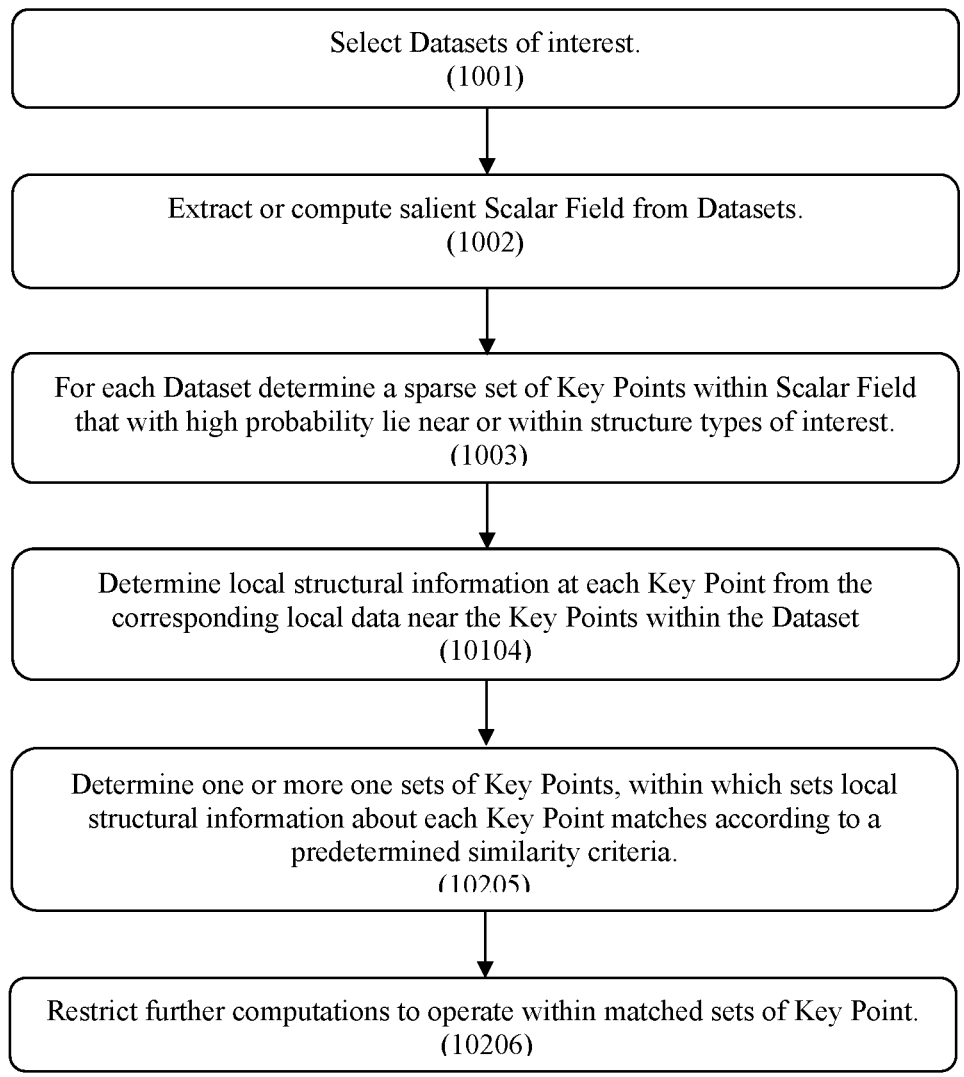
FIG. 9(c) is a flow diagram illustrating a progression of general processing steps in an exemplary embodiment of the present invention for generally reducing a large data set to a sparse subset of key points, with key-point to key-point matching operations based upon the local structural assessments in order to limit the set of key points which need to be jointly considered in any particular surrogate operation.

Turning to FIG. 9(a), there is illustrated in more detail a variation of the exemplary embodiment of FIG. 5 implemented with a SIFT-based extraction of features employed for dimensional reduction of data obtained for a migratory medium. The migratory medium may include any physical medium whose constituents exhibit flow properties thus predisposing certain features within the medium to evolve elastically over time. Examples include various liquid or gaseous fluid streams, plasmas, subterranean media, biological media, biological and chemical dispersion models, explosive detonation shocks, and the like exhibiting three dimensional migratory flow in response to environmental conditions and/or constraints.

At Block 1001, one or more data sets of interest are established. Depending on the particular intended application, these data sets may comprise collections of physical data captured either by recording physical phenomena at a large number of predetermined physical points, or collections of simulation data captured at a large number of predetermined physical points. In illustrative cases, such information may be indexed by a 3 dimensional (3D) set of coordinates according to the added dimension of time. In other cases, and in other embodiments, any suitable number of dimensions may be used to index the data, as appropriate to the source of data.

Similarly, the various embodiments of the present invention are not restricted in the density or mapping of dimensional coordinates. For example, experimental phenomena may be sampled irregularly, concentrating data collection on any suitable combination of spatial and time points determined to be of interest. Simulation data may also be sampled irregularly, in accordance with the simulation designer's expectation, for instance, of the required density of physical phenomena calculations. In the illustrated example, 4 dimensional data (3 spatial dimensions plus 1 time dimension) indexed $(x,y,z,t)$. Other dimensional variables may be used as needed in alternate embodiments and applications, examples of which include non-Cartesian, non-uniform, and curvilinear parameterization. Also contemplated within such indexing are the possible cases where no time information is used, where less spatial dimension such as only $(x)$ or $(x,y)$ dimensions are used in place of $(x,y,z)$, or where other higher number of dimensions $(x_1, x_2, x_3, x_4, x \ldots x_n)$ are used. Further contemplated are cases in which a data set is generated for multiple conditions, and thus further parameterized by a parameter representing said controlled condition(s), $(x_1, x_2, x_3, x_4, x \ldots x_n, c1, c2, \ldots)$.

In preferred embodiments, the subject system and method are operable to analyze 4D simulation data sets. In certain applications, the data sets of interest will typically comprise collections of data for one or more spatial regions captured at one or more stored time-steps for each spatial region. For example, a rectangular volume may be examined in certain flow simulations to record fluid flow information within this rectangular volume at a series of fix time points. This condition pertains to the various example flow fields illustrated in FIGS. 22-24. Such a flow might typically be described at each point $(x,y,x,t)$ by a vector in terms of values $(u,v,w,p)$, where $(u,v,w)$ values represent respective $(x,y,z)$ components of a velocity vector at the given point, and p represents the pressure. In certain other flow simulations, these values may be augmented with d, a local density value. Other physical simulations may employ other natural parameters of measurements.

In order to analyze the captured data set 1001 in the illustrated embodiment, the subject system and method at Block 1002 extracts a salient aspect of the data to which the primary calculations for analysis are restricted. While the system may be extended to consider vector information in this regard, the captured data set is preferably reduced to a scalar field. The term scalar is used herein in a general mathematical sense to mean a non-vector quantity. Thus, each index point $(x,y,x,t)$, is preferably associated with one numeric (non-vector) value.

To so reduce the data to a scalar field in an exemplary application, any member of the set of vector values $(u,v,w,p)$ may be taken individually. In the illustrated embodiment, the system and method may take from the data set a scalar field including values for parameter p (the pressure) as well as for parameter w (the Z component of velocity). This choice of scalar field parameter will depend on details that may be of interest in the subsequent feature extraction. The Z direction is generally taken to be "stream-wise," or the direction in which primary flow of the given fluid moves.

As an alternative to extracting a parameter, a scalar parameter may also be computed as a function of some or all of the vector field components, $f(x,y,x,t)$. A computed scalar of particular merit within the preferred embodiments operating in computational fluid dynamics (CFD) data applications is the Q-criterion, described variously as the second invariant of the velocity tensor for a vector field point. Other computed scalars may include various eigenvalues associated with the fluid flow field calculations, the so-called vorticity components, and other suitable criteria known in the CFD art such as $\lambda_2$-, $\Delta$-, and $Q_s$-criteria.

Though the system and method are not limited to a particular choice of scalar parameter used, the correlation between the selected scalar parameter to the physical phenomena of ultimate interest is significant to the successful rendering of useful information for a given application. In illustrative applications of the system and method, the use of p and Q parameters is found to be preferable as they yield useable features at the next block 1003, where the scalar field obtained from the data sets of interest is used to isolate Key Points having a high probability of lying near or within structures of interest within the data sets. Each such Key Point comprises a position $(x,y,z,t)$ within the a data set. Note that the resulting set of isolated Key Points is sparse relative to the full data sets. In other words, there are comparatively fewer numbers of Key Points than there are original data points. Preferably, the original data points are thereby reduced to significantly fewer numbers of such Key Points, significantly reducing in turn the computational load to only those computations attributable to structures emerging in the given fluid that potentially represent features of interest.

Thus, to the extent one operates within the sparse sets of Key Points rather than within the entirety of the original data set, the system and method provide a significant reduction in computation count over any approach heretofore known which achieves similar results while operating on the entire original data set. This speeds subsequent operation significantly in any instance, and makes feasible operation on massive data sets which might otherwise comprise too much data to process in their entirety within reasonable time constraints in most applications.

The general goal in this regard is to reliably select a sparse set of Key Points that intersects with features of interest within the simulation. The term "features" here refers to various physical qualities, conditions, or attributes observable within a given physical medium. Within a migratory medium such as a fluid flow, features of interest tend to emerge then evolve to the point of dissipating in some instances. Such dynamic definition of features makes tracking of the same particularly challenging, since its evolution within the ever-shifting configuration of the migratory medium rarely if ever keeps the feature identical between time slices.

Examples of features that may be of interest within certain fluid flow applications may include ridges of pressure, areas of flow separation, eddy currents, and vortices of various scales. In addition, discontinuities within a flow such as shocks, bubbles, or phase-change boundaries may be of interest in certain applications. Within the art, flow features like these are often referred to as "coherent structures," indicating that they have some 3-dimensional extent and organization and that they tend to evolve in time in a way that maintains step-to-step continuity in that organization. However, such coherent structures, while identifiable to a human eye in the abstract, are not generally precisely defined by deterministic boundaries. They instead are blended into and out of the remainder of the flow field with continuous, weakly defined perimeters, and are often amorphous, and rapidly evolving in shape. Such features may divide or recombine with one another over time.

A desirable related aspect is that such key points derived in association with features of interest are reproducible in predictable fashion (with respect to these features of interest). Thus, one may by virtue of knowing key point locations make specific assumptions about aspects of their associated feature within the larger data set. Moreover, if multiple key point finding operations are conducted on the same or on consecutive time steps of a data block, then the key points delivered by each operation will remain substantially consistent (predictably so) over the multiple operations.

Turning back to the illustrated embodiment, the system and method preferably operate on the scalar field at block 1003 using a modified Scale Invariant Feature Transform (SIFT), described in more detail in following paragraphs. Note that SIFT is heretofore known and used in image processing applications. As such its use was limited to applications having more than 2 dimensions. SIFT normally lacks the ability to determine the irregular, amorphous, rapidly evolving flow features that occur within physics simulations such as those relating to fluid-flow, let alone the occurrence of such in 3 or more dimensions.

The structure of most physical objects within a photograph or within the physical world is ridged. That is, objects may rotate, move, or change in scale, but they do not reshape themselves from moment to moment. Nor do the points within a solid physical object typically twist and turn independently of each other. The primary collections of operations based on SIFT and related methods (such as SURF) for determining features is predicated on these physical object constraints. They do not translate to the CFD setting where features of interest within a migratory medium like flowing fluid are continually defined and redefined the dynamically. The significant variations from known SIFT preferably implemented for use in the system and method is described in more detail in following paragraphs. A notable departure from known SIFT approaches is that certain key points on edges that traditional SIFT approaches would discard are kept and utilized by the system and method for CFD settings.

In accordance with certain aspects of the present invention, a usable set of key points within CFD feature structures are actually obtained using a modified SIFT-based approach from a scalar field. Scalar fields such as defined by parameters p and Q are demonstrated to be effective in combination with the SIFT-based approach at finding and tracking even amorphous vortex shapes. Accurate tracking requires the daunting task automatically carried out by the system and method in accordance with certain aspects of the present invention, of not only discerning not which data variable to consider but also determining which variant of which key point extraction transform will yield a salient set of key points for the analysis of interest in the highly dynamic environment presented by a migratory medium.

In certain alternate embodiments, other suitable operations such as those based on Speeded Up Robust Features (SURF) may be used in place of those based on SIFT, to finding sparse key points that derive from DR operations. In the illustrated embodiment and application, a SIFT-based approach is preferably used in combination with specific scalar fields, however, because such is demonstrated to be particularly effective in generating a sparse set of key points which intersect with flow features of known interest in many applications within the art of CFD. In those particular applications, the alternate use of SURF-based approaches tend to yield less effective results, in part because the underlying wavelet transforms do not correlate as well with the targets of interest typically presented in the given settings. Nonetheless, a SURF-based approach appropriately redeveloped using different wavelet sets in certain embodiments can provide more effective performance. Note also that it may be preferable in certain embodiments specifically targeting for analysis discontinuities rather than vortices, for example, to employ SURF-based approaches with discontinuous wavelet choice, rather than SIFT-based approaches.

Once the given data field is reduced to a set of key points at block 1003, the set may be further reduced (optionally) as needed in certain embodiments and applications. For example, the SIFT key points obtained at block 1003 may be filtered using other processes described in following paragraphs to leave only those key points lying within coherently structured features representing vortices. The key point set may be otherwise reduced to any other suitable subset thereof to match selected criteria appropriate for the intended application.

At block 1004, the system and method operate on the key point set as a surrogate for determining or predicting the information of interest within the full data set. This may involve further abstract key point operations, as described in following paragraphs. This may also simply involve analysis using the key points' locations within the original data field rather than operating on the full set.

One example of this is to simply display the key points as a visual map to where the features of interest may lie within the flow. Another example of this is to select data values from the data set at locations indexed therein by the key points for subsequent operations on the selected subset of data. For instance, one may wish to find correlations between this local data and some external force. Analytical operations in that regard may be conducted only on the small, sparse subset of data, yielding results much more quickly than would conducting the operations on the full data set, yet without losing confidence that the results substantially represent that would effectively have been obtained from the full data set.

A further example is to use the key points to provide sparse sampling values for further computations. For instance, both compressive sensing and land-marked DR operations known in the art are carried out on randomly selected subsets of data fields. But such operations may be carried out according to certain aspects of the present invention with far greater efficiency using such sparse sampling, preferably guided according to such prior knowledge as underlying feature locations.

The SIFT-based and other such feature extraction operations may be applied by the system and method to the full 4D data field (x,y,z,t) in a single operation. This is preferred when the goal in an intended application is to locate critical events at their space-time locations. However, the SIFT-based approach is preferably applied in the illustrated embodiment and application to each 3D field at each $i^{th}$ time-step $(x,y,z,t_i)$. This is a convenient and natural way to separate the data for processing, and is preferable for most applications disclosed in that the key points are potentially matched from time step to time step.

In FIG. 9(*b*), an additional process is included at block 10104, wherein local structural information is determined for each KP obtained at block 1003. Preferably, this is done by examining the region around that KP's location in the Data set (that is, within the data set's physical reference frame). Such local structural information at or about the KPs preferably provides sufficient descriptive information to perform significant operations at block 10105 on just the KPs' associated data as a collective surrogate for the entire data set, in order to efficiently determine or predict information about the full data set on that basis. For example, suitable discrimination, matching, and tracking operates carried out, therefore, only on the KP associated information advantageously produce results that are sufficiently accurate with respect to the full and much larger data set. The sparse data provided by the KPs may be subjected to feature-based operations as a faithful surrogate for applying their application on the full data set.

In addition, block 1004 of FIG. 9(*a*) is replaced with block 10105 in FIG. 9(*b*). Because of the local structural information obtained at block 10104, the system need no longer return to the original source data for many subsequent operations, but may now operate instead within the database of KPs and the associated structural information indexed by such KPs. Again, these KP operations are thereby executed as surrogates for operations on the full data structure. They remain sufficient to make accurate analyses and predictions with respect to the full data set.

FIG. 9(*c*) more specifically illustrates an example of how such local descriptive information determined in 10104 may be used to realize significant computational benefits. At block 10205, an additional matching step is carried out, wherein sets of KPs are further restricted/refined by a mutual matching requirement. One or more predetermined similarity criteria are applied in this embodiment toward that end. The predetermined similarity criteria may apply to any combination of the KPs' descriptive information, or KP locations. The net result is that in further computational steps 10206, these smaller matched KP sets may be operated on to emulate their effects on the entire data set. The dimensionality of computations is quite significantly reduced thereby, and rendered much more efficient as a result. One or more types/variations of local structural information obtained at block 10104 may be employed in suitable combinations depending on the particular requirements of the intended application.

FIG. 9(*d*) illustrates the steps of FIG. 9(*c*), as implemented in a more specific application example upon a particular data set. As before, at block 1001, one or more data sets of interest are selected. At block 1002, a salient Scalar Field is either selected or computed, as described in preceding paragraphs.

At block 10303, the resulting Scalar Field is operated on to determine a sparse set of KP, and for each KP's location, a principal Scale value is computed. In order to preserve reliable comparability of such KPs associated with the same feature even if that feature dynamically evolves in scale across time slices, the KPs are preferably determined in a manner that is scale invariant. Accordingly, should the data in the full data set near a KP be re-scaled through dilation (i.e., a smooth stretching or shrinking) or other such effect to produce a second data set, then operating upon this second data set will, with high probability, recover the same KP spatial location but with a principal Scale that has been increased or decreased commensurate with the dilation (or other such effect).

Several transforms known in the art satisfy this property. They include the transforms carried out as part of the initial extrema finding analysis steps associated with SIFT and SURF. Various aspects of a modified SIFT approach adapted for certain illustrative embodiments of the present invention are described in greater detail in following paragraphs.

At block 10304, certain descriptive information is determined at each KP location. Specifically, a Descriptor that is representative of the local pattern of data in the neighborhood around each KP location in the data set, and a primary Orientation uniquely associated with this KP are determined. Preferably, the descriptor is scale invariant, and therefore reproducible across sets of re-scaled data. Recognizing that in two or more dimensions the structure around a KP may remain substantially identical independent of its rotation in space, it is preferred that the primary Orientation be determined at each KP, and that the Descriptor be defined relative to this Orientation as well as to the Scale of the KP. This facilitates the recovery of similar KP locations and Descriptors regardless of either scaling or rotation occurring in the data set or in any local portion thereof.

Note that orientation will typically be described in terms of a set of angular offsets appropriate for the given space dimension. Thus in 2D applications, a single value $\theta$ suffices; while in 3D applications, several equivalent alternative measures known in the art may be considered. For example, $\theta$, $\phi$, $\psi$ may be used, where $\theta$, $\phi$ represent polar angles of an axis vector, and the $\psi$ represents the rotation in roll about that axis.

Again, several transforms known in the art satisfy these properties. They include certain Orientation and Descriptor calculation steps associated with SIFT and SURF.

The information determined via block 10304 may be put to use in and of itself, as described in connection with FIGS. 9(*a*) and 9(*b*). For example, in many instances, a map of such KPs and/or of such KPs with their descriptive information will provide informative visualization of underlying features of the data. In the exemplary context of CFD simulation data, this information is sufficient to describe, a course-grained map of dynamically moving vortex information and standing eddy features along with their primary orientations from time step to time step.

At block 10305, the processes of block 10205 in FIG. 9(*c*) are implemented by explicitly operating on the information realized at block 10104. Thus, for any sets of key points obtained, the sets may be reduced to subsets which match each other with respect to certain preferred criteria. In particular, this includes the matching of KPs via similarity in their Descriptors, each of which is determined in a manner that is invariant under both changes in scale and in orientation. This, for example, enables the rapid screening of a large set of KPs associated with a new data set, to determine which may constitute candidate matches to a predetermined set of KPs from a prior data set.

However, the criteria may also include scale and orientation, as well as restrictions on physical location. These may be used individually or in combination to aid in finding in a new data set any combinations of KPs known to have been associated with a target coherent structure in a prior data set. As discussed further in following paragraphs, such a combination of KPs is referred to herein as a constellation, and the additional criteria are preferably applied with regard to constituent KPs of a constellation to enforce geometric constraints on the distortions in shape that could potentially occur in a target coherent structure from one instance to another (across time steps, between separate data sets).

In addition, the physical location information of KPs may in itself be used to determine coherency in a number of ways. First, the motion of matched KPs from time step to time step may be studied to determine which sets move with similar spatial deltas. Thus in certain embodiments, this information is applied to discover which KPs move coherently, and are therefore likely associated with the same coherent structure or with a coherent group of such structures.

Second, in tracking or matching of KPs across time, the motion of constituent KPs from time step to time step may be constrained by a prediction of the expected motion. This may reduce false-positive matches in certain applications by eliminating unlikely matches that jump across the simulation in unrealistically fast manner. Such predictions may be based on a mean stream-wise flow parameter and, in certain embodiments, on the recent past behavior of a chain of matched key points. Such location-based constraints provide the advantage of reducing computations by eliminating these unlikely cases in advance.

Third, the time-point to time-point motion of constituent KPs in a constellation may be constrained such that they move similarly, within a reasonable delta of divergence or convergence with one another.

As before, the result of these matching operations is that subsequent operations at block 10306 need only be carried out the small matched KP sets in order to effect further operations on the data. As indicated at block 10306, the subsequent operations are carried out on the KP sets to achieve specific end goals including the finding, discrimination, and tracking of coherent structure features of interest reliably through a fluid flow or any other such migratory medium, though the features may emerge and evolve quite dynamically.

FIG. 9(*e*) illustrates in further detail the exemplary application of FIG. 9(*d*), implemented with a modified SIFT approach adapted for suitable operation upon data taken from three dimensional, continuous migratory media. Blocks 10303-10406 of FIG. 9(*d*) are replaced in FIG. 9(*e*) with blocks 10403-10405, which more explicitly reflect the use of this modified SIFT approach in carrying out the aforementioned steps.

At Block 10403 a sparse set of KPs is determined together with a principal Scale associated each KP by applying a set of initial extrema finding analysis steps typically associated with SIFT. This is detailed further in following paragraphs. In the exemplary embodiment illustrated, the analysis is preferably applied to the scalar field associated with either P (pressure), Q (the Q-criterion), or W (the stream-wise velocity component); however, as noted above, other scalars fields may be applied in certain alternate embodiments, depending on the targeted feature type. In summary, potential KPs will be associated with extrema in a space that is indexed by the 3 spatial dimensions (x,y,z) and a fourth scale dimension (σ). These KPs are preferably then filtered based upon a local contrast criteria.

At Block 10404, within this SIFT-based embodiment, the primary orientation and descriptor are determined based upon a modified, 3D extension of the SIFT technique. Thus, the primary orientation is computed based upon examination of a 3D histogram of gradients within the so called Difference of Gaussian (DoG) space and the descriptor is determined by a 3D cube of such histograms, where the cube is rotated and aligned (on 3 axes) to the primary orientation. Again, this is addressed in more detail in following paragraphs.

Blocks 10403 and 10404 are preferably implemented in certain embodiments according to the steps illustrated in FIG. 10(*b*). Alternatively, blocks 10403 and 10404 may be implemented in certain other embodiments according to the steps illustrated in FIG. 10(*c*). To facilitate effective operation of such an algorithm in the subject applications, certain departures from conventional SIFT are necessary, as described in following paragraphs.

Figure 13:
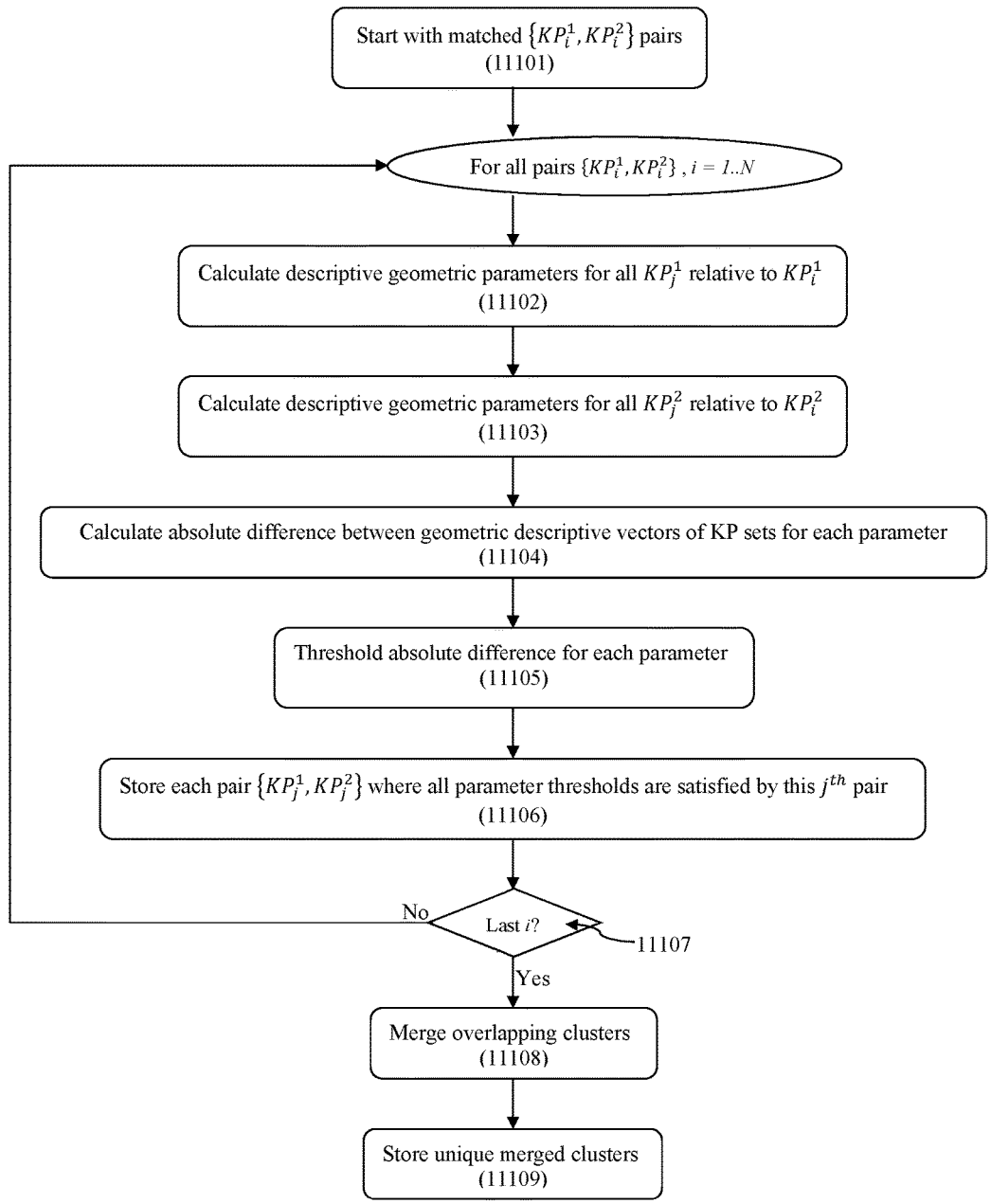
FIG. 13 illustrates a subject cluster matching process for the matching of clusters of key points ("Cluster Matching")
Figure 14:
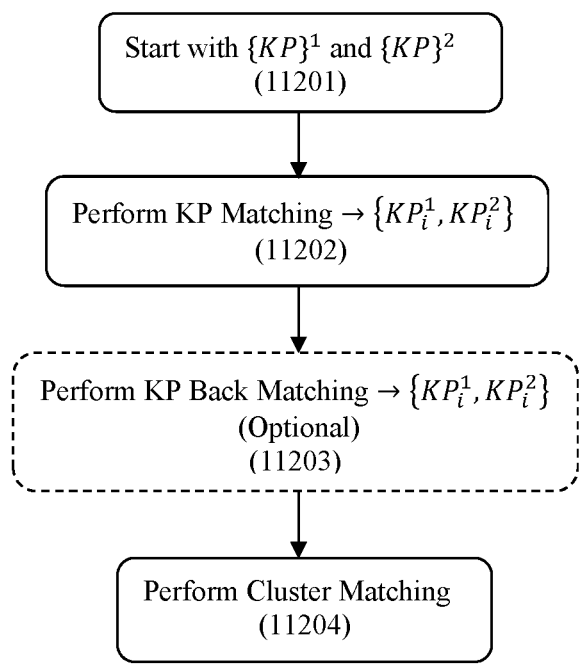
FIG. 14 illustrates a subject constellation matching process, that includes a combination of KP matching and Cluster matching stages.

At block 10405, KP matching is performed based upon the information ascertained through the previous analyses. KP matching occurs in various instances within various embodiments based upon the Descriptor, the Scale, the Orientation, and/or the Location of KPs. In addition, the full data set may be referenced again in certain instances to recover further information based upon subsets of data in the neighborhood of the KPs. Block 10405 may be implemented in various exemplary embodiments by suitable combinations of such KP matching and/or bag matching processes as illustrated in FIGS. 12(*a*), 12(*b*), 15(*b*)-1, and 15(*b*)-2, followed in some embodiments and applications by the constellation or cluster matching processes as illustrated in FIGS. 13 and 14.

Figures 2, 15B:
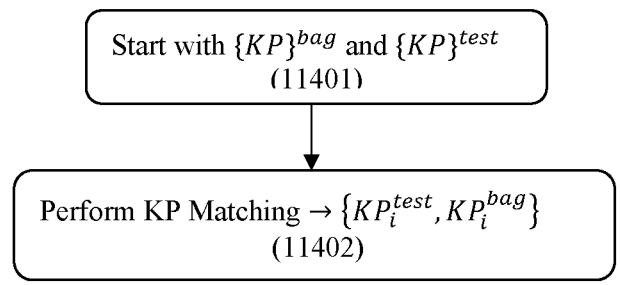

As before, the result of these matching operations is that subsequent operations at block 10406 need only be executed upon the relatively small matched KP sets to ascertain their effect on the entire data set. Block 10406 may be implemented according to various embodiments to achieve certain end goals, including the finding, discrimination, and tracking of coherent structural features of interest dynamically generated in evolving manner within a migratory medium such as flowing fluid. Examples of these embodiments are illustrated in FIGS. 15(*a*), 16, 17, 18, and 19.

The modified SIFT-based KP and Descriptor finding schemes are next described as they are preferably implemented in the exemplary embodiments illustrated herein. Thereafter, specific operations carried out on the resulting KPs and the associated data sets in various exemplary applications to achieve such objects as finding, discriminating, matching, tracking, and visualizing coherent structures within the data sets are illustratively described.

b. Adapted SIFT-Type Process for Multi-Dimensional Applications

SIFT features are generally extracted in four main steps. The first main step is to detect extrema in the scale space (L) of the given image. The scale space L of an image is created by blurring the image with Gaussian functions of different scales (all separated by a constant factor $$k = 2^{\frac{1}{3}}).$$

A Difference of Gaussians (DoG) is then constructed by subtracting consecutive scaled images as follows (where, * represents the convolution operation):

$$G(x, y, \sigma) = \frac{1}{2\pi\sigma} e^{-\frac{x^2+y^2}{2\sigma^2}}, L(x, y, \sigma) = G(x, y, \sigma) * I(x, y),$$

$$DoG(x, y, \sigma) = L(x, y, k\sigma) - L(x, y, \sigma)$$

Using this DoG space, points representing the minima or maxima are found in x and y pixel location, and also across the DoG scale dimension. The next main step is to further refine feature location down to sub-pixel accuracy using, for instance, a Taylor expansion (up to the quadratic terms) of the DoG. Additionally, features are eliminated if they exhibit low contrast (poor sensitivity) or are located on an edge (poorly localized). To eliminate features on an edge, the ratio (r) of the eigenvalues of the Hessian of the DoG must be found, and key points with, for example, r≥10 eliminated.

The next main step is to assign an orientation to each feature based on local image gradients about the location.

$$m(x, y) = \sqrt{L_x^2 + L_y^2}, \theta(x, y) = \tan^{-1}\left(\frac{L_y}{L_x}\right)$$

Preferably, an orientation histogram is constructed with, for example, 36 bins where each sample added to the histogram is weighted by its gradient magnitude and by a Gaussian-weighted circular window with a that is 1.5 times the scale of the key point. The maximal value of this histogram is found, then a parabola is fit to the 3 histogram values closest to the peak to further refine the orientation. Features may be duplicated if there are additional gradient directions at least 80% as strong as the largest gradient.

Once this information is attained, the final main step is to calculate the feature descriptor vector. This is calculated using local gradients in a 16×16 area, for example, around the feature weighted by a Gaussian with σ of 8. An 8-bin orientation histogram is preferably constructed for each 4×4 area among the 16×16 pixels in the given example. Additionally, to avoid edge effects (in the conventional 2D context), all entries into a bin are weighted by 1D for each of x, y, and θ where d is the distance of the sample from the center of the bin measured in units of histogram bin spacing (see FIG. 2). To perform object recognition the SIFT operation is carried out on both the test image and the training image, only using thereafter those features in the test image that match with the features in the training image (and the features in the training image that have a match with the features in the test image).

Clusters of features are next found to eliminate spurious matches to the background. Clusters are formed by sets of features all with the same relative orientation, scale, and pose. An object is typically considered to be successfully identified if there are at least 3 features in the final cluster. Since a cluster forms a linked graph of points in the image (x, y) space, it is sometimes referred to as a constellation. To avoid confusion as processes for migratory media are addressed, coherent structures in physical or simulation data are referred to herein as "features" while SIFT features that contribute to a cluster or constellation describing the feature are referred to herein as "SIFT component-features." These component-features are further identified with key points.

Figure 10A:
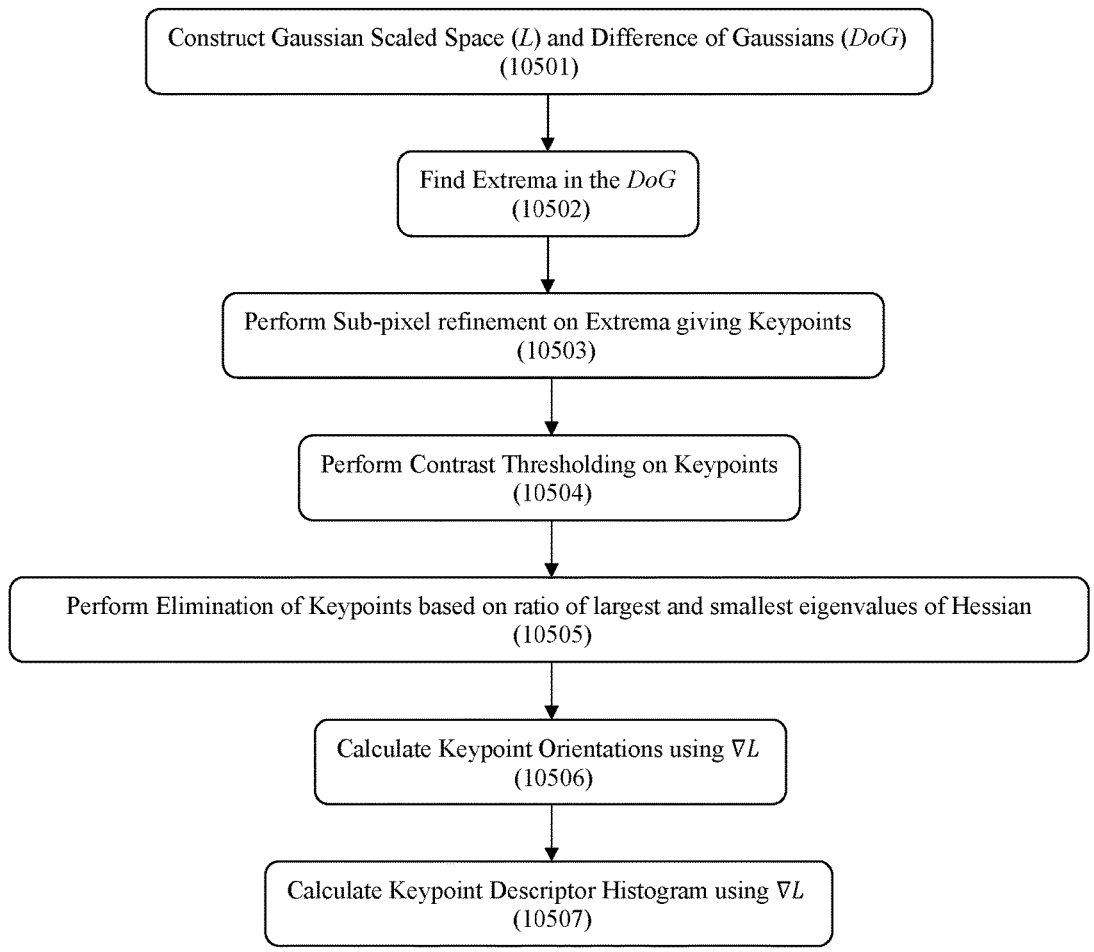
FIG. 10(a) is a flow diagram illustrating an SIFT-type process applicable to multi-dimensional spaces.
Figure 11:
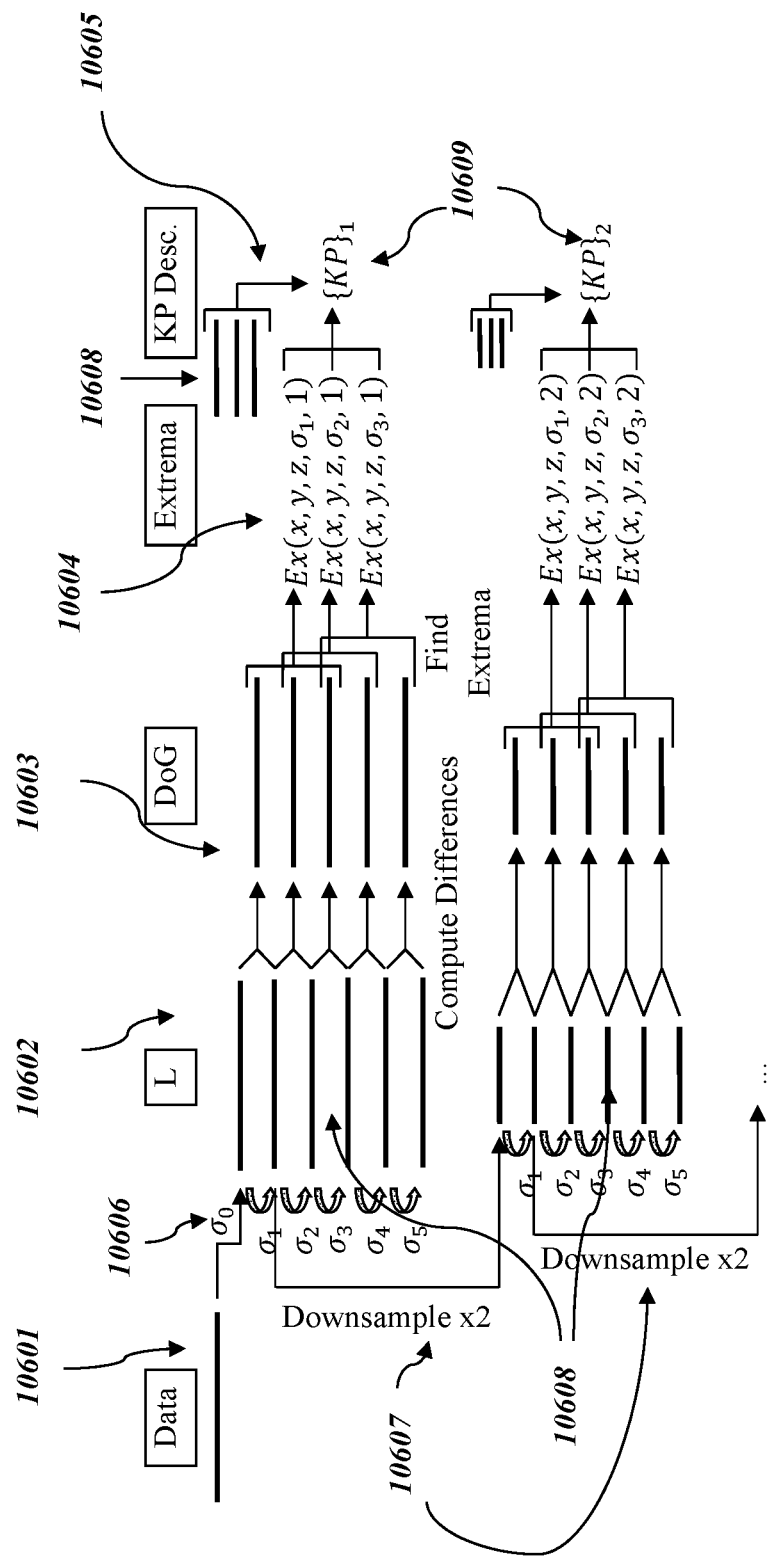
FIG. 11 illustrates schematically the iterative, multi-scale analysis components of computing SIFT L, and DoG spaces and their subsequent reduction to key points.

Turning to FIG. 10(a), the steps of an exemplary SIFT-type process as extended for 3D applications is illustrated. For various applications contemplated herein, the process is adapted and generalized to operate upon scalar fields that are indexed in more than two dimensions. The first step is the iterative construction of the Gaussian Scaled Spaces (L) along with the Difference of Gaussian spaces (DoG). The relationship between these spaces is further illustrated in FIG. 11. The Data 10601 is first blurred by convolution with a Gaussian function at block 10606 in the corresponding number of dimensions, with a predetermined scale determined by a value $G_o$. This process is repeated using a sequence of such convolutions, producing the L spaces 10602, indexed by the consecutive scales $\sigma_i$. Each pair of spaces L is subtracted point wise to obtain a corresponding DoG at block 10603. This is repeated for a predetermined number of iterations. The blurred data at a predetermined level of blurring is then down-sampled by a factor of two in all dimensions, creating a new octave of scale spaces, and the process is repeated. This iteration is repeated until a limit point, but in any case, no further than the down sampling to a single pixel. The DoG space thus has one dimension of scale in addition to the native dimensions of the raw data. So, for example, in a 3D data set, the DoG space is four dimensional indexed by (x,y,z,σ).

Working in regard to the DoG spaces, at block 10502, the process finds extrema (local minima and maxima) in this n+1 dimensional space. These extema 10604 are computed with respect to each octave. Their location within the n+1 dimensional space has been so far determined to the pixel level—that is, to the degree of resolution over which the raw data points are physically sampled. The process then at block 10503 refines these locations to a sub-pixel level, thus estimating the actual location of each extrema to the limit of machine precision even though those precise locations may not have been sampled in the raw data.

At block 10505 in the 2D SIFT process, all key points that appear to lie upon edges are eliminated. This may be accomplished by comparing eigenvalues of the Hessian of the scalar field at the key point. In two dimensions, there are only two such eigenvalues, and certain simplifying operations for bounding this ratio are well known in the art. In 3- and higher dimensions, similar operations may be applied; however, the concept of "edges" must be extended to consider discontinuities in various dimensions. Thus, in 3D applications, one may have line-like and surface-like discontinuities, and in higher dimensions, hyper-planer discontinuities become applicable. The process at block 10505 may in certain cases reasonably be modified, to eliminate all key points that lie on higher-dimensional discontinuities. This would be in keeping with the teaching of SIFT image processing for 2D applications, wherein the goal is to retain only those KPs that are isolated extrema points (i.e., not on edges) and therefore more stable with respect to finding them again.

Figure 10B:
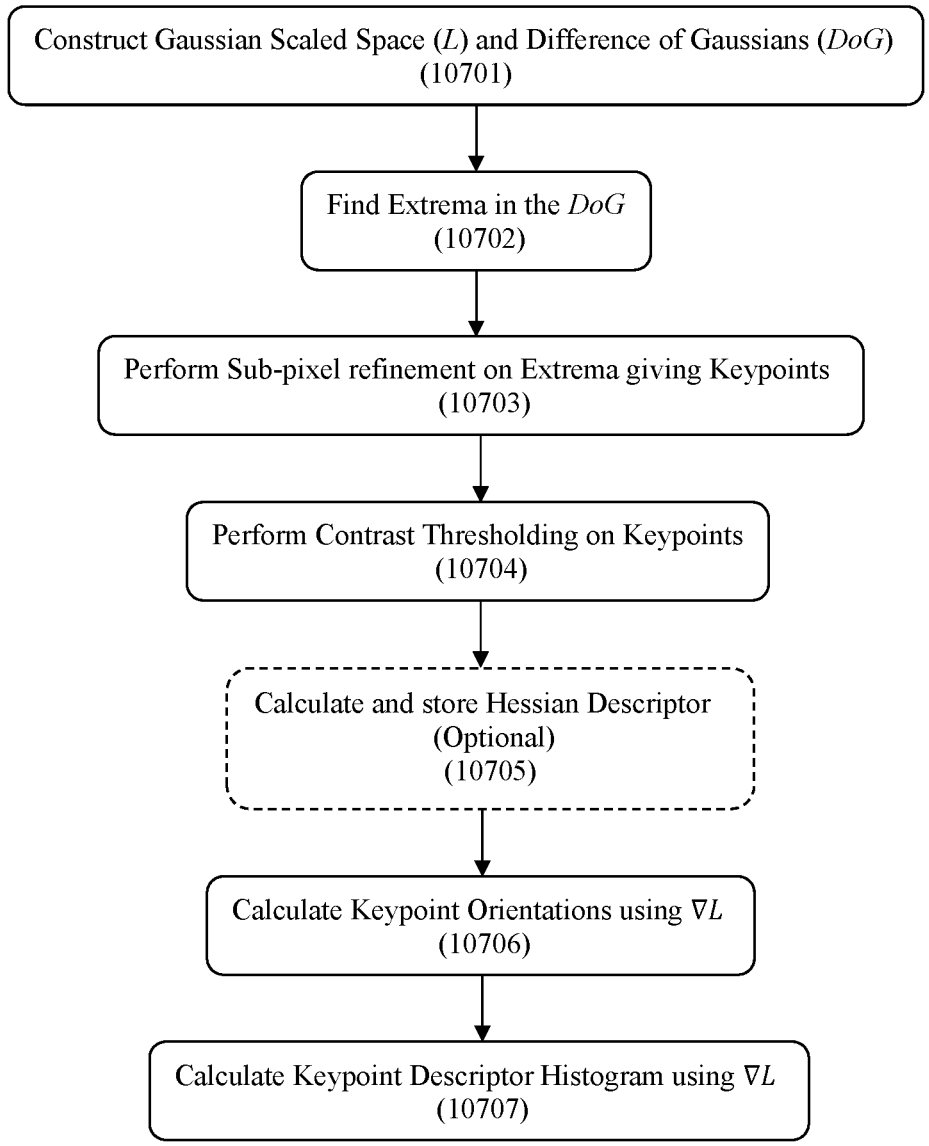
FIG. 10(b) illustrates a first modified SIFT analysis used within our example embodiments.

However, within the higher dimensional target applications contemplated herein, elimination of KPs associated with these linear or surface like discontinuities tend to be desirable since these often correspond to precisely the coherent structures of interest. Were they to be eliminated, the resulting set of KPs derived from a smooth, continuously deforming media may be so sparse as to be useless for the purposes intended. Thus, in the modified SIFT process applied in various embodiments disclosed herein, such as illustrated in FIG. 10(b), this step is removed or replaced with block 10705 that records an additional Hessian based descriptor but does not automatically eliminate the subject key points.

Returning to FIG. 10(a), at block 10506, the process next calculates a primary orientation at each KP by examining the gradient ∇L. It then calculates at block 10507 a Key Point descriptor using a histogram over ∇L in the region around the key point.

In the exemplary embodiments illustrated, all steps in FIG. 10(a) are suitably extended to a 3D field of scalar values. The orientation assignment and the feature descriptor vector steps must be modified for extension in this regard to a 3D field. In the 2D case, orientation must span only one dimension, whereas in the 3D case, orientation must span two. Consequently, the magnitude and the theta and phi angle of the gradient are calculated as follows:

$$m_{3D}(x, y, z) = \sqrt{L_x^2 + L_y^2 + L_z^2}, \theta(x, y, z) = \tan^{-1}\left(\frac{L_y}{L_x}\right),$$

-continued $$\phi(x, y, z) = \tan^{-1}\left(\frac{L_z}{\sqrt{L_x^2 + L_y^2}}\right)$$

Instead of calculating a histogram of the magnitudes for the gradient at different orientation bins, a 2D histogram must be constructed now of the magnitudes for both dimensions of orientation. Additionally, compensation must be made for the fact that the overall area of a bin changes as a function of that bin's orientation. To compensate, each bin is normalized by its solid angle:

$$\omega = \int_\phi^{\phi+\Delta\phi} \int_\theta^{\theta+\Delta\theta} \sin(\theta) d\theta d\phi = \Delta\phi \int_\theta^{\theta+\Delta\theta} \sin(\theta) d\theta$$

$$= \Delta\phi[-\cos(\theta)]_\theta^{\theta+\Delta\theta} = \Delta\phi(\cos(\theta) - \cos(\theta+\Delta\theta))$$

The actual value added to each bin of the histogram is calculated from the following, where (x,y,z) represents the histogram center and (x',y',z') represents the location of the pixel being added:

$$hist(i_\theta, i_\phi) \mathrel{+}= \frac{1}{\omega} m_{3D}(x', y', z') e^{-\frac{(x-x')^2 + (y-y')^2 + (z-z')^2}{2\sigma^2}}$$

Each feature is now located by its position (x,y,z), its scale, and its orientations (θ,φ). To compute the new feature descriptor vector, the neighborhood is first rotated such that θ=φ=0. To do this, each (x,y,z) position is multiplied by the following matrix:

$$\begin{bmatrix} \cos\theta\cos\phi & -\sin\theta & -\cos\theta\sin\phi \\ \sin\theta\cos\phi & \cos\theta & -\sin\theta\sin\phi \\ \sin\phi & 0 & \cos\phi \end{bmatrix}$$

Orientation histograms of image gradients are created and vectorized to obtain the feature descriptor vectors. A 4D extension may be similarly constructed, which would allow one to encapsulate the time evolution of a 3D structure in a SIFT feature.

The remaining limitation in applying the expansion into 3D and to computational fluid dynamics (CFD) simulations is that the data generated within such simulations no longer comprises a scalar field. Each point in the 3D spatial field may, for example, keep track of velocity (a 3-vector) and pressure (a scalar). There are several options for converting these values into usable scalar quantities. One may use natural scalars alone, such as pressure. One may also reduce the velocity to a scalar either considering its magnitude or a collection of scalars by processing each component individually. These treatments have been discussed above. While research has examined use of the RGB color bands and their application to SIFT features, a significant distinction bearing on the application is that 3D component velocities are not independent variables in the manner of RGB bands, but rather inherently linked with one component velocity trading off into the other.

In certain alternate embodiments of the subject system and method, feature recovery work is based on abstracted calculated values that have been used in visualizing and exploring CFD data. For example, the second invariant of the velocity gradient tensor is a natural scalar value that may encapsulate many of the features of interest in a way that may be exploited using suitable adaptations of SIFT. In certain other alternate embodiments, combinations of scalar and vector fields are used in this regard.

Figure 6:
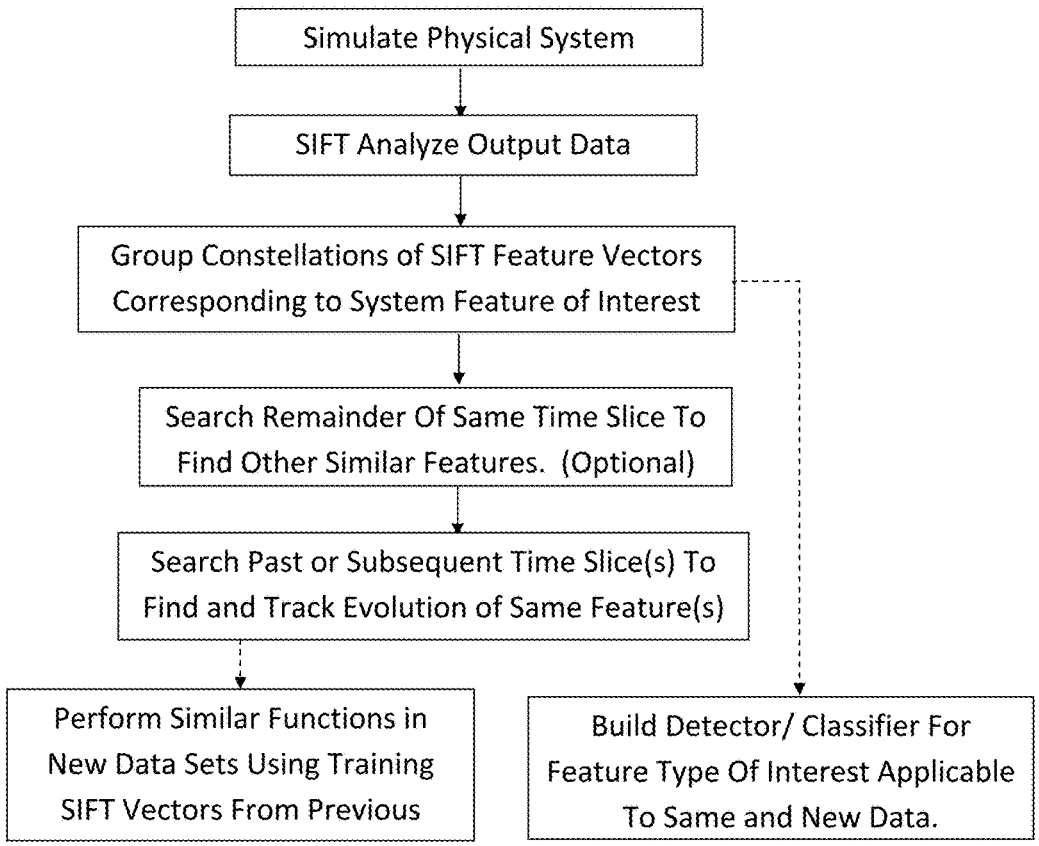
FIG. 6 is a flow diagram illustrating a progression of general processing steps in an exemplary embodiment of the present invention for efficiently tracking an evolving feature across data sets or time slices thereof.

Thus, as illustrated in the exemplary application of FIG. 6, one may (for example) analyze the output of a simulation (for instance a flow field of a fluid) in-terms of suitably adapted SIFT features. Constellations are then grouped corresponding to one or more target features such as a vortex of interest or the like may be found, and a search applied to the remainder of the data set at one time slice to find similar features (e.g., vortices) at different locations and/or scales. A search of subsequent time slices is then made as necessary to find the same features even where they have dynamically evolved to change orientation, scale, or intensity. Each such feature is thereby traced through time, feature matching to automatically follow the fluid dynamics, much as a human expert observer would in analyzing the flow. In accordance with certain aspects of the present invention, such time-to-time automatic tracking is made possible even on massive scale data, in a manner that no human expert could reasonably muster. As illustrated, one may also use the resulting information to build a detector and/or tracker that finds and follows similar features in new data sets.

In certain alternate embodiments, one may consider features that span time. For example, certain features of interest may be differentiated from other very similar features not necessarily by their static characteristics in one time-slice, but rather precisely by their evolution over time. Thus, the extension of SIFT to higher dimensions contemplates the possibility of detecting features that span a section of data that includes a time dimension. It will be apparent to those skilled in the art, that there need not be any particular differentiation in the spatial vs. time dimensions of the data set. Thus, if an adapted SIFT analysis is performed, which includes DoG layers spanning a time dimension, a searchable database of feature descriptors is established, allowing one to exclusively find those features behaving (up to a scale factor) similarly in space and time evolution. Consequently, the subject system and method may be employed to easily differentiate, for example, standing, near steady-state flow structures from smoothly evolving, periodic, or other such transient data structures—even where such structures appear superficially similar at a particular time slice.

FIG. 10(b) illustrates a preferred modified SIFT scheme incorporated in one exemplary embodiment of the present invention, which finds key points (KPs) and generates descriptors in a manner that supports the target applications. As discussed above, one departure from conventional SIFT approaches is found in the optional step at block 10705 where KPs are not explicitly eliminated based on their edge-like behavior. Instead (in certain embodiments), a Hessian Descriptor is preferably recorded, comprising a set of eigenvalues or an equivalent figure of merit recognized in the art to aid in estimation of the same properties. In certain embodiments, KPs are then eliminated from consideration based upon the type(s) of structures that are of interest in the intended application. Where this information is recorded, in certain embodiments, it is instead applied later to dynamically filter KPs down to sets that will correspond to features of interest.

As an example, in finding vortices based upon a P (pressure) scalar field, note that many KPs will appear along vortex core lines. In such embodiments, it is preferable not to eliminate "edge-like" KPs, since linear structures such as core lines comprise one meaning of "edge-like" in a 3D setting. Likewise, certain features such as sheer layers or shocks may be consistent with surface-like edges within the data.

In order to make more explicit the steps described, the mathematical calculations involved in addressing this KP finding and subsequent orientation and descriptor calculations in the 3D amorphous field setting are detailed.

DoG Construction:

For the first octave o=0, compute:

$$L(x,y,z,\sigma_1,0)=\text{data}(x,y,z)*g(x,y,z,\sigma_0).$$

Then, iterate for each octave o, downsample the previous octave by 2, $$L(x,y,z,\sigma_1,o)=L(ds(x),ds(y),ds(z),\sigma_2,o-1),$$

where $ds(\alpha)=2\cdot(\alpha-1)+1$. For each scale $\sigma_i$ within each octave o, compute, $$L(x,y,z,\sigma_i,o)=L(x,y,z,\sigma_{i-1},o)*g(x,y,z,\sigma_i)$$

and set, $$\text{DoG}(x,y,z,\sigma_i,o)=L(x,y,z,\sigma_{i+1},o)*g(x,y,z,\sigma_i,o).$$

In these equations take, $$g(x, y, z, \sigma) = \frac{1}{8\cdot\pi^{\frac{3}{2}}\cdot\sigma^2}\cdot e^{-\frac{(x-x_0)^2+(y-y_0)^2+(z-z_0)^2}{2\cdot\sigma^2}}$$

and, o indicates the current octave (starting at 0, and going up until there are fewer than 3 pixels in any dimension of the downsampled space), i indicates the current scale inside the octave, $(x_0,y_0,z_0)$ is the center of the Gaussian space, the function $ds(\alpha)$ represents the downsampling function, and * represents the convolution operation. Note that this Gaussian function satisfies the condition that $\Sigma_{x,y,z}g(x,y,z,\sigma)=1$.

Key Point Elimination:

Based upon the location of the key points, calculate a contrast value at that point (indexed as subscript "kp"):

$$\text{contrast}_{kp}=\text{DoG}(x_{kp},y_{kp},z_{kp},\sigma_{kp},o_{kp})+0.5\cdot\langle \hat{x}, \nabla(\text{DoG}(x_{kp},y_{kp},z_{kp},\sigma_{kp},o_{kp}))\rangle,$$

where the $\hat{x}$ is the subpixel offset vector, the gradient operator operates only on $(x,y,z,\sigma)$, and the inner product is defined as follows $\langle A,B \rangle = \Sigma_i A_i \cdot B_i$. Typically low contrast key points are close to the noise floor of the data and therefore unstable, so within the preferred embodiment a threshold value is determined with which to eliminate key points of low contrast.

Key Point Orientation Calculation:

Each $i^{th}$ key point has a position $(x_i,y_i,z_i)$, a scale $\sigma_i$, and an octave $o_i$. The 3D orientation of the key point is found in order to calculate its descriptor properly. To compute the orientation of a key point the gradient of L in a window around the key point is obtained. One may calculate the azimuth $(\theta_i)$ and elevation $(\phi_i)$ angle of the key point simultaneously. One may then calculate the roll $(\psi_i)$ angle relative to that rotated space. Note that while $\theta$ and $\psi$ are defined from $-180°$ to $180°$, the angle is only defined from $-90°$ to $90°$ in order to retain unique orientation values within the modulo spaces. The spherical gradient is calculated at the key point, and a weighted 2D histogram of $(\theta,\phi)$ angles is computed, using the radial gradient, a Gaussian weight based on distance from the key point, and the solid angle of the histogram bin to weight each entry. Next, peaks in the 2D orientation histogram that are above a predetermined percent of the maximum histogram value are determined. A key point is created for each orientation above this peak discovered. Thus, one key point location as determined by the extrema analysis may become multiple co-located key points which reflect different orientations. For each such key point, the window is rotated to align the x axis with its orientation and calculate $\psi$. A weighted histogram is again constructed, again using the radial gradient and a Gaussian weighting based on distance from the key point. Peaks are again found in this weighted histogram that are within 80% of the maximum, and an improved continuously-valued final orientation value is estimated by fitting the peak and its two neighbor points against a parabola. The contributing calculations may be written as follows. Let, $$\frac{\partial L(x,y,z,\sigma_z,o_i)}{\partial r} = \sqrt{\left(\frac{\partial L(x,y,z,\sigma_i,o_i)}{\partial x}\right)^2 + \left(\frac{\partial L(x,y,z,\sigma_i,o_i)}{\partial y}\right)^2 + \left(\frac{\partial L(x,y,z,\sigma_i,o_i)}{\partial z}\right)^2}$$

and compute for each $(\theta,\phi)$, $$\text{weight}_{\theta\phi}(x,y,z) = \frac{\partial L(x,y,z,\sigma_z,o_i)}{\partial r}\cdot g(x,y,z,1.5\sigma_i)\cdot\omega(\theta,\phi).$$

Let $$\frac{\partial L'(x,y,z,\sigma_z,o_i)}{\partial \rho} = \sqrt{\left(\frac{\partial L'(x,y,z,\sigma_z,o_i)}{\partial y}\right)^2 + \left(\frac{\partial L'(x,y,z,\sigma_z,o_i)}{\partial z}\right)^2}$$

and compute for each $\psi$ in the $(\theta,\phi)$ rotated Gaussian Scaled Space, $$\text{weight}_{\psi}(x,y,z) = \frac{\partial L'(x,y,z,\sigma_z,o_i)}{\partial \rho}\cdot g(x,y,z,1.5\sigma_i)$$

In these equations take, $$g(x, y, z, \sigma) = \frac{1}{8\cdot\pi^{\frac{3}{2}}\cdot\sigma^2}\cdot e^{-\frac{(x-x_i)^2+(y-y_i)^2+(z-z_i)^2}{2\cdot\sigma^2}}$$

and $w(\theta,\phi)=|\Delta\theta\cdot(\sin(\phi)-\sin(\phi+\Delta\phi))|$.

$(x_i,y_i,z_i,\sigma_i,o_i)$ indicate the coordinates of the $i^{th}$ key point, $(\Delta\theta,\Delta\phi)$ are the sizes of the $(\theta,\phi)$ histogram bins expressed in radians, and is the Gaussian Scaled Space at the scale and octave of the $i^{th}$ key point rotated such that the x axis corresponds with the $(\theta,\phi)$ orientation of the key point.

Key Point Descriptor Calculation:

A window is defined around the key point and reoriented so that the data space is aligned with the orientation of the key point. The descriptor in this example is a 5D weighted histogram with dimensions $(x,y,z,\theta,\phi)$. The weight of each entry into the histogram is a combination of a Gaussian centered on the key point, a bin neighbor weighting, and the radial derivative. In recording the descriptor, it is linearized so that it becomes, for example, a 1 by 2048 vector, and normalize. More explicitly, in the example embodiment the following is computed, $$\text{weight}_{x,y,z,\theta,\phi}(x,y,z,\theta,\phi) =$$

-continued $$g_2(x, y, z, \sigma_{desc}) \cdot 4 \frac{\partial L''(x, y, z, \sigma_i, o_i)}{\partial r} \cdot nbr_{\check{x},\check{y},\check{z},\check{\theta},\check{\phi}}(x, y, z, \theta, \phi)$$

where, $$nbr_{\check{x},\check{y},\check{z},\check{\theta},\check{\phi}}(x, y, z, \theta, \phi) =$$

$$w(x, \check{x}, 4) \cdot w(y, \check{y}, 4) \cdot w(z, \check{z}, 4) \cdot w\left(\theta, \check{\theta}, \frac{2\pi}{8}\right) \cdot w\left(\phi \cdot \check{\phi}, \frac{\pi}{4}\right)$$

$$w(x, \check{x}, x_{binsize}) = 1 - \left|\frac{(x-\check{x})}{x_{binsize}}\right|$$

$$R = \begin{bmatrix} \cos\theta_i \cdot \cos\phi_i & -\sin\theta_i & -\cos\theta_i \cdot \sin\phi_i \\ \sin\theta_i \cdot \cos\phi_i & \cos\theta_i & -\sin\theta_i \cdot \sin\phi_i \\ \sin\phi_i & 0 & \cos\phi_i \end{bmatrix}, \sigma_{desc} = 2 \cdot \sqrt{\sum_{j,k} (4R_{jk})^2}$$

and $$g_2(x, y, z, \sigma) = \frac{1}{2 \cdot \pi \cdot \sigma^2} \cdot e^{-\frac{((x-x_i)^2+(y-y_i)^2+(z-z_i)^2)}{2\sigma^2}}.$$

The process then computes the descriptor histogram bins $D_i(\check{x},\check{y},\check{z},\check{\theta},\check{\phi})$ for the $i^{th}$ key point by, $$D_i(\check{x},\check{y},\check{z},\check{\theta},\check{\phi}) = \Sigma_{xyz\theta\phi} weight_{\check{x},\check{y},\check{z},\check{\theta},\check{\phi}}(x,y,z,\theta,\phi)$$

and normalize.
In these equations, key point information is denoted as $(x_i,y_i,z_i,\sigma_i,o_i,\theta_i,\phi_i,\psi_i)$, the triplet $(x,y,z)$ indicate the coordinates of a pixel, the angles $(\theta,\phi)$ indicate the angular components of the spherical gradient at the pixel, the coordinates $(\check{x},\check{y},\check{z},\check{\theta},\check{\phi})$ indicate the bin location, R is the rotation matrix.

Figure 10C:
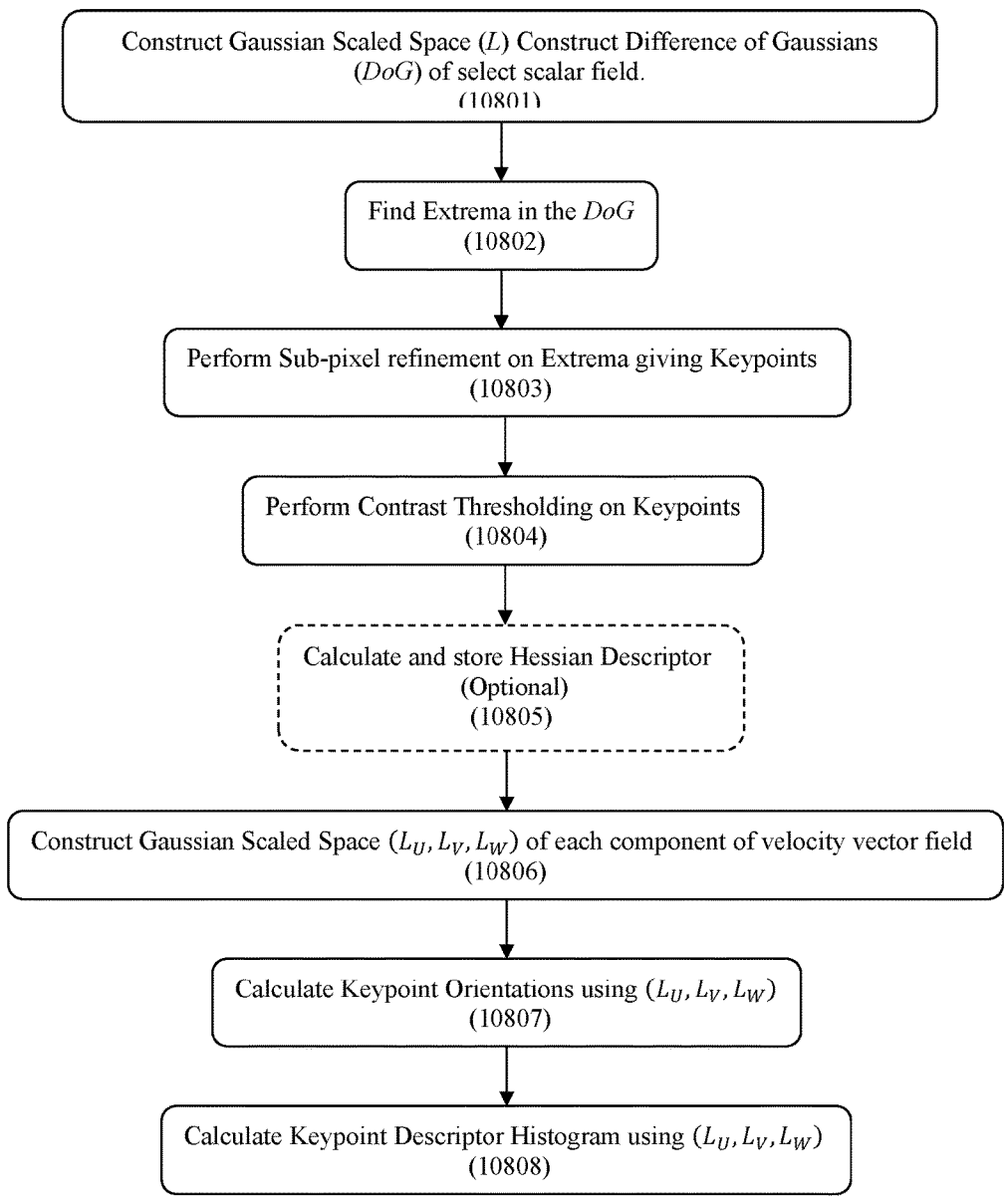
FIG. 10(c) illustrates a second modified SIFT analysis used within our example embodiments, which considers vector as well as scalar components of the underlying source data sets.

FIG. 10(c) illustrates a modified SIFT scheme incorporated in an alternate embodiment, which enables consideration of both the primary scalar field and an associated vector field within a data set jointly. This is yet another significant departure from conventional SIFT approaches used in image processing type applications.

For purposes of illustration, the selected scalar field is defined according to P (pressure) or Q (the Q-criterion). At blocks 10801 to 10804, and optionally at 10805, the operation is as in the embodiment of FIG. 10(b). However, in block 10806, an additional vector field is introduced that is independent of the scalar filed, but otherwise linked via the original source data space.

In this example, a (u,v,w) velocity vector field is presumed. A Gaussian Scaled Space is constructed for each of these components, much as for a single scalar. Rather than operating on gradients of a scalar field, however, the vector $(L_U,L_V,L_W)$ is used at each KP in order to estimate the KP orientation, and the KP descriptor is respectively calculated using the space of $(L_U,L_V,L_W)$ around the KP rather than the gradients of L of the scalar space.

Mathematically, the following substitutions are made:

$$\frac{\partial L(x, y, z, \sigma_i, o_i)}{\partial x} \rightarrow L_U(x, y, z, \sigma_i, o_i)$$

$$\frac{\partial L(x, y, z, \sigma_i, o_i)}{\partial y} \rightarrow L_V(x, y, z, \sigma_i, o_i)$$

-continued $$\frac{\partial L(x, y, z, \sigma_i, o_i)}{\partial z} \rightarrow L_W(x, y, z, \sigma_i, o_i)$$

where L is the Gaussian scale space of the original scalar data, while $L_{UVW}$ is the Gaussian scale space of the specified component of the velocity field. Note that coordinates are treated in the same way as before, but substituting the new $L_{UVW}$ for the gradient of the scalar L space.

By implementing these steps 10807 and 10808, vector information from the original data is incorporated into the follow-on KP operations. This has the advantage of allowing, for example, all variables in compressible CFD (p, u, v, w) to be considered at once.

This is but one example of such cross-incorporation of data elements that are linked in the original data. In other embodiments/applications, additional variables may be used from the data in combination. Also, one scalar field (e.g., P) may be incorporated to find key points while using another (e.g., Q) to find descriptors.

Figure 9D:
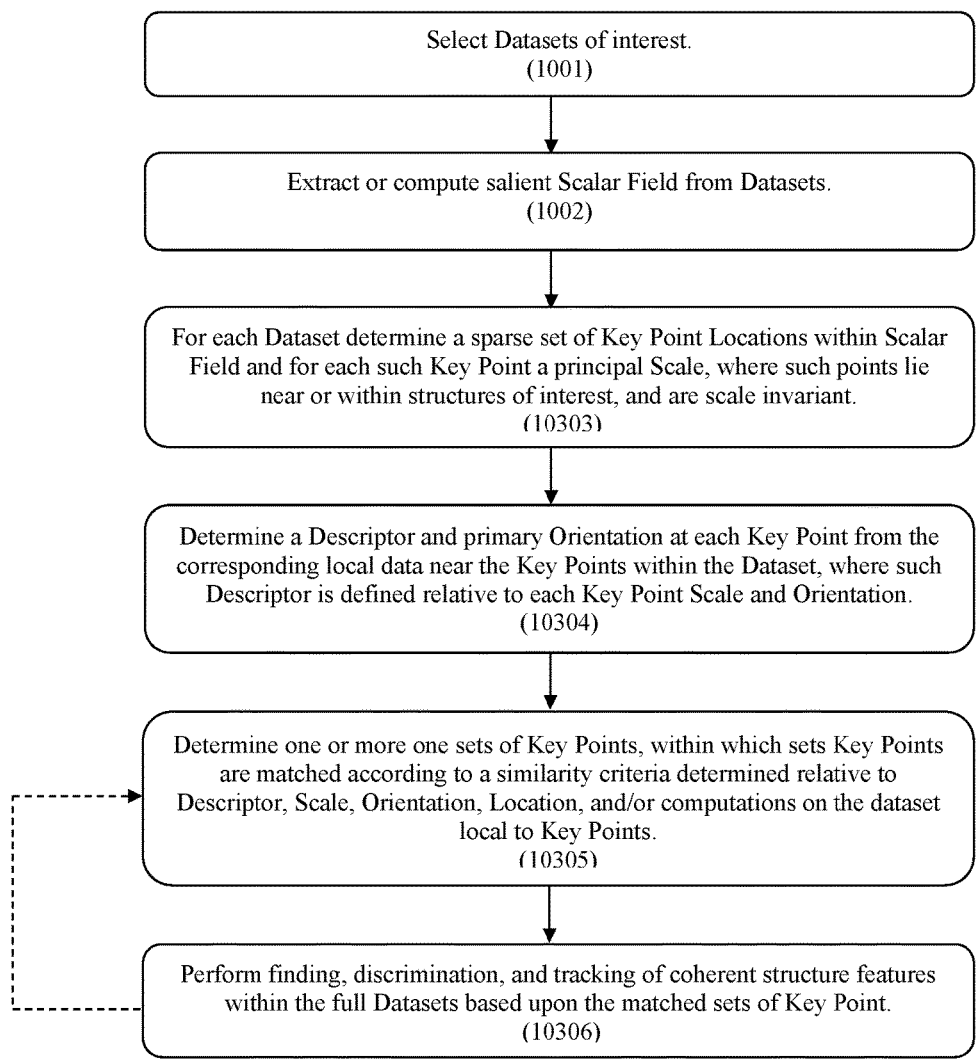
FIG. 9(d) is a flow diagram illustrating a progression of general processing steps in an exemplary embodiment of the present invention much as shown in FIG. 9(c), with more specific requirements on certain of the steps.
Figure 9E:
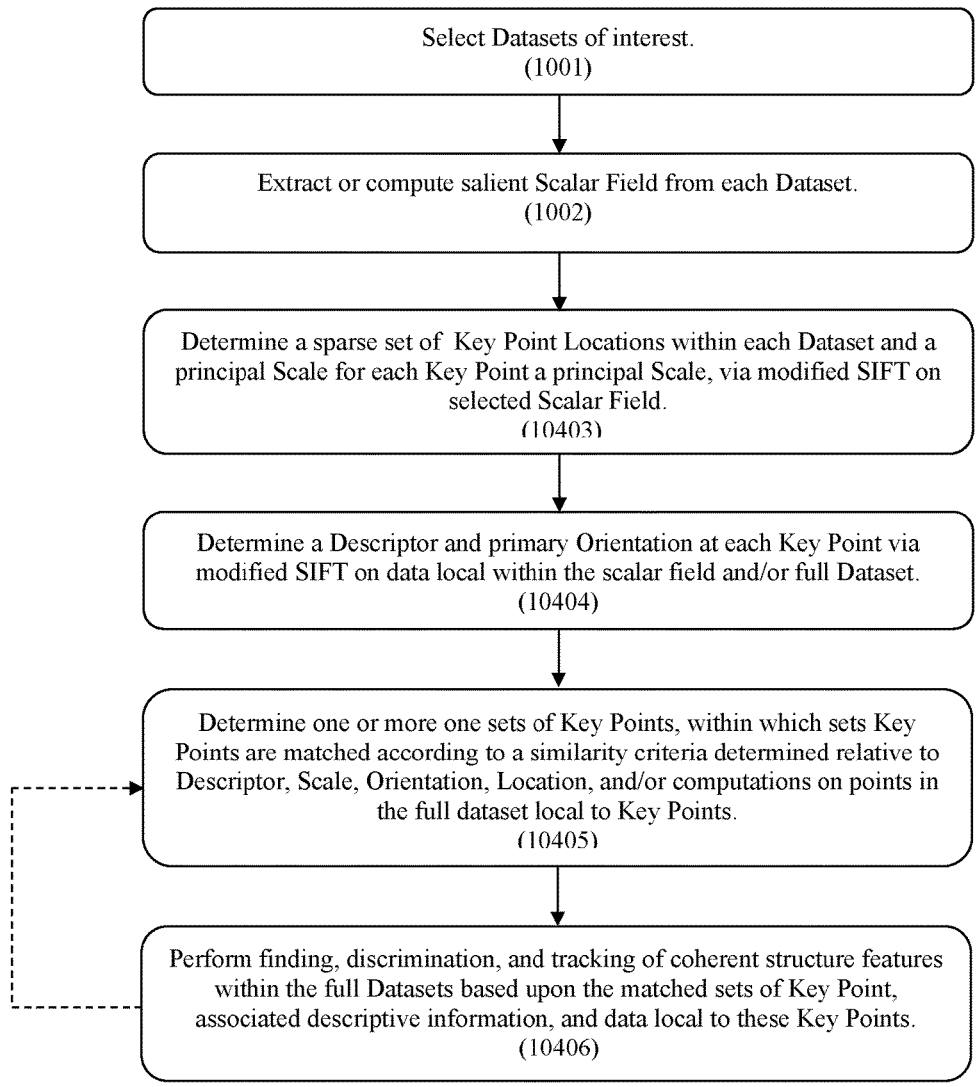
FIG. 9(e) is a flow diagram illustrating a progression of general processing steps in an exemplary embodiment of the present invention much as shown in FIG. 9(d), incorporating modified scale invariant feature transforms (SIFT)
Figure 12A:
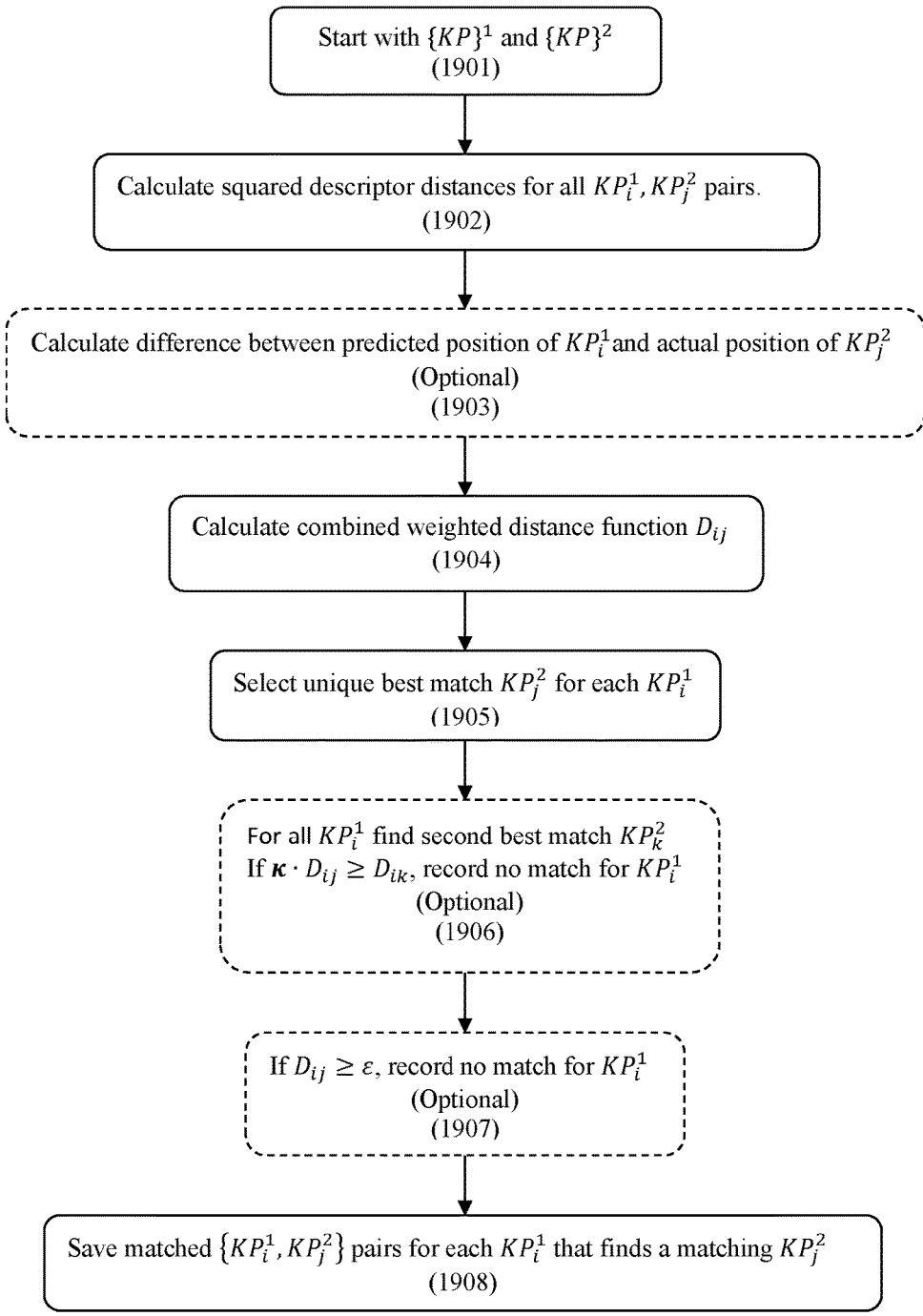
FIG. 12(a) illustrates key point to key point matching process ("KP matching"), as modified to address the subject embodiments.

FIG. 12(a) illustrates one exemplary embodiment of a matching operation (c.f., block 10405 in FIG. 9(e)) which may be employed in the subject system and method. Starting at block 1901 with two sets of KPs $\{K[\![P]\!]\}^1$ and $\{K[\![P]\!]\}^2$ that have been derived from either the same or different data sets as previously described (c.f. FIG. 10(b) or FIG. 10(c)). In this embodiment, a square Euclidian distance is calculated based upon the descriptor vectors for each $i^{th}$ and $j^{th}$ KP from the respective sets. (Other distance norms may be applied in other embodiments.) Optionally, at block 1903, the sum of the squared difference between a predicted position $(x_i,y_i,z_i)$ for $KP_i^1$ and the actual position $(x_j,y_j,z_j)$ of $KP_j^2$ is calculated. The terms in this sum may be weighted so as to adjust the balance between positional and descriptor based similarity, and these are combined into a single measure distance for each such KP pair.

To understand the positional aspect, consider the case of matching KPs from one time frame to the next. Assume one is trying to locate $KP_i^1$ from a first time frame within a large collection of KPs $\{K[\![P]\!]\}^2$ in a second time frame. The positional aspect is used to weight the matching of KPs so that those appearing in the second time frame closest to the predicted location $KP_i^1$ are preferred over those otherwise similar KPs appearing further away from that position. In some instances, the predicted location change might be zero.

As noted, the weighting may be adjusted. In the extreme, the weighting may be adjusted to heavily favor either position or descriptor matching and ignore the other.

At block 1905, the unique best match for $KP_j^2$ is found for each $KP_i^1$. Where this choice is not unique, any suitable means may be employed, including random choice, to break the tie. Note that in certain embodiments, one may replace the unique best match with a list of matches for each KP below a certain distance threshold and work through them to resolve a preference. However, step 1905 is employed since the goal here is to minimize computational requirements in preference to maximizing the exploration of matches. Step 1906 introduces a further optional step, which comprises testing that each "best" match is sufficiently better than any second best match. The parameter K sets this ratio. Under this optional step, no match is recorded for any KP that does not meet the test, reflecting the judgment that the match is not sufficiently unique to operate with confidence in any follow on steps.

Block 1907 is an optional step in which to compare the final $D_{ij}$ to a threshold $\epsilon$, recording no match for KPs that fail this test. Again, the rationale is that matches which are poorer in an absolute sense than the limit established are of sufficiently low confidence that they should be discarded in follow-on steps.

Having completed the matching, in step 1908, a list of matched pairs $\{KP_i^1, KP_j^2\}$ is saved for each each $KP_i^1$ that finds a matching $KP_j^2$ with respect to the criteria established. Note here that the forward match is one-to-one. That is, each $KP_i^1$ has either one "best" match or no matches. However, the converse is not true, since multiple $KP_j^2$ may be matched to the same $KP_i^1$.

Figure 12B:
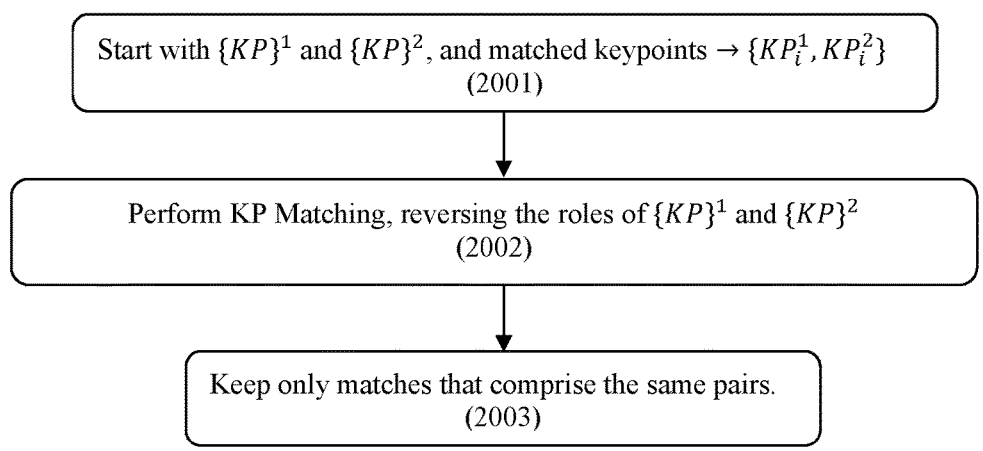
FIG. 12(b) illustrates a back-matching step used within certain subject embodiments to enhance key point to key point matching process.

In certain embodiments of matching for exemplary applications described herein, this is not desirable; therefore, the reverse condition may be enforced using the process illustrated in FIG. 12(b). That process begins with forward matched key points as described at block 2001. At block 2002, the roles of the two KP sets are reversed, and a best match for each $KP_j^2$ is found. Then, at block 2003 only those matches within the list that have been identified as best in both the forward and reverse directions are retained.

We note that the implementation shown in these figures is for purposes of elucidation, and actual computational implementations may be varied as required from the explicit pattern shown in order to optimize an algorithm for a particular architecture or situation.

FIG. 13 illustrates the further matching of sets of KPs to find matched clusters based on geometric aspects of their configuration. This again is an aspect of matching used to link one set of key points to another (c.f., block 10405 in FIG. 9(e)) for purposes of matching structural features or further operations such as tracking, while operating on reduced subsets of KPs.

At block 11101, the process starts with lists of matched KPs as established, for example, by the processing detailed in FIG. 12(b). The flow proceeds to consider each $KP_i$ in these pairs, and for each of these, geometric parameters of each other $KP_j^1$ in the same KP set are calculated relative to each $KP_i^1$ in a pair. Such geometric parameters may entail any measure of the relative locations or relative shape of potential constellations within this set, including distances between KPs, angles formed by lines between KPs, angles between sets of KPs, various norms over sets of KPs, and so forth, without loss of generality. Preferably, the absolute difference $|x_j - x_i|$ for all spatial dimensions (e.g., x, y, z, etc.) is taken to implement the geometric parameters. The set of geometric parameters over which to calculate these differences results in a descriptive vector of geometric differences for each KP with a set relative to each other KP within a set. At block 11103, the same calculations are made for all $KP_j^2$ relative to $KP_i^2$ in the pair.

The process at block 11104 then computes the absolute difference of each parameter term within the geometric descriptive vector from one set of KPs to the other. The process next thresholds this absolute difference in block 11105, storing (block 11106) only those pairs $\{KP_j^1, KP_j^2\}$ where all geometric parameter differences satisfy their respective thresholds.

The result at block 11106 is that for each $i^{th}$ pair in the original KP set, the process has constructed a list of other KPs that move coherently with that pair of key points from the set $\{K[\![P]\!]\}^1$ to the set $\{K[\![P]\!]\}^2$. This list of coherently matching pairs enumerates two matched clusters, one with in the set $\{K[\![P]\!]\}^1$ and the other with the set $\{K[\![P]\!]\}^2$.

The process at Block 11107 checks for completed operation over all i, otherwise operation proceeds on the remaining set.

At this stage, the process has formed a list of each pair of KPs whose geometric relationship remains consistent from the set of KPs on the left of the $\{KP_i^1, KP_j^2\}$ to the set of KPs on the right of this list. At block 11108, the process then merges any clusters that overlap—that is, which share at least one common KPs. Finally, at block 11109, the process stores the unique merged clusters of KPs. The process has thus reduced a list of pairs of matched KPs to a list of matched clusters of KPs.

FIG. 14 combines the KP matching (cf. FIGS. 12(a)-(b)) and cluster matching (c.f. FIG. 13) into an operation referred to herein as constellation matching. The steps proceed in the previously described order, at block 11201 starting with the two selected KP sets and performing KP matching between target KP sets of interest at block 11202. At block 11203, the process optionally performs the back matching step. At block 11204, the process performs the cluster matching described on the remaining sets of matched KPs.

Turning now to the application of the matched sets of KPs with respect to blocks 10406 and 13406 in such embodiments as illustrated in FIGS. 9(d) and 9(e), FIG. 15(a) illustrates an exemplary embodiment of a tracking process for features within the full data by means of KP constellations. The process begins by defining a set of KP collections, indexed from 1 ... N. In the exemplary embodiment shown, each of these sets to be those KPs may be generated by analysis via a process consistent with FIG. 10(b) for the data $(x, y, z, t_d)$ associated with each $d^{th}$ time slice of the data. The process identifies a set $\{K[\![P]\!]\}_{feature}^1$ of KPs associated with a feature structure of interest. This can be done manually or by automatic means as described below.

The process next proceeds to match this constellation forward to each successive frame. Thus, for all d=1 to N−1, at step 11303 constellation matching is performed from $\{K[\![P]\!]\}_{feature}^d$ into the full set $\{K[\![P]\!]\}^{d+1}$ in order to find a best constellation match $\{K[\![P]\!]\}_{feature}^{d+1}$ in the next frame. The process repeats this until the constellation has been traced from the first time frame to the last.

The process may then optionally apply a step that back-restricts the KP sets at each d to only those that have been matched through to the last step N. This, as shown at block 11304, is a relatively conservative way of ensuring that only those KPs which persist in their association are treated as members of the tracked constellation.

Figure 2:
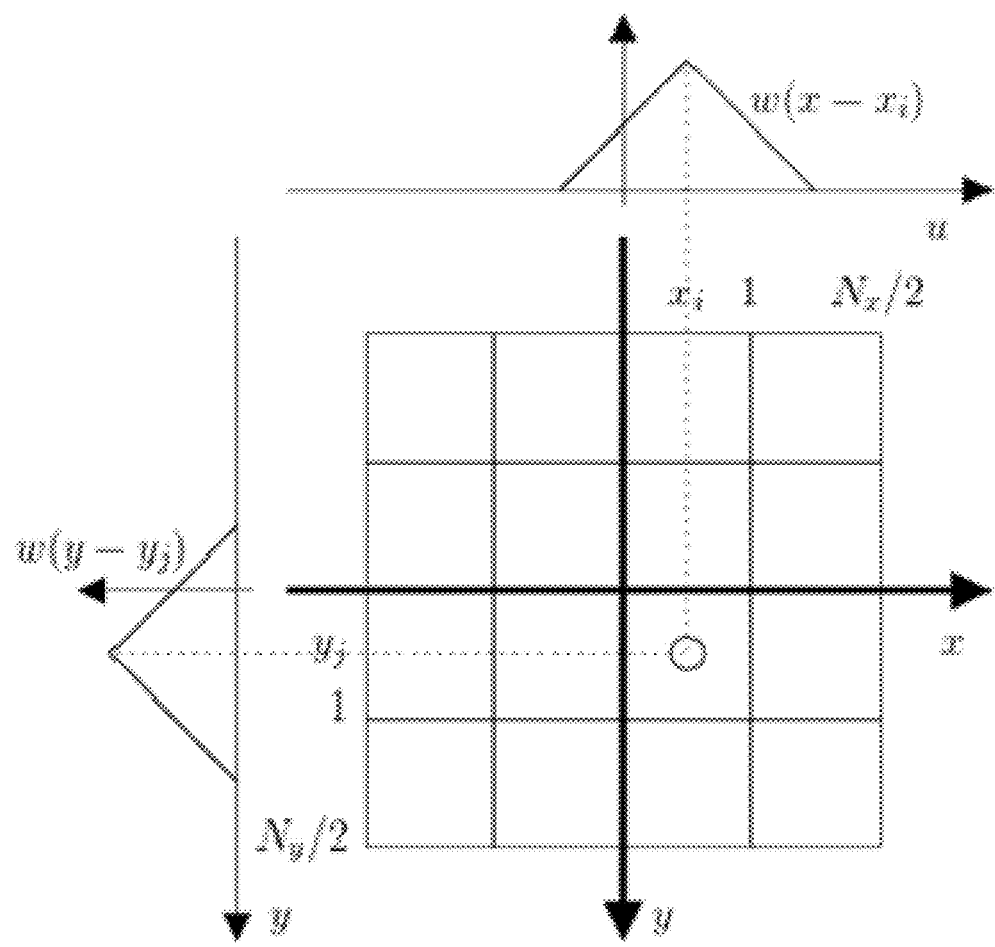
FIG. 2 is a schematic diagram illustrating certain histogram references employed by a system formed in accordance with an exemplary embodiment of the present invention in identifying key points.

FIGS. 15(b)-1, and 15(b)-2 illustrate an alternative embodiment for finding and matching features within a data set. The general approach here is to collect KP features that lie in or near an example feature on the assumption that the descriptors and other data associated with these KPs are typical of KPs within such features and not so typical of KPs found otherwise at random within the data. This is termed a "bag of key points" matching process. The process begins in FIG. 15(b)-1 by constructing a collection of examples. It is presumed that the data of interest has already been reduced to KPs based upon one of the previously described schemes.

At block 11401, the process selects one ore more training features from the full data set. The process then at block 11402 computes by any suitable means known in the art the interior volume of a region believed to be associated with this feature. Preferably, the process computes an isosurface based on a scalar field that is known from physics to encompass a regions associated with such features. Thus, for example, it is known in the art that an isovalue of P or Q may be used to compute a isosurface within the data volume, and where such carefully chosen isosurfaces enclose a tube-like region, such regions are associated with vortices. For purposes of illustration, one may select at block 11403 only those KPs interior to such an isosurface, to determine the set $\{K[\![P]\!]\}^{feature}$. In general, any volume calculated by suitable means may be used.

Optionally, at block 11404, the process may filter $\{K[\![P]\!]\}^{feature}$ by any suitable parameters of choice. For example, in certain embodiments, restriction of this set to a range of KP scales may be appropriate. Optionally (not shown), the process may further filter $\{K[\![P]\!]\}^{feature}$ by comparison to the "typical" features occurring elsewhere in the data an remove such from the bag of key points.

As illustrated at block 11405, the process then adds this set of $\{K[\![P]\!]\}^{feature}$ to $\{K[\![P]\!]\}^{bag}$, the total collection. This process may be repeated any number of times for new examples of target features, each time adding additional KP features to the bag.

As illustrated in FIG. 15(b)-2 the application of these features to new data is now straightforward. The process in that case would start with a bag of trained KP examples $\{K[\![P]\!]\}^{bag}$ and a target set $\{K[\![P]\!]\}^{test}$ in which to search. It would then perform KP matching, as described above, in order to find matches for KPs within the example set. Where such correspondences are found, the process flags the corresponding KPs in the test set $\{K[\![P]\!]\}^{test}$ as having sufficiently similar properties to the examples in the bag as to likely be associated with a feature similar to that on which the process is trained. Thus, for example, one may train on a collection of KPs inside vortices and identify vortex-like KPs within any other data set.

Figure 16:
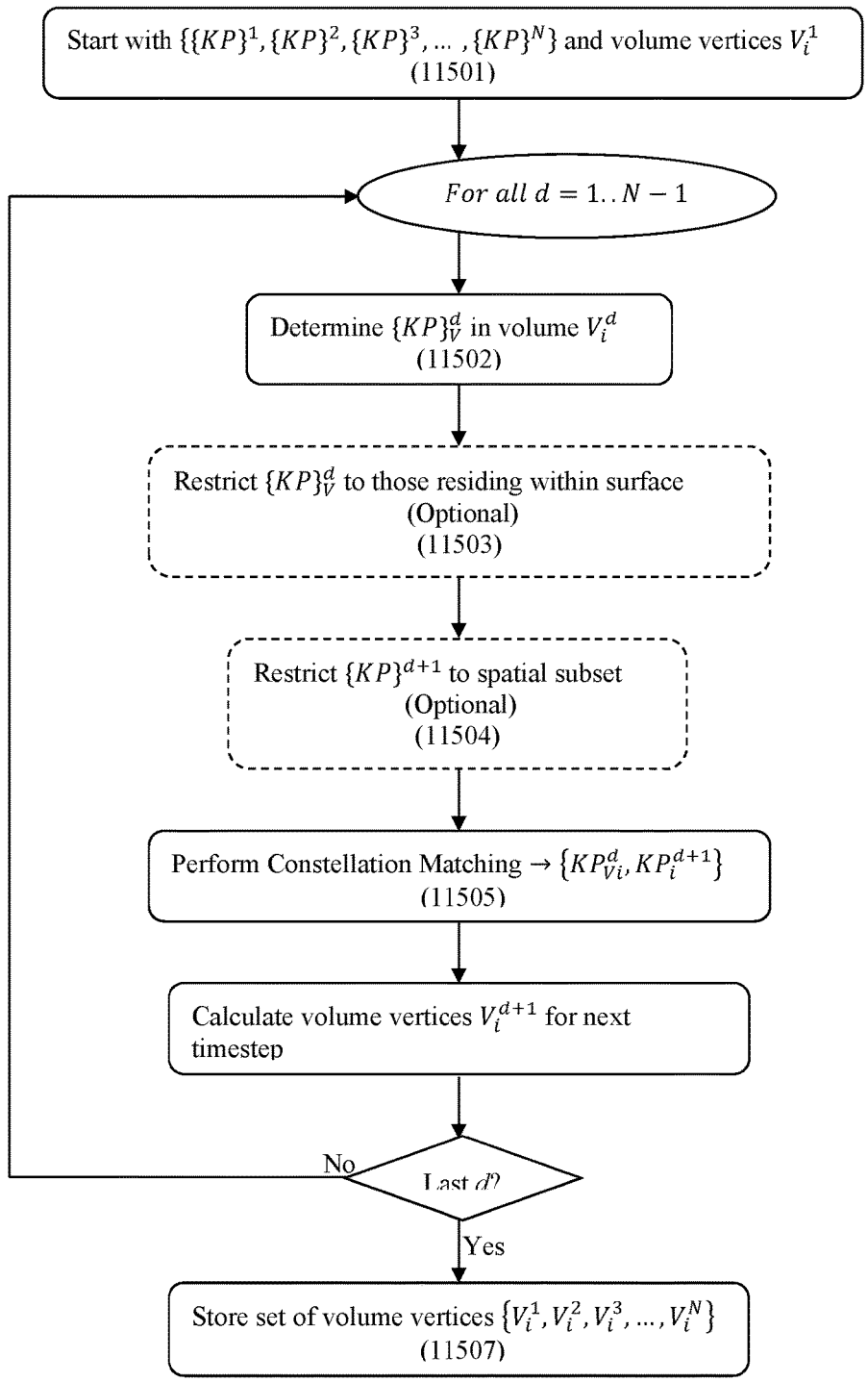
FIG. 16 illustrates a subject method in which constellation tracking is further enabled to track the evolution of volumetric areas within the full data set.

FIG. 16 illustrates an exemplary embodiment of a process for tracking of volumes within a data set based upon constellations of KPs. This process provides a fundamental link between the physical volumes within a full data set and the KPs on which most operations are performed. The process begins as in FIG. 15(a), by defining a set of KP collections, indexed from 1 . . . N. In this example, the process again considers each of these sets to be those KPs generated by analysis via a process consistent with FIG. 10(b) for the data $(x,y,z,t_d)$ associated with each $d^{th}$ time slice of the data. In addition, the process also defines in the starting block 11501 a predetermined volume within the data set described by a set of $V_i^1$ that lies within the space associated with the first set of KPs. This set of vertices may describe a rectangular box, or a more complex shape, so the process in general considers the convex hull of any n dimensional set of vertices.

The process then proceeds as follows for each set of KPs $\{K[\![P]\!]\}^d$, starting with d=1. It first determines the subset $\{K[\![P]\!]\}_{V}^d$ of set $\{K[\![P]\!]\}^d$, with KPs that lie only within the volume described by $V_i^d$, at block 11502. Optionally, at block 11503, the process may further restrict this set to only those lying within any arbitrarily shaped surface (such as an isosurface) intersecting the volume.

The process will then in general perform constellation matching from this volume restricted subset to the full set of KPs in the next time frame, $\{K[\![P]\!]\}^{d+1}$ as shown at block 11505. As indicated at block 11504, however, the process may first choose to restrict those KPs to a spatial subset in a neighborhood of the volume described by $V_i^d$ in order to reduce computational loads.

At block 11506, the process calculates new vertices $V_i^{d+1}$ based upon the step wise changes in the constellation matched KPs that were within the previous volume. Thus, the process in the exemplary embodiment just computes in the interests of simplicity a mean change in the KP locations and correspondingly updates the vertices. However, it is preferable to allow the volume described by the vertices to distort in a manner that reflects the KP constellation, while maintaining the constellation within the convex hull of these vertices. This may be achieved in various embodiments by any suitable means, including for example: the weighting of KPs in their effect by the distance from each vertex, the scaling of the convex hull relative to scaling of the KP and their locations, the adjustment of the boundaries of the convex hull locally to accommodate extreme key points in a third embodiment, and the like. Other suitable means for realizing a smooth adjustment to the vertices based upon the motion of the component KPs to achieve block 11506 will be apparent to those skilled in the art.

The set of volume vertices are stored, per block 11507, and may subsequently be used to visualize the evolution of a regional volume within a set of time steps.

Figure 17:
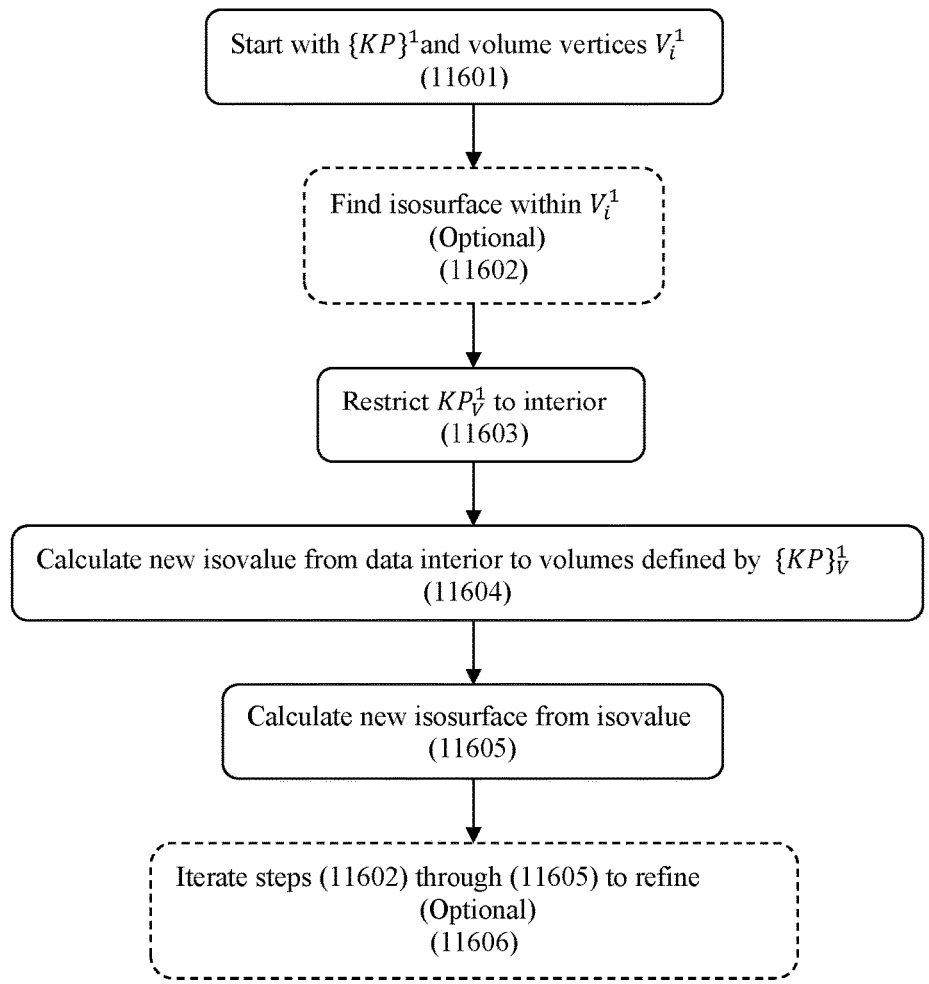
FIG. 17 illustrates a subject method in which key points associated with a structural feature or volume within the full data set are used to automatically identify quasi optimal values for constructing isosurface(s) used to visualize the structural features.

FIG. 17 illustrates an exemplary embodiment of a process for using KPs defined within a data set to aid in establishing an isosurface showing salient features within that data. This provides a significant improvement over the art, since in existing systems such determination must either be made by trial and error or by exhaustive assessment of the data values.

The process begins again at block 11601 with a set of KPs and a set of vertices defining a volume. The process may optionally refine this volume as shown at block 11602 by intersection with a starting isosurface that lies within the volume. The process restricts the KP to the interior of the target region in 11603, whether that region be geometric or isosurface-defined.

At Block 11606, the process calculates a new isovalue from the data interior to the KP within the set that is restricted to the volume of interest. For finding salient isosurface values, the process preferably matches the target type of isosurface to the KP type. Thus, for example, KPs defined from the P scalar field are used to determine local isovalues for displaying P. The data interior to the KPs may be used in several ways. A first example entailing the use of the mean center point values of the set of interior KPs. A second example entails the use of a mean value from the data within balls defined by each interior KP. Other examples include weighting the mean by distance from the center of such balls.

At block 11605, the process then calculates a new isosurface from the optimized isovalue, and at block 11606 it optionally iterates steps to refine this isosurface to a convergent solution in which the surface and set of KPs remain fixed. This is optional and if incorporate, the iterations are preferably limited as needed in favor of computational speeds.

Figure 18:
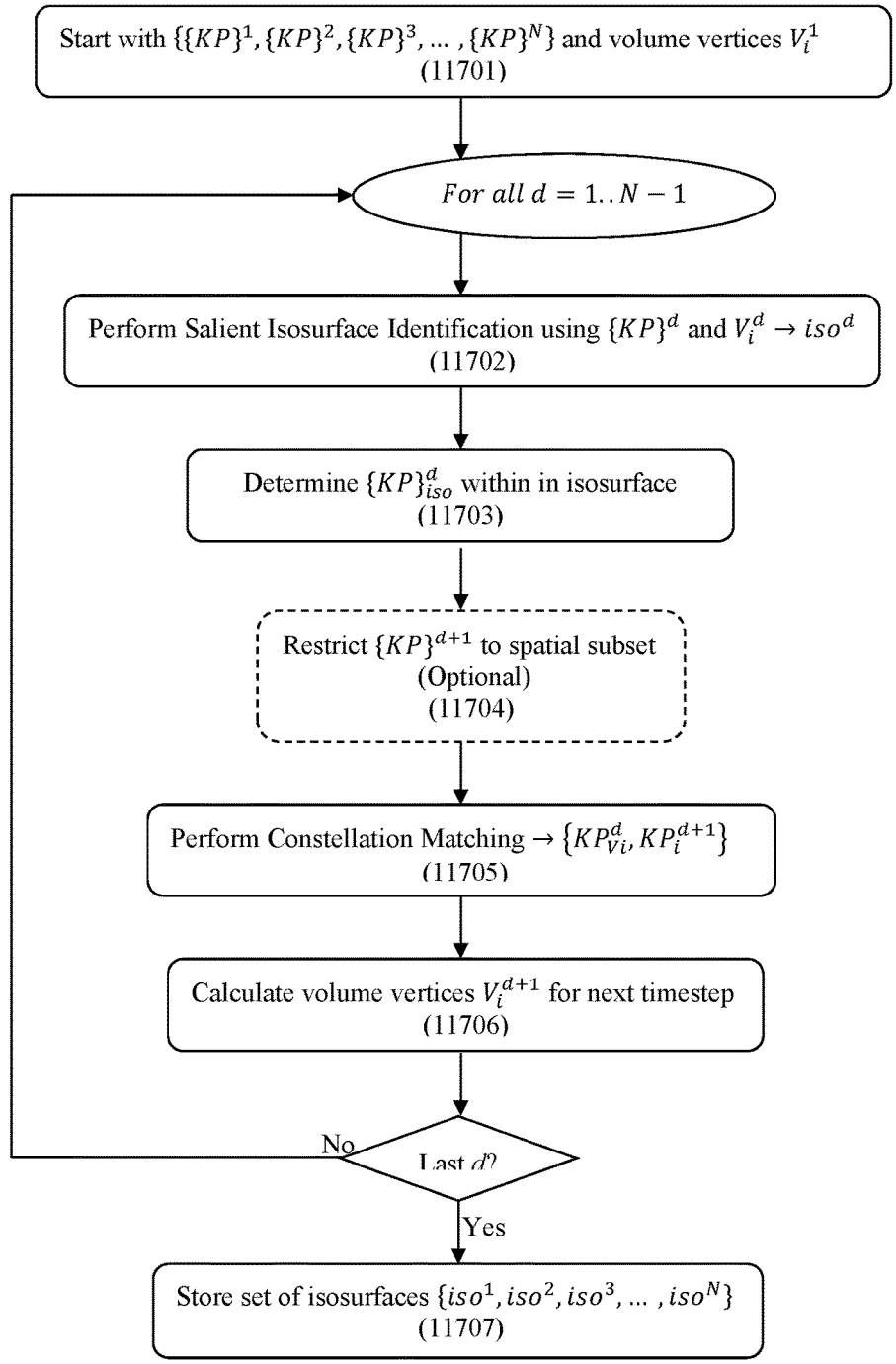
FIG. 18 illustrates a subject method in which salient isosurface(s) for visualization of structural features are tracked from time step to time step in order to optimize the renderings at each time step.

FIG. 18 illustrates an exemplary embodiment of a process which extends the idea of optimizing the isosurface and combines it with the tracking of volumes to achieve high accuracy tracking of salient isosurfaces. As before, the process begins at block 11701 with an indexed set of KPs, each defined for a corresponding data set. For illustrative purposes, these are again taken to be KPs generated by analysis via a process consistent with FIG. 10(b) for the data $(x,y,z,t_d)$ associated with each $d^{th}$ time slice of the data. The process also begins with a set of vertices $V_i^1$ defining a volume.

The process then proceeds for each d=1 to N−1. At block 11702, it first finds a salient isosurface as described above based on $\{K[\![P]\!]\}^d$ and $V_i^d$. The process then restricts $\{K[\![P]\!]\}^d$ to this isosurface at block 11703. Again, the process may optionally perform step wise spatial restriction at block 11704.

At block 11705, constellation matching is performed from this restricted $\{K[\![P]\!]\}_{V}^d$ set to the full KP set $\{K[\![P]\!]\}^{d+1}$, finding a constellation optimized match for each such KP. Note that this constellation matching preferably includes estimation of a step wise predictive flow vector as discussed previously; however, this is not required.

At block 11706, the process then calculates revised vertex estimates for the next time step, as previously described in connection with FIG. 16. This process is iterated until completed for each selected time step, after which a set of sequence of isosurfaces is stored as illustrated at block 11707. This set may subsequently be used to render visualizations of the evolution of amorphous isosurfaces associated coherent structural features of interest.

The various processes applicable to sparse set of key points described in preceding paragraphs have referenced the example of matching and tracking across sequentially time steps in several cases. Note that this is not a restriction, but merely a convenient example in the context of an easily understood application. One may apply such processes to other contexts. For example, where features occur cyclically within a stimulation, one may perform matching not to neighboring time steps but rather to time steps separated by a pre-determined lag in order to capture the next occurrence of such cyclic feature.

As another example, one may consider frames of KPs separated by spatial coordinates with the goal of tracing the evolution of a 2D cross-sectional feature across a third spatial dimension. One may similarly trace the evolution of 3D features across a 4th parametric dimension, thus enabling an analyst to understand the effects of a design parameter change by generating multiple parallel test cases over a set of such parameters and comparing one to the next.

Figure 19:
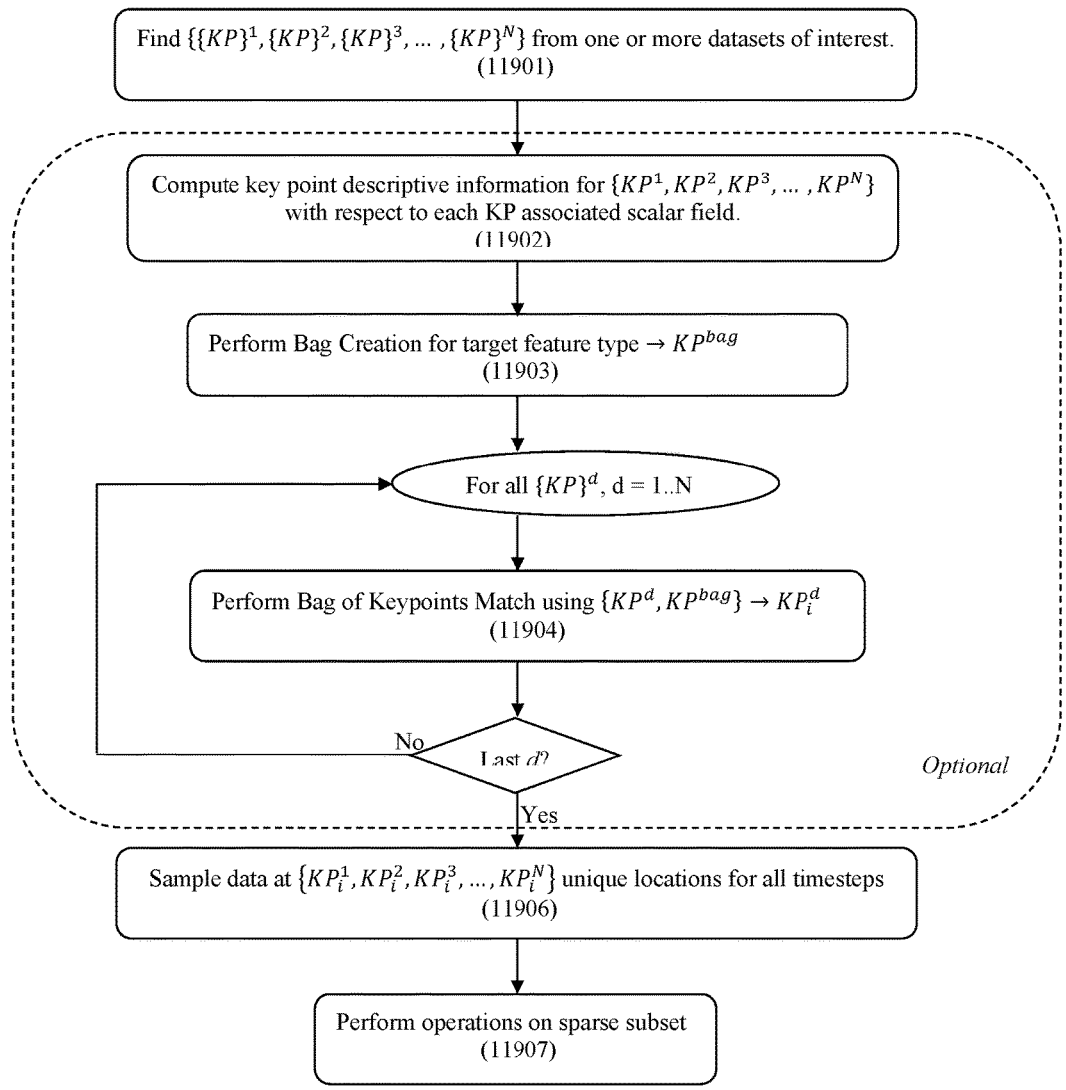
FIG. 19 illustrates the use of subject methods to reduce a large source data set to a much smaller sparse subset of points that may be reliably operated on as a surrogate for determining information in the full data set; and, FIGS. 20-25 are graphic renderings illustrating demonstrative examples of results obtained for various CFD analysis scenarios attained by a system formed in accordance with an exemplary embodiment of the present invention.

FIG. 19 illustrates an exemplary embodiment of a process whereby KP generation and matching techniques are employed to generally reduce massive data sets for purposes of subsequent analysis. As before, the process begins at block 11091 with an indexed set of KPs, each defined for a corresponding data set. For illustrative purposes, these are again taken to be those KPs generated by analysis via a process consistent with FIG. 10(*b*) for the data $(x,y,z,t_d)$ associated with each $d^{th}$ time slice of the data. However, the division into indexed KP sets is not a requirement of this particular embodiment, but merely a preference.

At block 11902, the process computes KP-descriptive information for each set of KPs over each scalar field of interest. This is carried out via a process consistent with FIG. 10(*b*); however, such is called out in a separate step to note that KPs from more than one scalar field may be combined. At block 11903, the process next creates a bag of key points trained from a group of exemplary target features that will be of subsequent interest in the final analysis. As a working example, a typical application is one in which all P and all Q KPs are taken to be associated with example vortices.

The process next operates over each KP set in the collection, indexed by d, starting at d=1. At block 11904, the process performs a bag of key points matching to reduce the KPs within each set $\{K[\![P]\!]\}^d$ to only those matching an example key point in the training set.

Once this reduction of KPs is complete for all $\{K[\![P]\!]\}^d$, the process may then identify each such KP with its physical location. The source data may be sampled thereby at each of these locations. In certain embodiments, the process may combine the (x,y,z) physical locations from all KPs at all time steps and sample each full data set at all these locations in every time step.

The full data set is thus been reduced to a sparse subset of points which may be operated upon using any independent method with reasonable confidence that the results will provide surrogate information about the full data set. Note again that the implementations shown in all figures are for purposes of elucidation, and actual computational implementations may vary from the explicit pattern shown in order to optimize a process for a particular architecture or situation.

c. Demonstrative Examples: Application to CFD Analyses

Figure 20:
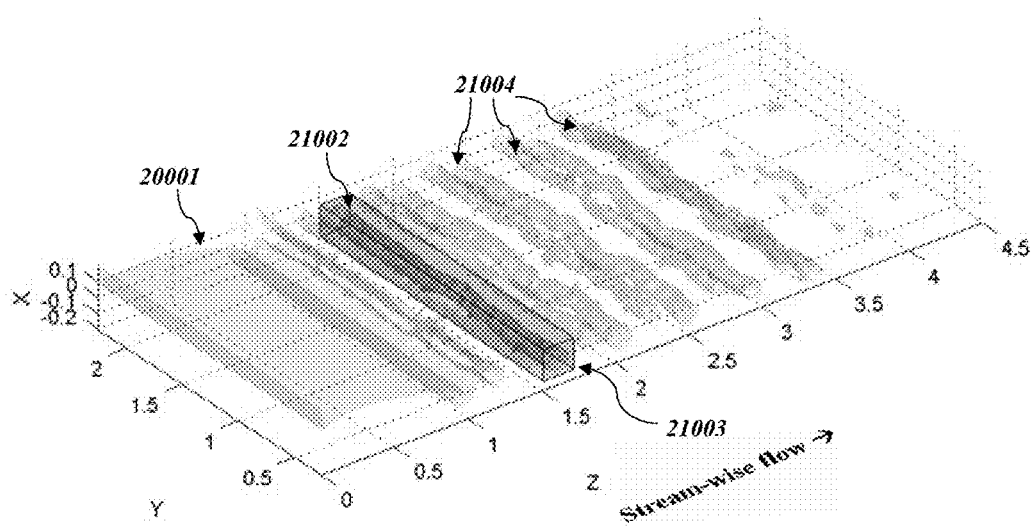

FIG. 20 is a graphic rendering generated for test results obtained by a system implemented in accordance the embodiment illustrated in FIG. 9(*e*) and others, as applied to the analysis of vortices generated about a sample airfoil. The test results demonstrate that constellations of KPs may be used to automatically track coherent structures like a vortex roll 21002 shed from the trailing edge of an airfoil. A pressure isosurface 20001 renders volumes associated with such voracities visible within the flow field in 3D view. The vortex roll indicated by the rectangular volume 21003 is tightly tracked from time step to time step 21004 using this automated process, with the volumetric extent adjusted as the vortex roll evolves. This vortex roll may also be isolated from the simulation data in certain embodiments by truncating the full data at the automatically adjusted box volume. The tracking and automatic resizing of the box volume 21003 is achieved by virtue methods disclosed herein.

Outside of computationally expensive operations on isosurfaces or core-lines within the full data sets, there is no means of automatically finding vortices in the prior art. Automated tracking of such amorphous coherent structures is unknown. The embodied system implements a new capability and in a computationally efficient manner.

For clarity, it is noted that an isosurface as used herein refers to a surface of constant value (termed the isovalue) within a continuous medium. Thus, for example, a P-isosurface denotes a surface of constant pressure, a Q-isosurface denotes a surface of constant Q-criterion, and so forth.

Figure 21:
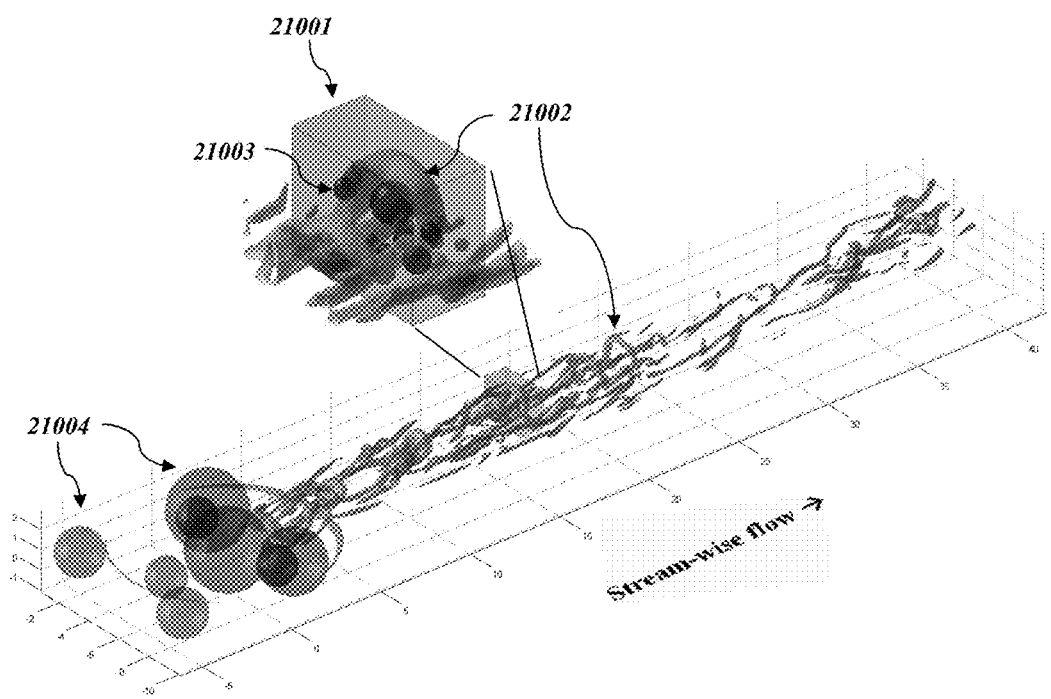

FIG. 21 is a graphic rendering generated for another set of test results obtained by the subject system embodiment, as applied to the analysis of other vortex features. It shows a Q-isosurface of vortex features (21002) that allow one to see complex vortex rolls that occur in a turbulent near-wall boundary layer that has been disturbed by a deformation in the wall (round dimple depression in this case). In spite of its complexity and amorphous nature, the system is able to isolate and track a volumetric region 21001 associated with one such specific vortex-loop within the wake structure. This tracking is automatic in accordance with certain aspects of the present invention. The inset shows this loop magnified, together with a subset of relevant key points 21003 used in its tracking. In addition, a set of key points 21004 are shown which are associated with standing eddy features that do not move in the flow (key points enlarged for clearer visibility). These key points 21004 were discovered automatically from the data set using disclosed processes. "Stream-wise" indicates the general direction of flow of the fluid (in this case an air stream) through the model.

Figure 22:
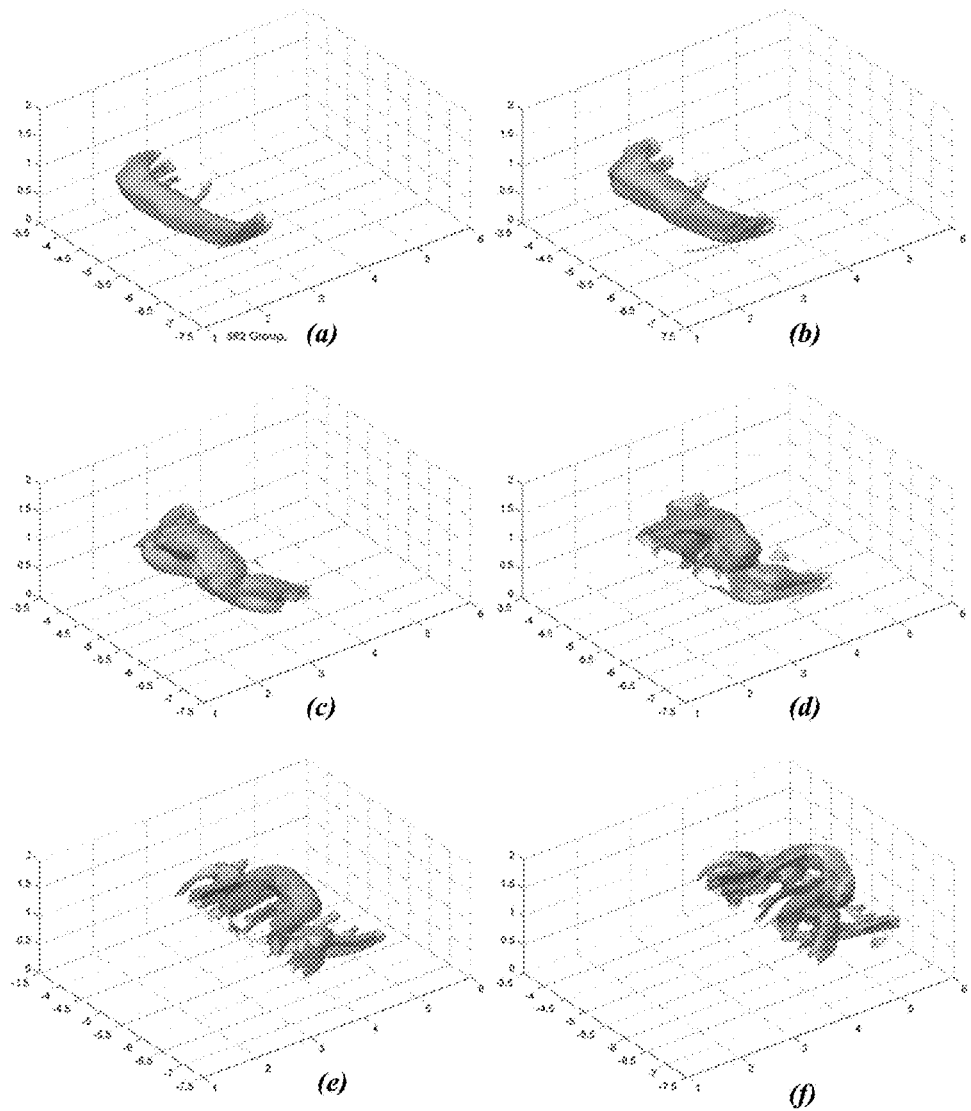

FIG. 22 illustrates a series of time-displaced renderings illustrating the evolution of an emergent vortex loop in another region of the complex boundary layer shown in FIG. 21. In this instance, the Q-isosurface associated with a forming vortex loop is shown, automatically isolated and tracked. The stop-action time steps proceed from (a) to (f) sequentially. This vortex begins as a roll, then folds over and sheds from wall deformation before moving downstream in the wake. The system in this embodiment isolates and tracks the evolution of this amorphous structure despite the fact that it is both highly irregular in form and becomes progressively more so as it evolves in time. This example dramatically illustrates the radically different setting for analysis, as compared to a setting, for instance, where rigid objects are tracked using various image processing and video tracking methods known in the art.

Figure 23:
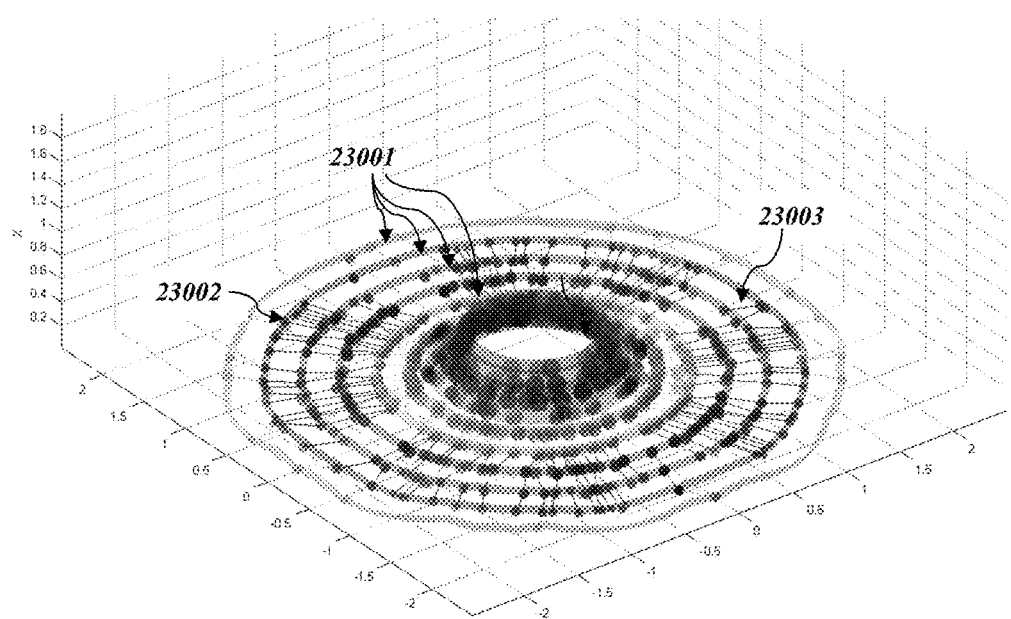

FIG. 23 is a graphic rendering generated for yet another set of test results obtained by the subject system embodiment, as applied to the analysis of an isolated vortex ring's behavior. The rendering illustrates stop-action tracking of the isolated vortex ring as it impinging on a wall. The ring begins small, and moves downward, spreading across the lower wall of the box. Each time-stepped frame is rendered in a new isosurface ring (e.g., 23001). Within each ring are highlighted examples of key points (e.g. 23002) used to track the ring from frame to frame, and these key points are joined to the those key points matched in previous frames as indicated by the schematic lines 23003 to illustrate the frame to frame linkages established by the system. Key points are illustrated as spheres with a radius that is proportional to their fundamental scale. Note further that the Pressure isosurfaces at each time step are automatically and adaptively selected by the system at each step using values derived from the scalar pressure field near the corresponding key points locations (e.g., within the extent of the illustrated key point spheres in each step). This figure also illustrates the automatic finding and tracking of salient isovalues for purposes of rendering visualizations most relevant to any given data set.

Figure 24:
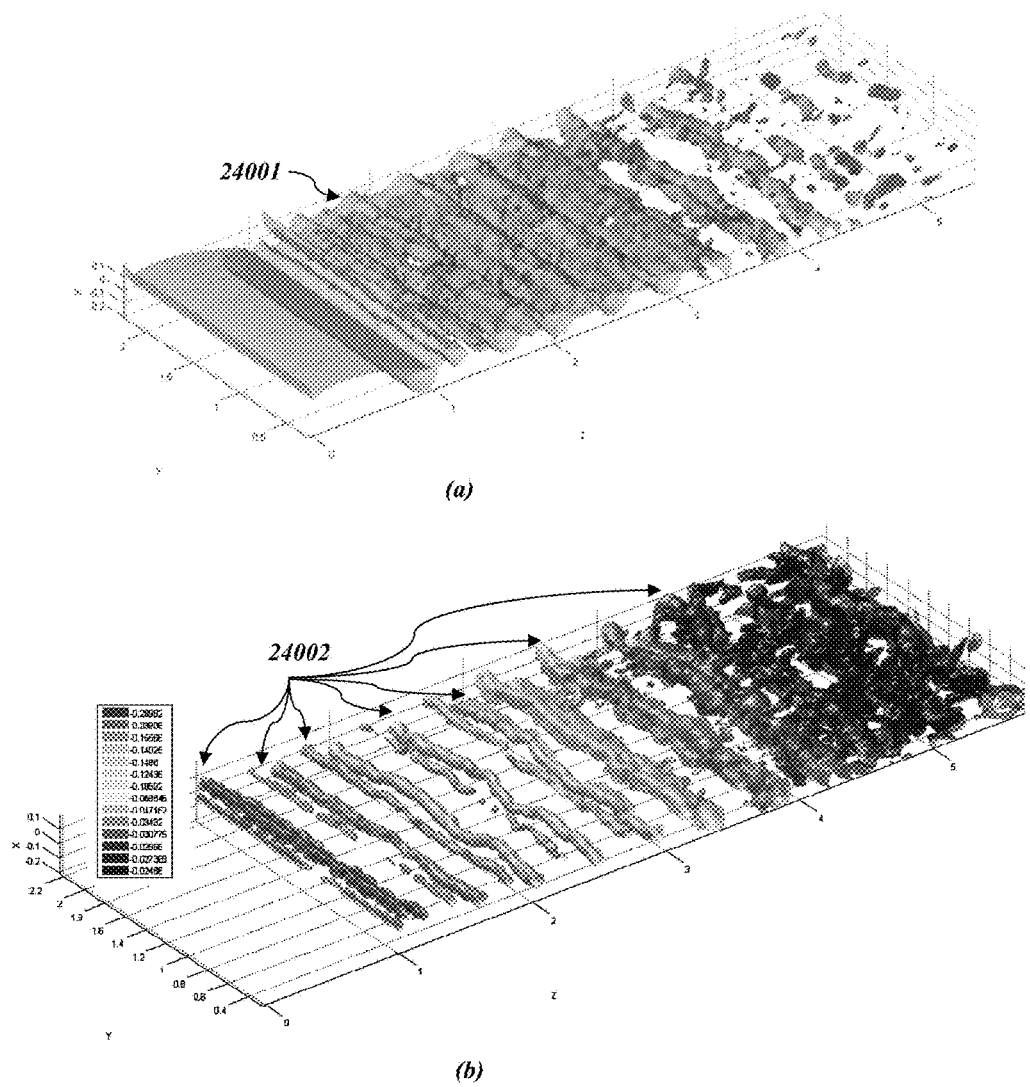

FIG. 24 is a graphic rendering generated for yet another set of test results obtained by the subject system embodiment, as applied to the analysis of a vortex roll as it evolves over time steps. The first rendering (a) illustrates the contrast between a conventional isosurface 24001 chosen by trial or error as typically done in the art, and (b) isosurfaces 24002 automatically and adaptively established by the system using the disclosed processes. Note that in rendering (b) the relevant details of the underlying flow are much more clearly revealed and distinguished than in (a), particularly towards the end of the feature's evolving progresses shown (to the right of the figure).

Figure 25:
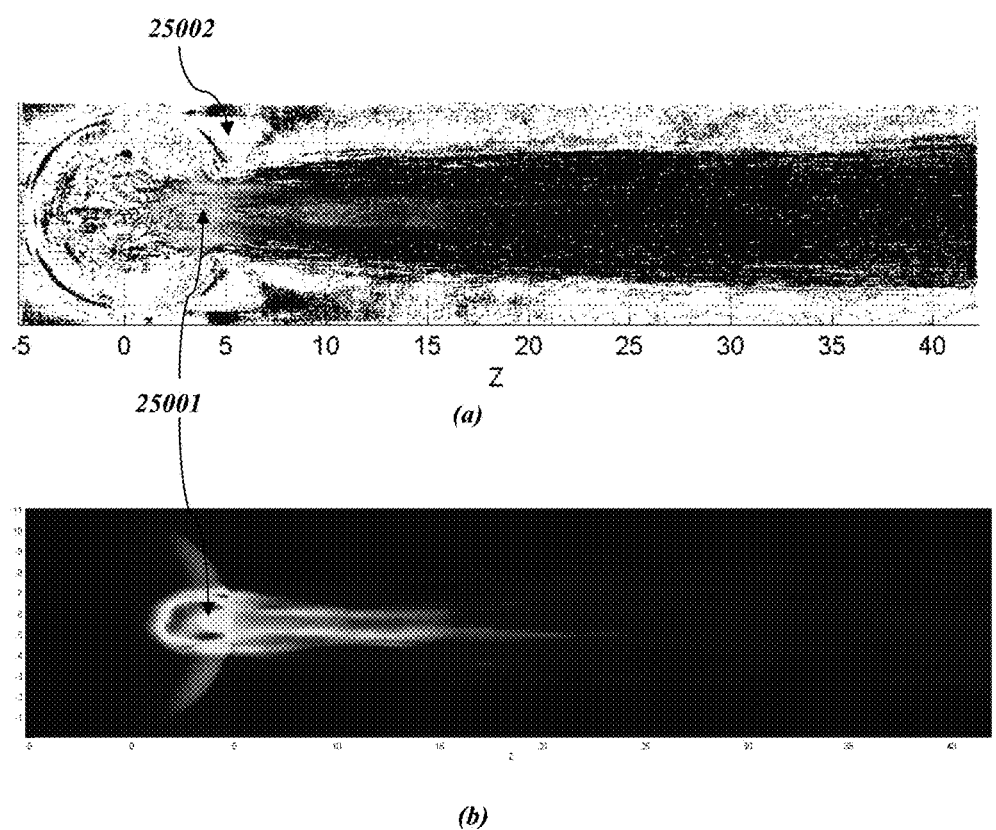

FIG. 25 is a graphic rendering generated for still another set of test results obtained by the subject system embodiment, as applied to the wake of an air stream. The rendering illustrates the effectiveness of the system in reliably analyzing data sets that are conventionally analyzed by other means not employing the descriptive aspects of key points, but merely the sparsity of key points as a means to sample the larger data in the manner disclosed herein as a surrogate for the full data set. In this figure, the results of (b) a conventional correlation analysis known in the art conducted on the full set of air stream wake data are shown in comparison to the results of (a) an analysis conducted by the subject system embodiment conducted on only a sparsely selected key point set. The significant finding is revealed in the area 25001 of both renderings (a), (b), with a trailing fingers streaming from there into the wake. The key points automatically selected by the system as disclosed herein cover the area 25001 densely so that the information of interest obtained is substantially similar in both (a) and (b). Note that the pure white areas such as 25002 away from the area 25001 in (a) indicate an absence of key points, and are thus areas that were not analyzed at all. The analysis results in (a) required consideration of less than 1/1000 of the data points required to obtain substantially the same information in (b). This is a significant computational/processing savings, and provides a notable advance over the prior art.

2. Machine Learning of Correlations Between Emergent Coherent Structures

This embodiment maps automatically detected features to system behaviors. Extracting and visualizing coherent features from CFD massive simulations are only part of its objective. In order to learn from this information and gain insight into the physics, it is desirable to associate these features with qualitative or quantitative changes in macroscopic behavior. Automatically discovering such correlations provides an enormous boost in analysis capability for making practical use of massive data sets.

In each simulation data set, at least one macroscopic parameter is examined, such as lift or drag, which is relevant to the simulation and which is readily derived from the available data. A notable goal is to show that regions of behavior of this parameter can be automatically mapped to the presence or absence of underlying features. (For example, one may consider a classic relationship such as that of wing-performance and vortex formation.) Using certain embodiments of the disclosed system and method, a machine can discover such relationships so that, once selected and identified, they can subsequently be analyzed rapidly and blindly.

To this end, regions of behavior are first distinguished in the macroscopic parameters. For example, in the case of a simulation of insect flight, one might identify the relation of the sharp peeks in the lift variation during the flapping cycle to particular vortices in the wake. Other targets of interest may include recognizing and correlating various aircraft flight regimes with emergent features, recognizing pre-onset of instabilities like flutter, or identifying correlations between control effectiveness and fluid features.

Methods identified embodiments 1 and 2 above are used to automatically identify emergent features, together with the degree to which they are present, and the time periods during which they are present.

Machine Learning Approaches:

There numerous machine-learning methods that may be applicable and that will be understood by one skilled in the art as potentially substituted for the examples herein, once the principals of the subject invention are understood. In one exemplary embodiment, due to success within complex, noisy feature spaces for which it is difficult to determine underlying distributions, a class of methods referred to as Support Vector Machine (SVM) are employed. One advantage of SVM is that in making classification decisions, it relies only on the boundary between classes of interest and substantially disregards the distributions within each class. Because the mathematics reduces to the problem of finding a separating surface between point collections, SVM also provides a natural means of visualizing decision spaces. It is ideal for establishing whether or not information can be segregated even while the optimal means of detection or classification is still being studied.

SVM may be applied in the exemplary embodiment to related machine learning techniques in order to establish that information can be reliably extracted from these data sets. These can be used directly, or in combination with decision tree and/or voting type classifiers to detect and classify emergent features and to establish testable relationships between macroscopic behavior and emergent features. Other machine learning methods are also applicable in related if not equivalent fashion.

SVM methods form a broad set of supervised learning classification methods and are amongst the simplest and fastest machine learning techniques in common usage today. It comes in various guises. The general idea is that a binary classification is made by fixing a geometry on the data domain and then partitioning the problem space into two pieces by utilizing a separating geometric object. The geometry is encapsulated in the idea of distance determined by a kernel function, and the geometric object is generally a polynomial hyper-surface. The hyper-surface is determined by optimizing the separation based on a specific collection of training data for which the correct classification is a priori known. One specific incarnation of the SVM idea is a Support Vector Domain Description (SVDD), where the polynomial hyper-surface used is a sphere in the desired geometry. A new object is classified by computing the distance to the sphere center. When the distance is larger than the sphere radius, the object will be classified an outlier, otherwise it is accepted as a genuine target object.

One approach to the last portion of the problem is to utilize a large test library by measuring the true positive/false positive/true negative/false negative rate. When utilizing an SVM approach, this aspect will be entirely determined by the nature of the training data and geometric structure utilized in the SVM approach. In this context, there is also an inherent geometric approach. If an understanding of the structure of the data space can be gleaned, the efficacy can be determined from the geometry induced on the data space by the distance kernel, the probability distribution on the data space can be determined by relative frequency of occurrence of the given component at each data point, and the measurable set can be determined by the SVM definition.

Figure 3:
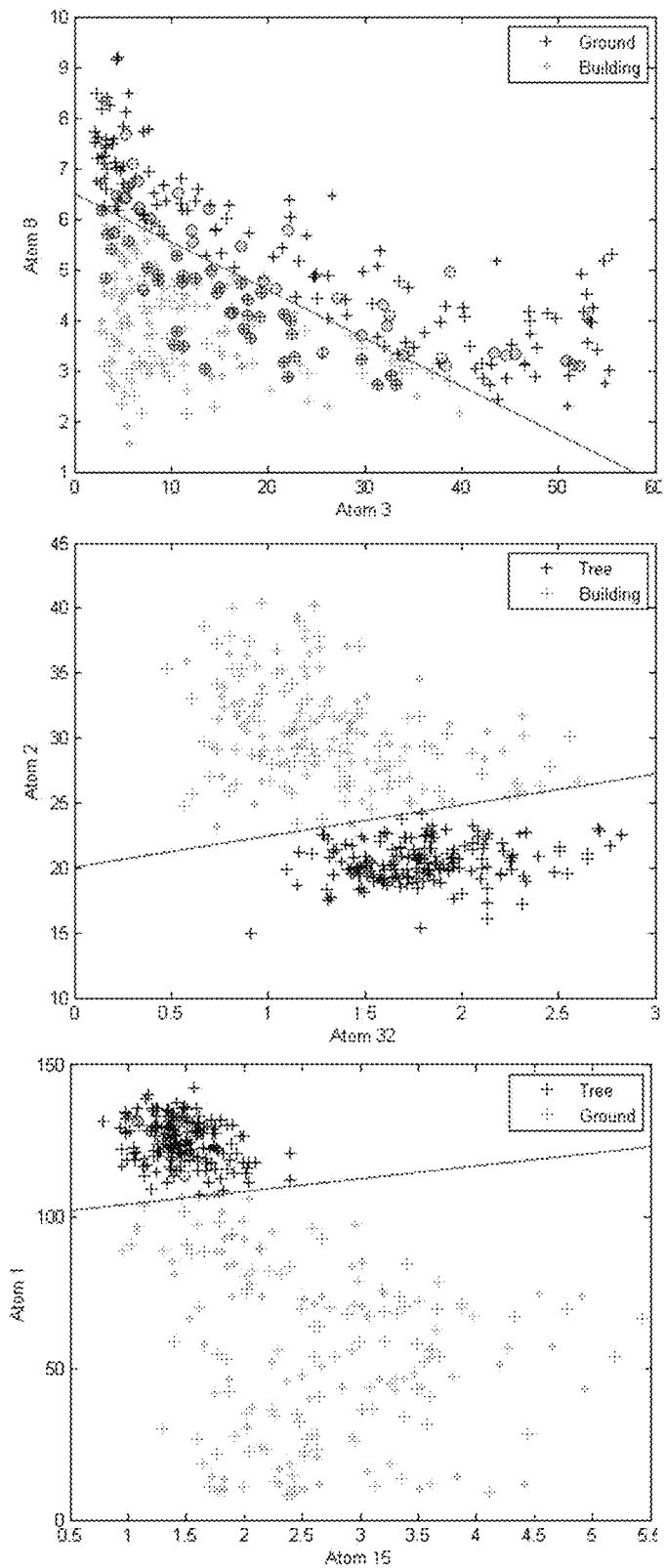
FIG. 3 is a set of illustrative graphic SVM plots of sample test results.

As SVM is a well-established methodology in itself, the mathematical details are not further described here. However, to fix ideas, FIG. 3 illustrates an example from a sample application. The problem in this case was to distinguish areas of 3D geospatial terrain data that are dominated by trees, open ground, and building structures. Using abstract features extracted via the sparse decomposition process, it was possible to draw a line between clusters of vectors that largely separated the classes of data. For clarity, these feature vectors are projected into the feature-pair that best separates each pair of classes. SVM achieves the best separation by considering only the data at the boundary of the clusters, not the distributions. A three-way classification can be achieved either by considering a hyper plane in the higher dimensional feature space, or by constructing a bivariate-based decision network. Note that different pairs of data classes are often best distinguished distinct feature types. Hence, in this example no two graphs share the same decision axes. In certain applications of the subject system and method, distinctions of tree vs. building vs. ground might be replaced (not shown) with distinctions of laminar flow vs. transient vortex shedding vs. steady state vortices.

Detecting Feature Presence:

Machine learning is relevant to the detection and classification of emergent features as well as to finding correlations with macroscopic system behavior. SVM techniques may be used to help train the system to classify emergent features in a manner consistent with human experts. Thus, for example, regions with and without vortices of interest may be demarked by an operator, and the subject system and method in certain embodiments may be applied to learn and refine an SVM classifier for detecting this type of structure from the available space of emergent features.

Quantifying Feature Presence:

The degree to which a physical feature or coherent structure is present may be naturally quantified in several ways. In the event that a 4D data space has been decomposed into component elements that isolate features by their type, then the magnitude of the coefficient associated with a particular element comprises a direct measure of its presence at any given time. Thus, if $f^i(x,y,z,t)$ denotes a vector or scalar valued function over the $i^{th}$ segment of a 4D data set, then a DR method may produce a representation of the form:

$$f^i = \sum_n a_n^i g_n^i + \text{Error}$$

where $g_n^i$ denotes the nth atom (e.g. principal component) of the representation, and $a_n^i$ denotes its corresponding coefficient. Using the data-adaptive approaches discussed, ideal features of interest will emerge as compactly represented by only a few terms. Thus, we can judge their degree of presence by the magnitude of coefficients $a_n^i$ for only a small number of terms.

In the event that SIFT component-features are being considered, a natural means of quantifying a physical feature's presence is to compute the L2 norm of deviation from the background scalar field over the applicable region of extent. This may be thought of as an integral over the squared amplitude and corresponds to a measure of the visual energy of the feature. Thus, if one has characterized a vortex by a constellation of n SIFT component-features, considering the energy within the convex hull of these SIFT points provides a self-consistent measure of the degree of presence of a coherent physical structure. This holds regardless of scale.

Establishing Learned Relationships:

To examine whether there is a relationship between the degree of presence of one or more features and the behavior of a macroscopic parameter, one may use an SVM process to seek a hyper-plane separating the space of coefficient parameters, such that points lying on one side of the plane correspond to times during which one macroscopic behavior is present and points lying on the other side correspond to times during which the behavior is absent. This learning relationship may also be inverted. To examine whether there is a relationship between emergent features and the behavior of a macroscopic parameter, one may also use an SVM process to seek a hyper-plane separating the space of macroscopic parameters, such that points lying on one side of the plane correspond to times in which the feature is present, and on the other side, times in which the feature is absent.

Figure 7:
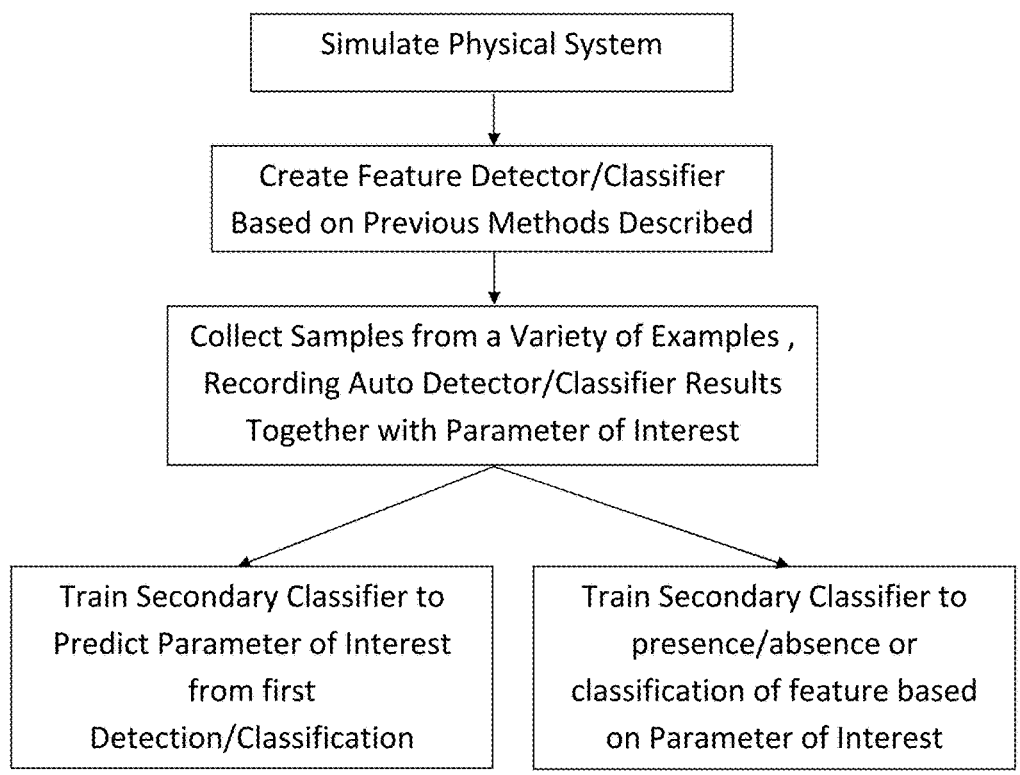
FIG. 7 is a flow diagram illustrating a progression of general processing steps in an exemplary embodiment of the present invention incorporating machine learning of correlations between features.

As illustrated in FIG. 7, one may use physics simulation to generate many examples of data points in an automated fashion. One may then quickly analyze such data set instances for the presence or absence of learned feature types or classification of learned feature types (based on methods described in parts 1 and 2). One may likewise calculate the quantitative (or qualitative) parameter of interest. This reduced dimension data is provided to the described detector/classifier learning system in order to learn the correlation between them. Thus, one may in an exemplary embodiment train a machine to predict what parameters settings will result in creation of features of interest—useful, for example, in predicting what wing geometry might reduce or increase a certain class of vortex shedding or shockwave profile. Or, in another embodiment, train the machine to predict the effect that features of interest will have on a parameter of interest—useful, for example, in predicting the effects on lift or drag when certain classes of vortices are present or absent.

These correlation are of great interest to the human analyst, but cannot be readily achieved by a human on the requisite massive scale. The present invention addresses this limitation of the prior art by allowing analysts to learn about the effects of emergent feature on important physical scalars, and the effects of their controls and design parameters on regulating aspects of emergent features.

3. Sparse Sampling of Simulation Data Relating to Flow Features of Interest, in Order to Develop Signature Characteristics Detectable as Waveform Profiles on Practically Placed Sensors The primary goal of in this embodiment is to enable detection of complex features of interest using locally sparse instrumentation. Learning from high-resolution physics-based simulations can thereby be applied to help design better low-resolution physical sensors. Accordingly, signatures of physical features and coherent structures may be learned from simulations, and the results applied to detecting features in flight or wind tunnel data. This provides another important way of gaining meaningful information from massive simulations. One of the advantages of massive CFD simulations is that one may obtain data over a 3D spatial field that is much denser than may possibly be to obtained with physical sensors in a physical test. Bridging this gap is an important advance in the art.

Approach Outline:

Briefly, data from one or more simulation data sets is used to train a detector. The presence of a particular feature of interest (e.g., a vortex or chain of vortices) is then identified, along with when and where it is located. The placement of flight instruments (e.g., a small number of local pressure or velocity sensors) is emulated by extracting fixed spatial data from the simulation.

The data at each simulated sensor comprises a waveform, or vector time-series. Collections of these time-series are examined, grouped by the presence or absence of the target feature. From this, signature time-series components are discovered that reliably predict the state of the target feature.

The purposes are to examine emergent features in high-resolution physics simulation, discover a reliable low-dimensional signature that corresponds to the presence of this feature, and apply that knowledge to detecting when similar features are present in a physically realizable sensor system such as what might be present in a wind tunnel or during flight testing.

For example, one may first select a feature of relevance (e.g., a particular flight surface vortex) that exists in the given test data, reduce the test data to a set of waveforms that would be detected at particular points in a physical model, and to use the processing architecture to discover and refine a signature for the particular feature. Thus, a detector may be generated for application to a physical model (either in flight testing or wind tunnels) to detect the presence or absence of the feature of interest in real time.

Greedy Adaptive Discrimination:

The inventor has developed extensive capability in signature discovery, using previously patented or patent-pending sparse signal processing architecture called Greedy Adaptive Discrimination (GAD). This architecture operates by exploiting weak redundancy within signal groups in order to find and extract classes of underlying components from the signals. The resulting information is used to construct a mathematically "sparse" representation specific to each data set. Using the processing model obtained in this exemplary embodiment, signature information may be concisely represented and automatically de-blurred in multiple dimensions. Differences and similarities in groups are thereby compactly described and can be examined to discover signature structure without relying on tight coherence and without making limiting assumptions about appropriate feature spaces.

As discussed previously, a dimension reducing transform is employed in the system. Standard signal processing tools based on fixed transforms such as FFTs, wavelets, or filter banks often obscure key feature information by distributing it over a large number of quantized bins. Even data adaptive approaches to decomposition like PCA and related nonlinear kernel methods share certain downsides. Although the data may be transformed to reduce dimensionality, extraction of features remains dependent on consistency in the sampled feature set. If important features (jitter, drift, etc.) vary considerably from sample to sample, the probability of properly resolving these as significant features goes down rapidly.

In contrast, conventional greedy algorithms work to generally concentrate interesting information into fewer, more robust features in a fashion that is optimized to each signal. Historically, such algorithms have been underutilized in signature identification tasks in part because it is difficult to compare one analyzed signal to another when different features spaces are extracted; however, they are now emerging as an important modern approach. The inventor demonstrated that it is possible to create a greedy analysis approach that simultaneously analyzes collections of signals and overcame these limitations. While certain main features are described in following paragraphs, application of the GAD processing architecture in the present embodiment inherently removes jitter and de-blurs data. By compactly re-representing the data in a reduced dimensional feature space, GAD facilitates discovery of signatures at the front end of processing, reduces subsequent computing costs, and significantly increases the probability of success with further statistical processing.

The "GAD Engine" comprises a Simultaneous Sparse Approximation (SSA), a dictionary of prototypical atoms, a structure book memory system, and one or more discrimination functions that operate on the structure books. The SSA takes as input a collection of signals and produces as output a low-dimensional structure book for each signal. Each structure book describes a decomposition of a corresponding signal and comprises a list of coefficients and a corresponding list of atoms. Working as an example in one dimension, a signal f(t) may be expresses as:

$$f(t) = a_0 g_0 + a_1 g_1 + \ldots + a_n g_n + r;$$

where $a_i$ denote the coefficients and $g_i(t)$ the atoms or prototype-signals of the decomposition, and R denotes the residual error (if any) after n+1 terms. If r(t)=0, then the representation is exact; otherwise, the decomposition is an approximation of f(t). One way to understand a structure book is as a set of ordered pairs, $(a_i, g_i(t))$ for each i; however, the actual engine utilizes more efficient internal coding schemes. Note that while the output of the SSA may be orthogonalized to generate a basis set, signature discovery applications are often best served by maintaining a weakly redundant representation, sometimes referred to as a frame in mathematical literature. A frame can be treated as a non-orthogonal spanning set with basis-like properties.

The atoms $g_i(t)$ belong to a highly redundant dictionary D of prototype signal elements. Using a redundant source dictionary rather than a fixed decomposition set (such as a Fourier or wavelet basis) allows GAD to substantially reduce the dimensionality n of the resulting decomposition for a given error $\epsilon$, with $|r|<\epsilon$. Those skilled in the art familiar with other adaptive approximation schemes, such as Matching Pursuits, will recognize that this reduced dimensionality generally comes at a price, as structure books from multiple signals are not mutually compatible. A unique feature of the GAD architecture is an SSA that produces redundant sparse approximations where the atoms of any structure book may be compared directly to those of any other in a very low-dimensional space. Thus, for a set of simultaneously approximated data functions {fi}, decomposed over an index set γ∈S:

$$f^i = \sum_{\gamma \in s} a^i_\gamma g^i_\gamma + r$$

In the simplest implementations, selected atoms may be identical for all generated structure books in the collection. However, the GAD SSA is also able to extract atoms from the signal collection that are similar rather than identical, i.e. $g_\gamma^i \neq g_\gamma^j, i \neq j$. This unique feature is highly advantageous because it allows the GAD engine to automatically account for noise, jitter, drift, and measurement error between the signals. The GAD engine permits the range of "similarity" between atoms across structure books to be controlled by setting Δ-windows for the parameters of the dictionary. These windows may either be fixed or adapted dynamically.

The resulting sparse structure books are further processed within the GAD engine by discrimination operations. Each operation takes as input one or more structure books and produces as output one or more additional structure books. Operators include set theoretic operations and threshold tests, among others, utilized to sub-select atoms and extract similarities and differences between classes of signals. An operation of particular interest for signature extraction is the parametric mean, which produces a single structure book representative of the "average" or "typical" signal in a collection of signals.

Another unique benefit of the GAD engine is that the resulting structure books may be averaged, subtracted, or otherwise manipulated, and any derived structure book retains sufficient information to reconstruct a representative model signal in the original signal space. In particular, this means it is possible to calculate a parametric mean of a class of signals and then reconstruct a "typical" signature signal from that data for further analysis, comparison, etc. Hence, GAD can provide useful signature information to various signal discrimination systems.

Taken together, the GAD engine components define a highly flexible tool for manipulating and discriminating signals. These proprietary and patented methods have been developed by SR2 Group into extensive software libraries, designed to work on workstations as well as on a high-performance computing cluster for larger-scale data.

Figure 4:
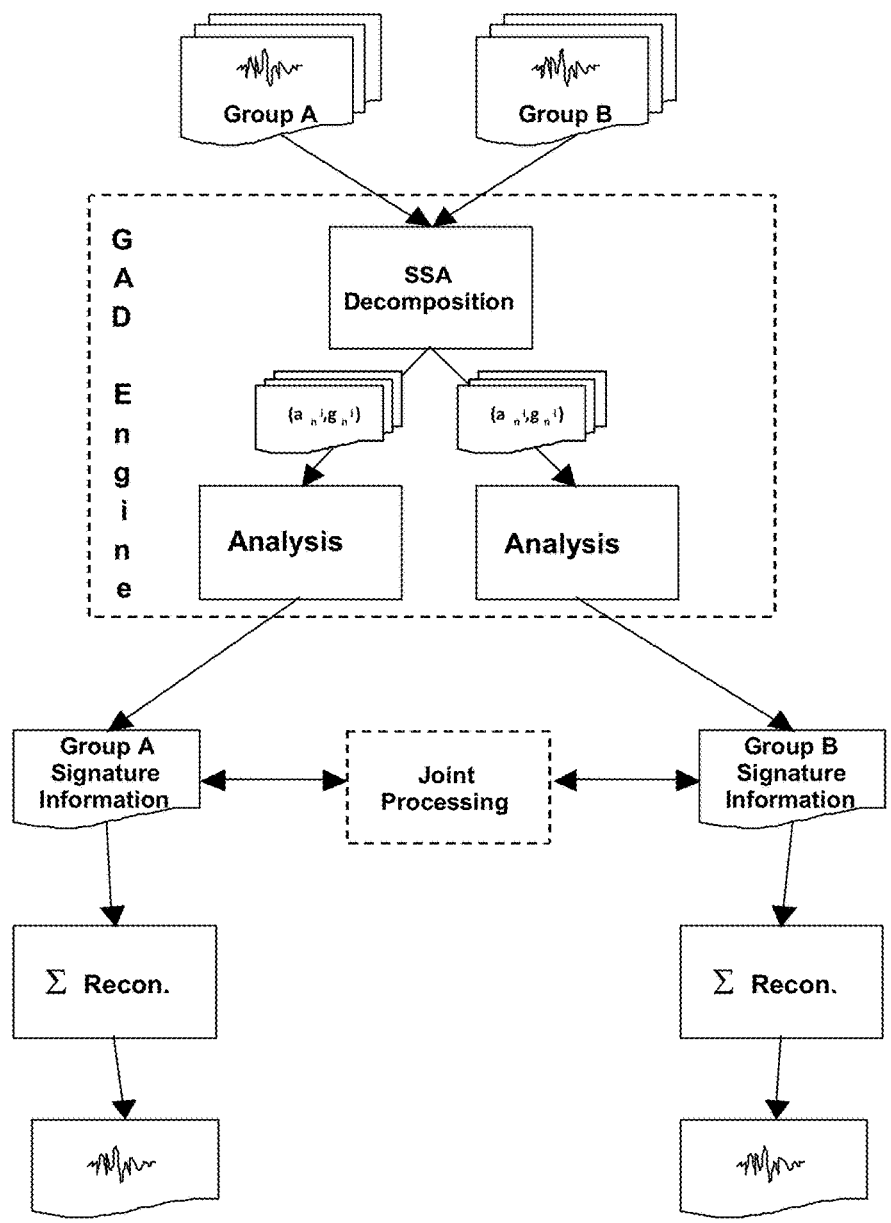
FIG. 4 is a schematic diagram illustrating a flow of processes within a simultaneous sparse approximation operation.

FIG. 4 outlines one such signature extraction method. Signature data is collected and divided into classes, typically representing a positive condition in which the target signature is present and a negative condition in which only background or distracter signals are present. The classes are analyzed using the SSA method, resulting in a collection of structure books (labeled SBs in the figure) for each class of signal. A carefully defined parametric-mean operation is performed on each class to produce a signature structure book for each signal class. These signature structure books effectively represent a list of key time-frequency features relevant to discriminating the class, together with coefficient values indicating their proportionate prominence. The given processor can then compare the signature structure books to further extract contrasting elements. Note that the system may also be applied spatially to extract spatial as well as temporal patterns of interest. The signature structure books can also be reconstructed into "typical" time-domain waveforms that are representative of a class of signals. Thus, GAD signature extraction may feed a variety of other detector designs.

GAD signature extraction proceeds by finding a parametric mean for one or more classes of signals and comparing the resulting structure books to each other and to statistical estimates of expected values in background noise. A variety of schemes may be employed by which to find the best discriminators; the choice depends on the particular detector design.

Several detector/classifier architectures may potentially be used as tools in various embodiments. The SVM-based model has been described already in preceding paragraphs. Statistical clustering (e.g. Radial Basis Functions and various Kohonen class metrics and learning methods are avoided, since experience shows that they do not always perform well in relevant feature spaces. In particular, GAD spaces are not always amenable to re-normalization across arbitrary subspaces in a way that is consistent with typical joint statistical distribution assumptions. Instead non-parametric decision subspaces selected via SVM are preferably used, with excellent results. Certain methods remain applicable with a variety of specific decomposition Sparse Approximation (SA) and simultaneous sparse approximation (SSA) mechanisms and variations thereon.

Figure 8:
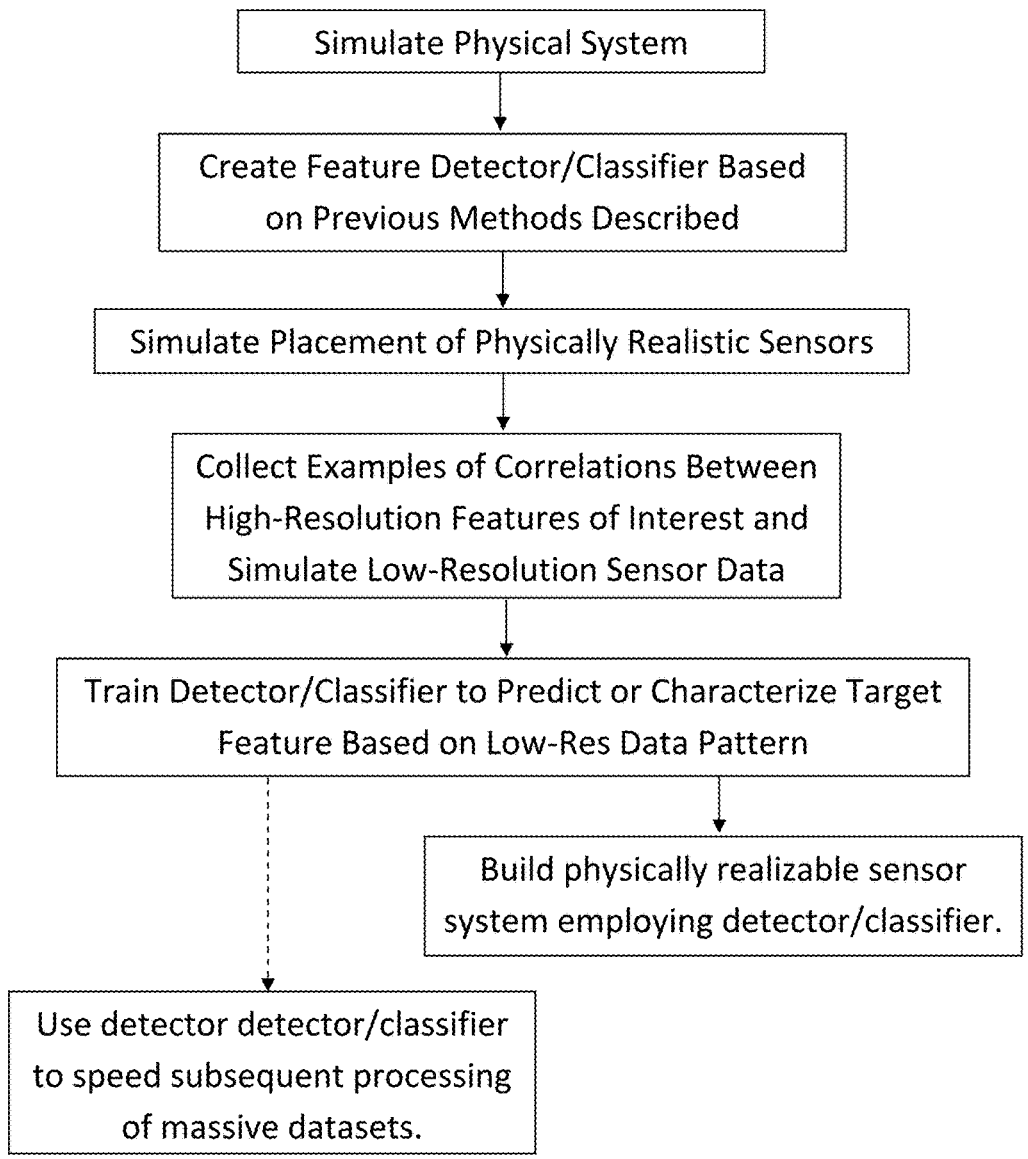
FIG. 8 is a flow diagram illustrating a progression of general processing steps in an exemplary embodiment of the present invention incorporating efficient training for a machine classifier.

FIG. 8, illustrates a flow of processes in a system and method formed in accordance with a further exemplary embodiment of the present invention. A physics simulation is preferably used to generate many examples of data instances in an automated fashion. Such data set instances are quickly analyzed for the presence or absence of learned feature types or classification of learned feature types (based on the exemplary embodiments described in parts 1 and 2 herein). The massive, high-resolution data set from simulation is reduced to a set of much-lower resolution, sparse samples of physically available information as might be collected with an actual physical sensor system. Either or both of these (high and low resolution) data sets is dimensionally reduced using, preferably, GAD type SSA processing to produce a set of training vectors by which to train a machine classifier. One can then train a detector of SVM type, for example, to predict the presence or absence of specific characteristics of the high-resolution features that are impossible to directly measure in a real physical system. Detection of such features is based upon data patterns present in the low-resolution data set than can be measured in a practical physical system.

In addition, as indicated by the optional dotted line in FIG. 8, the same detector scheme may be applied within the simulated data (or on future simulated data) as a means to speed subsequent processing to detect or characterize these same features of interest.

The system and method disclosed herein will have broad application apparent to those skilled in the art once they have understood the present disclosure. Upon reviewing the novel combinations of elements disclosed in the specification and figures and the teachings herein, it will be clear to those skilled in the art that there are many ways in which the subject system and method may be implemented and applied. The description herein relates to the preferred modes and example embodiments of the invention.

The descriptions herein are intended to illustrate possible implementations of the present invention and are not restrictive. Preferably, the disclosed method steps and system units are programmably implemented in computer based systems known in the art having one or more suitable processors, memory/storage, user interface, and other components or accessories required by the particular application intended. Suitable variations, additional features, and functions within the skill of the art are contemplated, including those due to advances in operational technology. Various modifications other than those mentioned herein may be resorted to without departing from the spirit or scope of the invention. Variations, modifications and alternatives will become apparent to the skilled artisan upon review of this description.

That is, although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit or scope of the invention as defined in the appended claims.

What is claimed is:

1. A method for discriminating and tracking a coherently structured flow feature dynamically evolving in structure over time within a migratory medium, comprising:
    establishing a data set captured for a medium undergoing migratory flow at a plurality of physical points defined within a multi-dimensional physical space, each said data set including data content captured for each physical point in terms of a plurality of scalar parameter values;
    establishing at least one pre-selected target feature type;
    establishing a scalar field predefined by at least one of said scalar parameters;
    selectively generating a sparse set of key points within said scalar field, said key points corresponding to at least one coherently structured feature of said target feature type occurring within said physical space, each said key point coinciding with one of said physical points, wherein said coherently structured feature re-shapes over time with respect to other portions of the migratory medium;
    eliminating a portion of the data set according to said key points to form a partial data set, said partial data set containing the data content of said key points within said sparse set;
    adaptively determining descriptive information for each said key point according to said target feature type from said data content within a neighborhood of said physical point coinciding therewith, said neighborhood being defined responsive to said target feature type, said descriptive information being determined according to a proximity-based weighting of said data content relative to said key point; and,
    executing over a time period at least one predetermined feature-based operation responsive to said descriptive information on said partial data set as a surrogate for execution of said predetermined feature-based operation on said data set over the time period, whereby the execution predictively generates evolving flow feature data substantially representative of said data set.

2. The method as recited in claim 1, wherein said feature-based operation includes discriminating and tracking said coherently structured feature of said target feature type occurring in a first of said data sets within a second of said data sets, said coherently structured feature evolving in structural definition according to at least one of said scalar parameters between said first and second data sets.

3. The method as recited in claim 2, wherein said first and second data sets are captured at first and second time slices offset in time one from the other.

4. The method as recited in claim 1, wherein said physical space of said data set is defined by at least three dimensions; and, said key points are identified according to a scalar invariant feature transformation (SIFT) of said data set.

5. The method as recited in claim 1, further comprising data reduction of said sparse set to reduce in number said key points independently indexed therein, said data reduction including:
    identifying a match between at least a pair of said key points according to a similarity criteria determined according to said descriptive information respectively thereof; and,
    combining said matched key points in index within said sparse space for collective indexing thereof during execution of said predetermined feature-based operation.

6. The method as recited in claim 5, wherein said data reduction includes generating a descriptive geometric parameter of one said key point relative to at least one other said key point, said match between said key points being identified responsive to said descriptive geometric parameter.

7. The method as recited in claim 6, wherein a match is identified between said key points generated for different ones of said data sets.

8. The method as recited in claim 6, wherein said feature-based operation includes volume tracking according to a predetermined volume defined by a set of volume vertices within a space described in said physical space by said sparse set of key points, said volume tracking comprising:
    identifying a match amongst said key points disposed within said predetermined volume to generate a constellation of key points; and,
    predictively adjusting said predetermined volume for application to said key points generated for a subsequent time slice to account for the evolution of said coherently structured feature in structural definition between time slices.

9. The method as recited in claim 6, wherein said feature-based operation includes adaptive isosurface identification, comprising:
    establishing a predetermined volume defined by a set of volume vertices within a space described in said physical space by said sparse set of key points;
    computing an isovalue for a preselected one of said scalar parameters occurring in said data content for said key points disposed within said predetermined volume; and,
    defining an isosurface based on said isovalue.

10. The method as recited in claim 9, wherein said feature-based operation includes isosurface tracking, comprising:
    identifying a match amongst said key points disposed within said isosurface to generate a constellation of key points; and,
    predictively adjusting said predetermined volume for application to said key points generated for a subsequent time slice to account for the evolution of said coherently structured feature in structural definition between time slices.

11. The method as recited in claim 2, wherein said descriptive information for each said key point includes a descriptor and primary orientation, said descriptor being defined with respect to a scale measure and an orientation measure determined from said data content within said neighborhood of said key point, said primary orientation being defined based on said orientation measure.

12. The method as recited in claim 1, wherein said scalar field is defined according to at least one non-vector parameter selected from the group consisting of: pressure component P along one dimension of said physical space, a Q-criterion, and a stream-wise velocity component W.

13. A system for discriminating and tracking a coherently structured flow feature dynamically evolving in structure over time within a migratory medium, comprising:
   a collection unit implemented on a computer processor, said collection unit receiving a data set captured for a medium undergoing migratory flow at a plurality of physical points defined within a multi-dimensional physical space, each said data set including data content captured for each physical point in terms of a plurality of scalar parameter values;
   a decomposition unit implemented on a computer processor and coupled to said collection unit, said decomposition unit selectively generating a sparse set of key points within a scalar field predefined by at least one of said scalar parameters, said key points corresponding to at least one coherently structured feature of a preselected target feature type occurring within said physical space, each said key point coinciding with one of said physical points wherein said coherently structured feature re-shapes over time with respect to other portions of the migratory medium;
   a data reduction unit implemented on a computer processor and coupled to said decomposition unit, said data reduction unit adaptively determining descriptive information for each said key point according to said target feature type from said data content within a neighborhood of said physical point coinciding therewith, said descriptive information being determined according to a proximity-based weighting of said data content relative to said key point, said neighborhood being defined responsive to said target feature type, said data reduction unit eliminating a portion of the data set according to said key points to form a partial data set, said partial data set containing the data content of said key points within said sparse set; and,
   a feature processing unit implemented on a computer processor and coupled to said data reduction unit, said feature processing unit executing over a time period at least one predetermined feature-based operation responsive to said descriptive information on said partial data set as a surrogate for execution of said predetermined feature-based operation on said data set over the time period, whereby the execution predictively generates evolving flow feature data substantially representative of said data set.

14. The system as recited in claim 13, wherein said feature-based operation includes discriminating and tracking said coherently structured feature of said target feature type occurring in a first of said data sets within a second of said data sets, said coherently structured feature evolving in structural definition according to at least one of said scalar parameters between said first and second data sets.

15. The system as recited in claim 14, wherein said first and second data sets are captured at first and second time slices offset in time one from the other.

16. The system as recited in claim 13, wherein said physical space of said data set is defined by at least three dimensions; and, said key points are identified according to a scalar invariant feature transformation (SIFT) of said data set.

17. The system as recited in claim 13, wherein said data reduction unit reduces in number said key points independently indexed in said sparse set, said data reduction unit executing to:
   identify a match between at least a pair of said key points according to a similarity criteria determined according to said descriptive information respectively thereof; and,
   combine said matched key points in index within said sparse space for collective indexing thereof during execution of said predetermined feature-based operation.

18. The system as recited in claim 17, wherein said data reduction unit further executes to generate a descriptive geometric parameter of one said key point relative to at least one other said key point, said match between said key points being identified responsive to said descriptive geometric parameter.

19. The system as recited in claim 18, wherein a match is identified between said key points generated for different ones of said data sets.

20. The system as recited in claim 18, wherein said feature processing unit executes volume tracking according to a predetermined volume defined by a set of volume vertices within a space described in said physical space by said sparse set of key points, said volume tracking comprising:
   identifying a match amongst said key points disposed within said predetermined volume to generate a constellation of key points; and,
   predictively adjusting said predetermined volume for application to said key points generated for a subsequent time slice to account for the evolution of said coherently structured feature in structural definition between time slices.

21. The system as recited in claim 18, wherein said feature processing unit executes adaptive isosurface identification and isosurface tracking, comprising:
   establishing a predetermined volume defined by a set of volume vertices within a space described in said physical space by said sparse set of key points;
   computing an isovalue for a preselected one of said scalar parameters occurring in said data content for said key points disposed within said predetermined volume;
   defining an isosurface based on said isovalue;
   identifying a match amongst said key points disposed within said isosurface to generate a constellation of key points; and,
   predictively adjusting said predetermined volume for application to said key points generated for a subsequent time slice to account for the evolution of said coherently structured feature in structural definition between time slices.

22. The system as recited in claim 14, wherein said descriptive information for each said key point includes a descriptor and primary orientation, said descriptor being defined with respect to a scale measure and an orientation measure determined from said data content within said neighborhood of said key point, said primary orientation being defined based on said orientation measure.

23. The system as recited in claim 13, wherein said scalar field is defined according to at least one non-vector parameter selected from the group consisting of: pressure component P along one dimension of said physical space, a Q-criterion, and a stream-wise velocity component W.

* * * * *